(12) United States Patent
Sujan et al.

(10) Patent No.: US 8,852,051 B2
(45) Date of Patent: Oct. 7, 2014

(54) SYSTEM, METHOD, AND APPARATUS FOR CONTROLLING POWER OUTPUT DISTRIBUTION IN A HYBRID POWER TRAIN

(71) Applicant: Cummins Inc., Columbus, IN (US)

(72) Inventors: Vivek Anand Sujan, Columbus, IN (US); Martin T. Books, Columbus, IN (US); Patrick O. Djan-Sampson, Niskayuna, NY (US); Praveen Muralidhar, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 120 days.

(21) Appl. No.: 13/627,469

(22) Filed: Sep. 26, 2012

(65) Prior Publication Data
US 2013/0184912 A1    Jul. 18, 2013

Related U.S. Application Data

(63) Continuation of application No. 13/350,728, filed on Jan. 13, 2012.

(60) Provisional application No. 61/432,324, filed on Jan. 13, 2011.

(51) Int. Cl.
*B60W 10/08*   (2006.01)

(52) U.S. Cl.
USPC .......................................................... 477/3

(58) Field of Classification Search
None
See application file for complete search history.

(56) References Cited

U.S. PATENT DOCUMENTS

| | | | |
|---|---|---|---|
| 4,269,280 A | 5/1981 | Rosen | |
| 5,474,052 A | 12/1995 | Acquino et al. | |
| 5,586,613 A | 12/1996 | Ehsani | |
| 5,722,502 A | 3/1998 | Kubo | |
| 5,820,172 A | 10/1998 | Brigham et al. | |
| 5,832,396 A | 11/1998 | Moroto et al. | |
| 6,209,672 B1 | 4/2001 | Severinsky | |
| 6,242,873 B1 | 6/2001 | Drozdz et al. | |
| 6,269,290 B1 | 7/2001 | Egami et al. | |
| 6,300,858 B1 | 10/2001 | Kalapodis et al. | |
| 6,367,570 B1 | 4/2002 | Long, III et al. | |
| 6,404,636 B1 | 6/2002 | Staggers et al. | |
| 6,421,599 B1 | 7/2002 | Lippa et al. | |
| 6,439,040 B1 | 8/2002 | Garms et al. | |
| 6,469,512 B2 | 10/2002 | Singh et al. | |
| 6,570,749 B1 | 5/2003 | Ling et al. | |
| 6,580,977 B2 * | 6/2003 | Ding et al. | ...... 701/22 |
| 6,807,931 B2 | 10/2004 | Taylor et al. | |
| 6,959,241 B2 | 10/2005 | Itow et al. | |
| 6,960,152 B2 | 11/2005 | Aoki et al. | |

(Continued)

FOREIGN PATENT DOCUMENTS

| | | |
|---|---|---|
| WO | 2008128416 | 10/2008 |
| WO | 2008147668 | 12/2008 |

*Primary Examiner* — Erin D Bishop
(74) *Attorney, Agent, or Firm* — Krieg DeVault LLP

(57) ABSTRACT

A method includes operating a hybrid power train having an internal combustion engine and an electrical torque provider. The method further includes determining a machine power demand and, in response to the machine power demand, determining a power division description. The method includes operating the internal combustion engine and the electrical torque provider in response to the power division description. The method further includes operating the internal combustion engine by starting the internal combustion engine in response to determining that a battery state-of-charge is below a predetermined threshold value.

20 Claims, 49 Drawing Sheets

(56) References Cited

U.S. PATENT DOCUMENTS

| | | |
|---|---|---|
| 7,040,434 B2 | 5/2006 | Komiyama et al. |
| 7,101,308 B2 | 9/2006 | Joe et al. |
| 7,196,493 B2 | 3/2007 | McGee et al. |
| 7,200,476 B2 | 4/2007 | Cawthorne et al. |
| 7,206,687 B1 | 4/2007 | Huseman |
| 7,338,335 B1 | 3/2008 | Messano |
| 7,370,612 B2 | 5/2008 | Hanai |
| 7,398,147 B2 | 7/2008 | Korarekar et al. |
| 7,486,036 B2 | 2/2009 | Oyobe et al. |
| 7,487,030 B2 | 2/2009 | Heap et al. |
| 7,520,351 B2 | 4/2009 | Uchisasai et al. |
| 7,520,353 B2 | 4/2009 | Severinsky et al. |
| 7,559,388 B2 | 7/2009 | Severinsky et al. |
| 7,597,164 B2 | 10/2009 | Severinsky et al. |
| 7,633,247 B2 | 12/2009 | Obayashi |
| 7,770,678 B2 | 8/2010 | Nozaki et al. |
| 7,809,487 B2 | 10/2010 | Syed et al. |
| 7,832,511 B2 | 11/2010 | Syed et al. |
| 7,988,594 B2 | 8/2011 | Heap et al. |
| 8,112,207 B2 | 2/2012 | Heap et al. |
| 8,249,770 B2 | 8/2012 | Bennewitz |
| 8,396,634 B2 | 3/2013 | Heap et al. |
| 8,406,970 B2 | 3/2013 | Heap et al. |
| 2005/0061562 A1 | 3/2005 | Mack |
| 2005/0080538 A1 | 4/2005 | Hubbard et al. |
| 2005/0256623 A1 | 11/2005 | Hubbard et al. |
| 2006/0276937 A1 | 12/2006 | Yamashita |
| 2007/0298928 A1 | 12/2007 | Itano |
| 2008/0021628 A1 | 1/2008 | Tryon |
| 2008/0076622 A1 | 3/2008 | Manken |
| 2008/0078610 A1 | 4/2008 | Godbold |
| 2008/0133120 A1 | 6/2008 | Romanick |
| 2008/0236916 A1 | 10/2008 | Heller et al. |
| 2008/0308066 A1 | 12/2008 | Martin et al. |
| 2009/0118950 A1 | 5/2009 | Heap et al. |
| 2009/0118962 A1 | 5/2009 | Heap et al. |
| 2009/0150015 A1 * | 6/2009 | Okubo et al. .................. 701/22 |
| 2009/0150016 A1 | 6/2009 | Hung |
| 2009/0309416 A1 | 12/2009 | Bose et al. |
| 2010/0072953 A1 | 3/2010 | Mitsutani |
| 2010/0204863 A1 | 8/2010 | Sakamoto |
| 2010/0252344 A1 | 10/2010 | Gieray et al. |
| 2010/0286909 A1 | 11/2010 | Tate et al. |
| 2011/0057783 A1 | 3/2011 | Yagi et al. |
| 2011/0144840 A1 | 6/2011 | Ye et al. |
| 2012/0090301 A1 | 4/2012 | Sujan et al. |

* cited by examiner

Exemplary propulsion power limit calculation:

Power being drawn from electric bus by etd2 during propulsion:

$$P^{etd2}_{disch\_bus} = \frac{P_{etd2\_disch}}{(\eta_{pe2} \times \eta_{etd2})} \qquad (1)$$

where $P_{etd2\_disch}$ is the mechanical power being used by etd2 for propulsion i.e. $P_{etd2} \geq 0$ and its always a positive value NB: $P_{etd2\_disch} = 0$ during charging $\eta_{pe2}$ is the etd2 inverter efficiency $\eta_{etd2}$ is the etd2 efficiency Power being dumped onto electric bus by etd2 during charging:

$$P^{etd2}_{chrg\_bus} = P_{etd2\_chrg} \times (\eta_{pe2} \times \eta_{etd2}) \qquad (2)$$

where $P_{etd2\_chrg}$ is the mechanical power being used by etd2 for charging i.e. $P_{etd2} < 0$ and its always a negative value NB: $P_{etd2\_chrg} = 0$ during discharging $\eta_{pe2}$ is the etd2 inverter efficiency $\eta_{etd2}$ is the etd2 efficiency

*FIG. 7*

Exemplary propulsion power limit calculation (cont.)...

Power available at the shaft of ETD1 for propulsion:

$$P'_{etd1\_propel} = ((P_{B\_disch} \times \eta_{B-disch}) - P^{etd2}_{disch\_bus} - P^{etd2}_{chrg\_bus} - P_{acc}) \times \eta_{pe1} \times \eta_{etd1} \quad (3)$$

$$= \left[ (P_{B\_disch} \times \eta_{B-disch}) - \frac{P_{etd2\_disch}}{(\eta_{pe2} \times \eta_{etd2})} - P_{etd2\_chrg} \times (\eta_{pe2} \times \eta_{etd2}) - P_{acc} \right] \times \eta_{pe1} \times \eta_{etd1} \quad (4)$$

where $P_{B\_disch}$ is the discharging power of the battery or storage device $\eta_{B\_disch}$ is the discharging efficiency of the battery or storage device Maximum propulsion power capability of ETD1 based on physical constraints is $P^{max}_{etd1\_propel}$ ∴ Power available to ETD1 for propulsion is:
$$P^{limit}_{etd1\_propel} = \min(P'_{etd1\_propel}, P^{max}_{etd1\_propel}) \quad (5)$$

Similarly, power available at the shaft of ETD2 for propulsion is:

$$P'_{etd2\_propel} = ((P_{B\_disch} \times \eta_{B-disch}) - P^{etd1}_{disch\_bus} - P^{etd1}_{chrg\_bus} - P_{acc}) \times \eta_{pe2} \times \eta_{etd2} \quad (6)$$

$$= \left[ (P_{B\_disch} \times \eta_{B-disch}) - \frac{P_{etd1\_disch}}{(\eta_{pe1} \times \eta_{etd1})} - P_{etd1\_chrg} \times (\eta_{pe1} \times \eta_{etd1}) - P_{acc} \right] \times \eta_{pe2} \times \eta_{etd2} \quad (7)$$

Maximum propulsion power capability of ETD2 based on physical constraints is $P^{max}_{etd2\_propel}$ ∴ Power available to ETD2 for propulsion is:
$$P^{limit}_{etd2\_propel} = \min(P'_{etd2\_propel}, P^{max}_{etd2\_propel}) \quad (8)$$

FIG. 8

Exemplary regeneration power limit calculation:

Power being drawn from electric bus by ETD2 during propulsion:

$$P^{etd2}_{disch\_bus} = \frac{P_{etd2\_disch}}{(\eta_{pe2} \times \eta_{etd2})}$$

Power being dumped onto electric bus by ETD2 during charging:

$$P^{etd2}_{chrg\_bus} = P_{etd2\_chrg} \times (\eta_{pe2} \times \eta_{etd2})$$

Power capacity available to take on more charge from ETD1 with ETD2 charging:

$$P'_{etd1\_regen} = \frac{\left(\left(\frac{P_{B\_chrg}}{\eta_{B\_chrg}}\right) - P^{etd2}_{disch\_bus} - P^{etd2}_{chrg\_bus} - P_{acc}\right)}{\eta_{pe1} \times \eta_{etd1}} \qquad (9)$$

$$= \frac{\left(\left(\frac{P_{B\_chrg}}{\eta_{B\_chrg}}\right) - \frac{P_{etd2\_disch}}{(\eta_{pe2} \times \eta_{etd2})} - P_{etd2\_chrg} \times (\eta_{pe2} \times \eta_{etd2}) - P_{acc}\right)}{\eta_{pe1} \times \eta_{etd1}} \qquad (10)$$

Note: Accessory Power being used increases the capacity of the battery to take on more charge
All charging power is negative
where $P_{B\_chrg}$ is the charging power of the battery or storage device
$\eta_{B\_chrg}$ is the charging efficiency of the battery or storage device

FIG. 9

Exemplary regeneration power limit calculation:

Maximum regeneration power capability of ETD1 based on physical constraints is $P_{etd1\_regen}^{max}$ ∴ Regen Power limit of ETD1:

$$P_{etd1\_regen}^{limit} = max(P'_{etd1\_regen}, P_{etd1\_regen}^{max}) \quad (11)$$

Similarly, Power capacity available in the battery to take on more charge from ETD2 with ETD1 in a regen session:

$$P'_{etd2\_regen} = \left[ \frac{(P_{B\_chrg} \times \eta_{B-chrg}) - \frac{P_{etd1\_disch}}{(\eta_{pe1} \times \eta_{etd1})} - P_{etd1\_chrg} \times (\eta_{pe1} \times \eta_{etd1}) - P_{acc}}{\eta_{pe2} \times \eta_{etd2}} \right] \quad (12)$$

Maximum regeneration power capability of ETD2 based on physical constraints is $P_{etd2\_regen}^{max}$ ∴ Regen Power limit of ETD2:

$$P_{etd2\_regen}^{limit} = max(P'_{etd2\_regen}, P_{etd2\_regen}^{max}) \quad (13)$$

*FIG. 10*

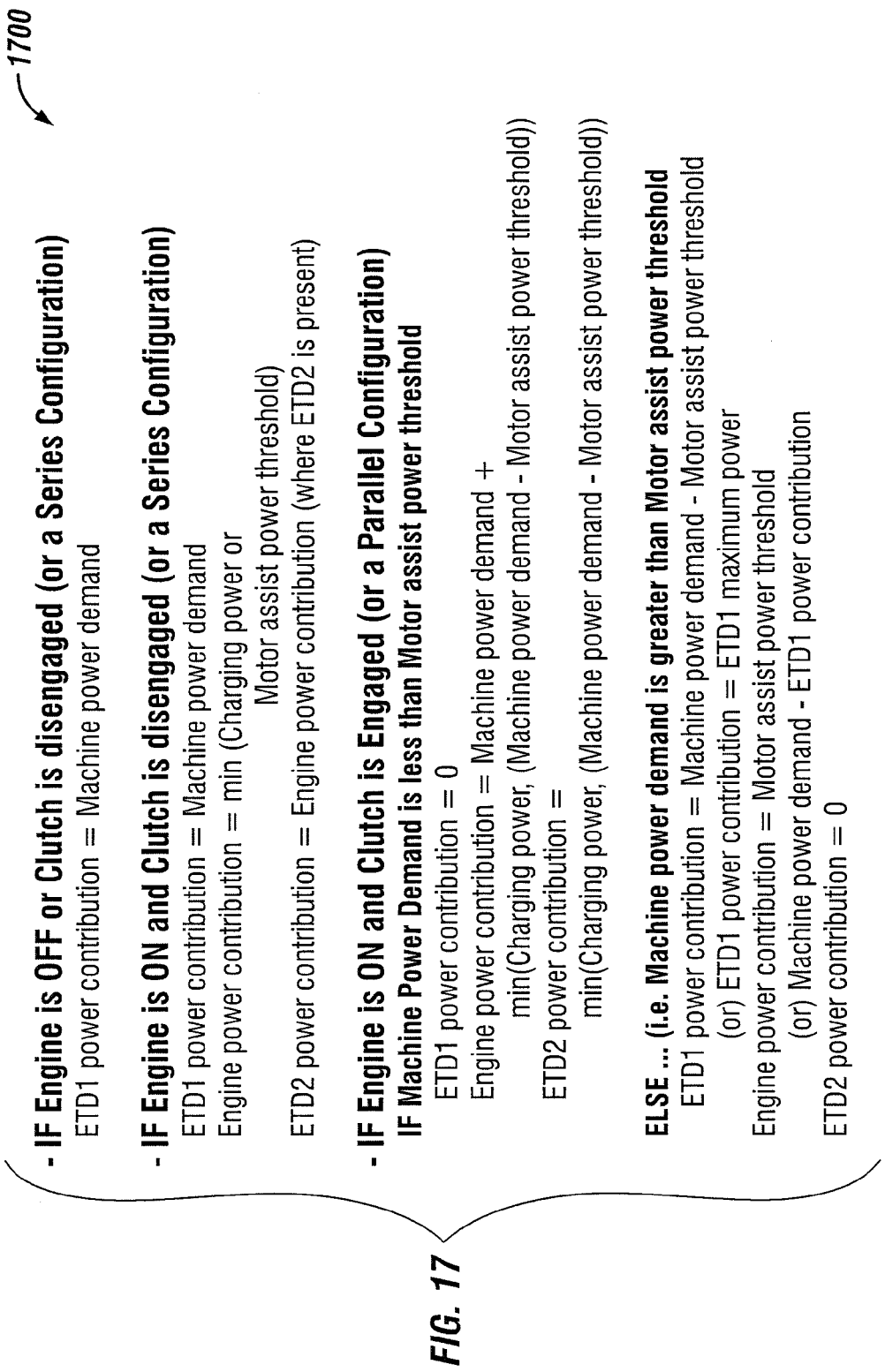

- IF Engine is OFF or Clutch is disengaged (or a Series Configuration)
  ETD1 power contribution = Machine power demand

- IF Engine is ON and Clutch is disengaged (or a Series Configuration)
  ETD1 power contribution = Machine power demand
  Engine power contribution = min (Charging power or
                                    Motor assist power threshold)
  ETD2 power contribution = Engine power contribution (where ETD2 is present)

- IF Engine is ON and Clutch is Engaged (or a Parallel Configuration)
  IF Machine Power Demand is less than Motor assist power threshold
    ETD1 power contribution = 0
    Engine power contribution = Machine power demand +
        min(Charging power, (Machine power demand - Motor assist power threshold))
    ETD2 power contribution =
        min(Charging power, (Machine power demand - Motor assist power threshold))

ELSE ... (i.e. Machine power demand is greater than Motor assist power threshold
    ETD1 power contribution = Machine power demand - Motor assist power threshold
        (or) ETD1 power contribution = ETD1 maximum power
    Engine power contribution = Motor assist power threshold
        (or) Machine power demand - ETD1 power contribution
    ETD2 power contribution = 0

Determining $\dot{m}_{fem_j}(t)$

If $(\dot{m}_{fem_j}(t))$ is discharging $$\Delta E_{Batt}^{Discharging-EM_j} = P_{Batt}^{Discharging-EM_j} \cdot \Delta t = \frac{P_{EM_j}}{\eta_{EM_j}} \cdot \Delta t \} P_{Batt}^{Discharging \to P_{EM_j}}$$

Conversion losses

Since $\eta_{EM_j} \leq 1$, $P_{EM_j} \leq P_{Batt}^{Discharging-EM_j}$

Future cost of $\Delta E_{Batt}^{Discharging-EM_j}$: $C_{\Delta E}^{Discharging-EM_j} = C_{Total}^{Charging} \cdot \frac{\Delta E_{Batt}^{Discharging-EM_j}}{E_{Total}^{Charging}}$ Total recharged energy (future): $E_{Total}^{Charging} = \int\limits_{\substack{\text{all future}\\\text{rechg cond}}} |P_{Batt}^{Charging}(t)|_{EG_1+EG_2} \, dt + \int\limits_{\substack{\text{all future}\\\text{recov cond}}} |P_{Batt}^{Charging}(t)|_{EG_1+EG_2} \, dt$ Total recharged energy cost (future): $C_{Total}^{Charging} = \dfrac{E_{Total}^{Charging-fuel}}{Q_{LHV}} = \dfrac{\int\limits_{\substack{\text{all future}\\\text{rechg cond}}} \left[\dfrac{|P_{Batt}^{Charging}(t)|_{EG_1}}{\eta_{EG_1}} + \dfrac{|P_{Batt}^{Charging}(t)|_{EG_2}}{\eta_{EG_2}}\right] dt + \int\limits_{\substack{\text{all future}\\\text{recov cond}}} \dfrac{|P_{Batt}^{Charging}(t)|_{EG_1+EG_2} \cdot \frac{P_{EM_j}}{\eta_{EM_j}} \cdot \Delta t}{Q_{LHV}}}{Q_{LHV}}$ $$\therefore C_{\Delta E}^{Discharging-EM_j} = \dfrac{\int\limits_{\substack{\text{all future}\\\text{rechg cond}}} \left[\dfrac{|P_{Batt}^{Charging}(t)|_{EG_1}}{\eta_{EG_1}} + \dfrac{|P_{Batt}^{Charging}(t)|_{EG_2}}{\eta_{EG_2}}\right] dt}{Q_{LHV}}$$

$$\dot{m}_{fem_i}(t) = C_{\Delta E}^{Discharging-EM_i} =$$

$$= \frac{\int\limits_{\substack{\text{all future} \\ \text{rechg cond}}} \frac{|P_{Batt}^{Charging}(t)|_{EG_1}}{\eta_{EG_1}} + \frac{|P_{Batt}^{Charging}(t)|_{EG_2}}{\eta_{EG_2}} dt}{Q_{LHV} \cdot \Delta t} \cdot \frac{\int\limits_{\substack{\text{all future} \\ \text{rechg cond}}} \frac{|P_{Batt}^{Charging}(t)|_{EG_1}}{\eta_{EG_1}} + \frac{|P_{Batt}^{Charging}(t)|_{EG_2}}{\eta_{EG_2}} dt}{\int\limits_{\substack{\text{all future} \\ \text{rechg cond}}} |P_{Batt}^{Charging}(t)|_{EG_1+EG_2} dt + \int\limits_{\substack{\text{all future} \\ \text{recov cond}}} |P_{Batt}^{Charging}(t)|_{EG_1+EG_2}} \cdot \frac{P_{EM_i}}{\eta_{EM_i}} \cdot \Delta t$$

2302
$$\therefore \dot{m}_{fem_i}(t) = \frac{\int\limits_{\substack{\text{all future} \\ \text{rechg cond}}} \frac{|P_{Batt}^{Charging}(t)|_{EG_1}}{\eta_{EG_1}} + \frac{|P_{Batt}^{Charging}(t)|_{EG_2}}{\eta_{EG_2}} dt}{\int\limits_{\substack{\text{all future} \\ \text{rechg cond}}} |P_{Batt}^{Charging}(t)|_{EG_1+EG_2} dt + \int\limits_{\substack{\text{all future} \\ \text{recov cond}}} |P_{Batt}^{Charging}(t)|_{EG_1+EG_2}} \cdot \frac{P_{EM_i}}{\eta_{EM_i}} \cdot Q_{LHV}$$

else...

FIG. 23 else...

$$\Delta E_{Batt}^{Charging-EG_i} = P_{Batt}^{Charging-EG_i} \cdot \Delta t = \eta_{EG_i} \cdot P_{EG_i} \cdot \Delta t \}P_{Batt}^{Charging} \leftarrow P_{EG_i}$$

Conversion losses

Since $\eta_{EG_i} \leq 1$, $P_{EG_i} \leq P_{Batt}^{Discharging-EG_i}$

Future savings of $\Delta E_{Batt}^{Charging-EG_i} : S_{\Delta E}^{Charging-EG_i} = S_{Total}^{Discharging} \cdot \dfrac{\Delta E_{Batt}^{Charging-EG_i}}{E_{Total}^{Discharging}}$ Total discharged energy (future): $E_{Total}^{Charging} = \displaystyle\int_{\substack{\text{all future}\\\text{dischg cond}}} |P_{Batt}^{Discharging}(t)|_{EM_1+EM_2}\,dt$ Total discharged energy saving (future): $S_{Total}^{Discharging} = \dfrac{E_{Total}^{Discharging-fuel}}{Q_{LHV}} =$ $$= \dfrac{\displaystyle\int_{\substack{\text{all future}\\\text{dischg cond}}} \eta_{EM_1} \cdot |P_{Batt}^{Discharging}(t)|_{EM_1} + \eta_{EM_2} \cdot |P_{Batt}^{Discharging}(t)|_{EM_2}\,dt}{Q_{LHV}}$$

2402

$$\therefore S_{\Delta E}^{Charging-EG_i} = \dfrac{\displaystyle\int_{\substack{\text{all future}\\\text{dischg cond}}} \eta_{EM_1} \cdot |P_{Batt}^{Discharging}(t)|_{EM_1} + \eta_{EM_2} \cdot |P_{Batt}^{Discharging}(t)|_{EM_2}\,dt}{Q_{LHV}} \cdot \dfrac{\eta_{EG_i} \cdot P_{EG_i} \cdot \Delta t}{\displaystyle\int_{\substack{\text{all future}\\\text{dischg cond}}} |P_{Batt}^{Discharging}(t)|_{EM_1+EM_2}\,dt}$$

$$\dot{m}_{fem_j}(t) = \frac{S_{\Delta E}^{Charging-EG_j}}{\Delta t} = \frac{\displaystyle\int_{\substack{\text{all future}\\\text{dischg cond}}} \eta_{EM_1} \cdot |P_{Batt}^{Discharging}(t)|_{EM_1} + \eta_{EM_2} \cdot |P_{Batt}^{Discharging}(t)|_{EM_2} \, dt}{Q_{LHV} \cdot \Delta t} \cdot \frac{\displaystyle\int_{\substack{\text{all future}\\\text{dischg cond}}} |P_{Batt}^{Discharging}(t)|_{EM_2} \, dt}{\displaystyle\int_{\substack{\text{all future}\\\text{dischg cond}}} |P_{Batt}^{Discharging}(t)|_{EM_1+EM_2} \, dt} \cdot \eta_{EG_j} \cdot P_{EG_j} \cdot \Delta t$$

2502

$$\dot{m}_{fem_j}(t) = \frac{\displaystyle\int_{\substack{\text{all future}\\\text{dischg cond}}} \eta_{EM_1} \cdot |P_{Batt}^{Discharging}(t)|_{EM_1} + \eta_{EM_2} \cdot |P_{Batt}^{Discharging}(t)|_{EM_2} \, dt}{\displaystyle\int_{\substack{\text{all future}\\\text{dischg cond}}} |P_{Batt}^{Discharging}(t)|_{EM_1+EM_2} \, dt} \cdot \frac{\eta_{EG_j} \cdot P_{EG_j}}{Q_{LHV}}$$

end

Determining $\dot{m}_{fem_i}(t)$

If $\left(\dot{m}_{fem_i}(t)\right)$ is discharging $$\dot{m}_{fem_i}(t) = \underbrace{\dfrac{\int\limits_{\substack{\text{all future} \\ \text{rechg cond}}} \dfrac{|p_{Batt}^{Charging}(t)|_{EG_1}}{\eta_{EG_1}} + \dfrac{|p_{Batt}^{Charging}(t)|_{EG_2}}{\eta_{EG_2}} dt}{\int\limits_{\substack{\text{all future} \\ \text{recov cond}}} |p_{Batt}^{Charging}(t)|_{EG_1+EG_2} dt + \int\limits_{\substack{\text{all future} \\ \text{rechg cond}}} |p_{Batt}^{Charging}(t)|_{EG_1+EG_2} dt}}_{2302} \cdot \dfrac{\frac{P_{EM_i}}{\eta_{EM_i}}}{Q_{LHV}} \approx \dfrac{1}{\overline{\eta}_{rechg}} \cdot \dfrac{1}{\eta_{EM_i}} \cdot \dfrac{P_{EM_i}}{Q_{LHV}}$$

Solution from Fig. 23 else $$\dot{m}_{fem_i}(t) = \underbrace{\dfrac{\int\limits_{\substack{\text{all future} \\ \text{dischg cond}}} \eta_{EM_1} \cdot |p_{Batt}^{Discharging}(t)|_{EM_1} + \eta_{EM_2} \cdot |p_{Batt}^{Discharging}(t)|_{EM_2} dt}{\int\limits_{\substack{\text{all future} \\ \text{dischg cond}}} |p_{Batt}^{Discharging}(t)|_{EM_1+EM_2} dt}}_{2502} \cdot \dfrac{\eta_{EG_i} \cdot P_{EG_i}}{Q_{LHV}} \approx \dfrac{1}{\overline{\eta}_{dischg}} \cdot \eta_{EG_i} \cdot \dfrac{P_{EG_i}}{Q_{LHV}}$$

Solution from Fig. 25 end $\underbrace{\phantom{xxxxxxxxxxxxxxxxxxxxxxxxxxxxxxxxxxxxxxxxxxxxxxxxxxxxxxxxxxxxxxxxxxxxxxxxxxxxx}}_{\textit{FIG. 26}}$ $\phantom{xx}$ 2600

3. Develop Power/Speed lookup table → $(P_{IC}, P_{EM1}, P_{EM2})_{optimal}$
   - Clutch closed ($\omega_{IC} = \omega_{EM2}$):
   - Create search sequence using Genetic Algorithm $t = 1 \rightarrow T$ seconds (in steps of 1s)

$$\forall_t P^t_{Dmd} \Rightarrow \begin{bmatrix} P^t_{IC}(1) + P^t_{EM_1}(1) + P^t_{EM_2}(1) \\ \vdots \\ P^t_{IC}(N) + P^t_{EM_1}(N) + P^t_{EM_2}(N) \end{bmatrix} = P_S$$

$$\Rightarrow \begin{bmatrix} \dot{m}^t_{IC}(1) + \dot{m}^t_{EM_1}(1) + \dot{m}^t_{EM_2}(1) \\ \vdots \\ \dot{m}^t_{IC}(N) + \dot{m}^t_{EM_1}(N) + \dot{m}^t_{EM_2}(N) \end{bmatrix} =$$

$$\begin{bmatrix} \Im\left(\frac{P^t_{IC}(1)}{\omega^t_{IC}}, \omega^t_{IC}\right) \cdot P^t_{IC}(1) + \left(\frac{1}{\eta_{dischg}} \cdot \eta_{EG_1}(1) \cdot \frac{P_{EM_1}(1)}{Q_{LHV}} + \frac{1}{\eta_{rechg}} \cdot \frac{1}{\eta_{EM_1}(1)} \cdot \frac{P_{EM_1}(1)}{Q_{LHV}}\right) + \left(\frac{1}{\eta_{dischg}} \cdot \eta_{EG_2}(1) \cdot \frac{P_{EM_2}(1)}{Q_{LHV}} + \frac{1}{\eta_{rechg}} \cdot \frac{1}{\eta_{EM_2}(1)} \cdot \frac{P_{EM_2}(1)}{Q_{LHV}}\right) \\ \vdots \\ \Im\left(\frac{P^t_{IC}(N)}{\omega^t_{IC}}, \omega^t_{IC}\right) \cdot P^t_{IC}(N) + \left(\frac{1}{\eta_{dischg}} \cdot \eta_{EG_1}(N) \cdot \frac{P_{EM_1}(N)}{Q_{LHV}} + \frac{1}{\eta_{rechg}} \cdot \frac{1}{\eta_{EM_1}(N)} \cdot \frac{P_{EM_1}(N)}{Q_{LHV}}\right) + \left(\frac{1}{\eta_{dischg}} \cdot \eta_{EG_2}(N) \cdot \frac{P_{EM_2}(N)}{Q_{LHV}} + \frac{1}{\eta_{rechg}} \cdot \frac{1}{\eta_{EM_2}(N)} \cdot \frac{P_{EM_2}(N)}{Q_{LHV}}\right) \end{bmatrix}$$

3. Develop Power/Speed lookup table → $(P_{IC}, P_{EM1}, P_{EM2})_{optimal}$
   - Clutch closed ($\omega_{IC} = \omega_{EM2}$):
     - Create search sequence using Genetic Algorithm $\Im(\ )$: is the IC BSFC lookup table N: is the number of combinations to obtain $P^t_{Dmd}$ from the $P^t_{IC}, P^t_{EM_1}, P^t_{EM_2}$ spaces

- discretize the $P^t_{IC}, P^t_{EM_1}, P^t_{EM_2}$ selection spaces
- e.g. let $P^t_{IC}$ take on values of $P^t_{IC}(1)...P^t_{IC}(K)$
  let $P^t_{EM_1}$ take on values of $P^t_{EM_1}(1)...P^t_{EM_1}(L)$
  let $P^t_{EM_2}$ take on values of $P^t_{EM_2}(1)...P^t_{EM_2}(M)$
- $P^t_{Dmd} = P^t_{IC} + P^t_{EM_1} + P^t_{EM_2}$
- ∴ $N = K \cdot L \cdot M$ ← K, L, M may be genetic parameters allowed to vary.
  In certain embodiments, K is allowed to vary and L, M are fixed

FIG. 39

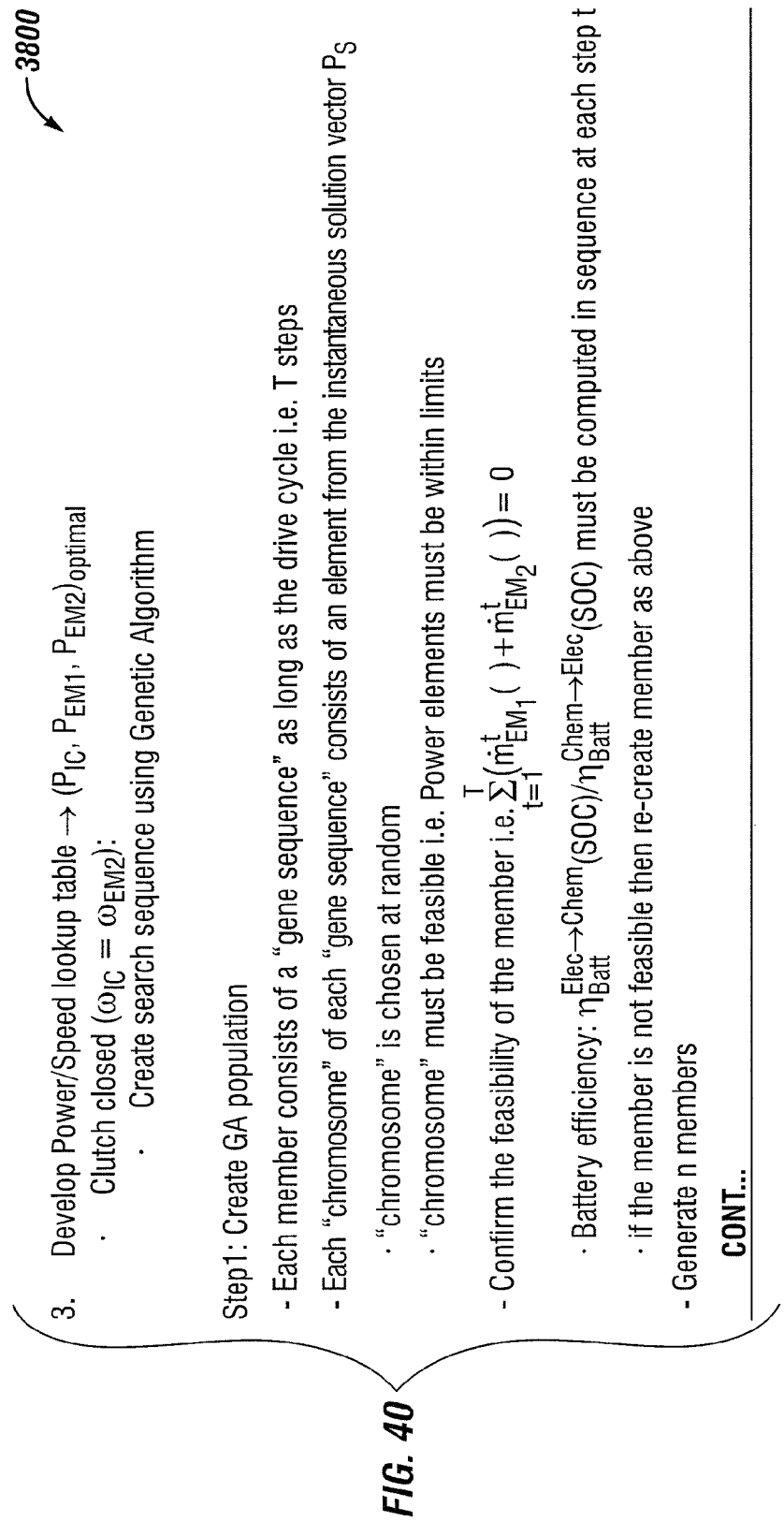

FIG. 40

3. Develop Power/Speed lookup table → $(P_{IC}, P_{EM1}, P_{EM2})_{optimal}$
   - Clutch closed ($\omega_{IC} = \omega_{EM2}$):
     - Create search sequence using Genetic Algorithm Step1: Create GA population
- Each member consists of a "gene sequence" as long as the drive cycle i.e. T steps
- Each "chromosome" of each "gene sequence" consists of an element from the instantaneous solution vector $P_S$
  - "chromosome" is chosen at random
  - "chromosome" must be feasible i.e. Power elements must be within limits
- Confirm the feasibility of the member i.e. $\sum_{t=1}^{T}(\dot{m}_{EM_1}^t(\ )+\dot{m}_{EM_2}^t(\ ))=0$
  - Battery efficiency: $\eta_{Batt}^{Elec \rightarrow Chem}(SOC)/\eta_{Batt}^{Chem \rightarrow Elec}(SOC)$ must be computed in sequence at each step t
  - if the member is not feasible then re-create member as above
- Generate n members

CONT...

3. Develop Power/Speed lookup table → $(P_{IC}, P_{EM1}, P_{EM2})_{optimal}$
  - Clutch closed ($\omega_{IC} = \omega_{EM2}$):
    - Create search sequence using Genetic Algorithm

CONT...

- Each of the n members is a possible solution to the optimization problem $$Sol_{1..n} = \left\{ \underbrace{\left[ \underbrace{P^1_{IC}(), P^1_{EM_1}(), P^1_{EM_2}()}_{1}, \underbrace{P^2_{IC}(), P^2_{EM_1}(), P^2_{EM_2}()}_{2}, \underbrace{P^3_{IC}(), P^3_{EM_1}(), P^3_{EM_2}()}_{3} \cdots \underbrace{P^T_{IC}(), P^T_{EM_1}(), P^T_{EM_2}()}_{T} \right]}_{1} \cdots \underbrace{\left[ \underbrace{P^1_{IC}(), P^1_{EM_1}(), P^1_{EM_2}()}_{1}, \underbrace{P^2_{IC}(), P^2_{EM_1}(), P^2_{EM_2}()}_{2}, \underbrace{P^3_{IC}(), P^3_{EM_1}(), P^3_{EM_2}()}_{3} \cdots \underbrace{P^T_{IC}(), P^T_{EM_1}(), P^T_{EM_2}()}_{T} \right]}_{n} \right\}$$

Step 2: Evaluate member fitness

- Fitness of a member/solution is based on the equivalent fuel consumption: $\sum_{t=1}^{T}\left(\dot{m}^t_{IC}() + \dot{m}^t_{EM_1}() + \dot{m}^t_{EM_2}()\right)$

FIG. 41

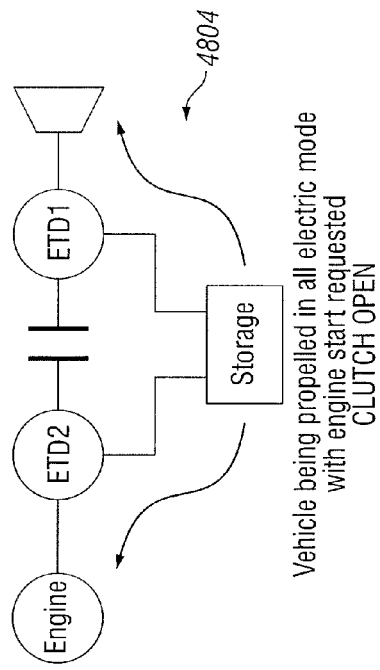
FIG. 48A — Vehicle being propelled in all electric mode CLUTCH OPEN
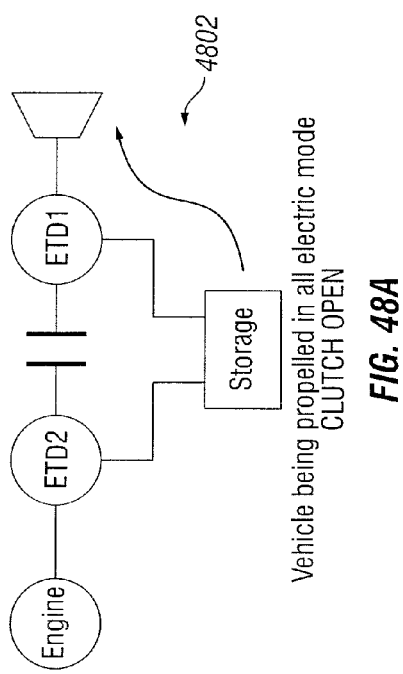
FIG. 48B — Vehicle being propelled in all electric mode with engine start requested CLUTCH OPEN
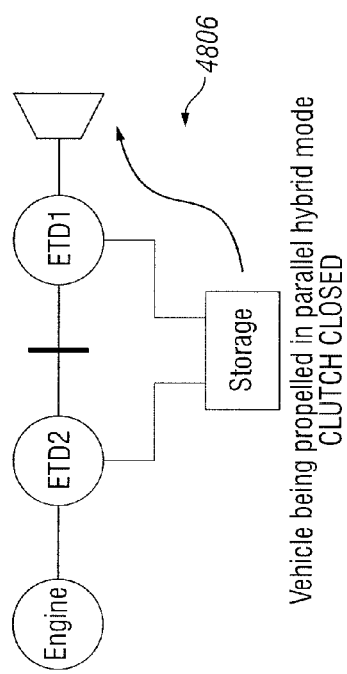
FIG. 48C — Vehicle being propelled in parallel hybrid mode CLUTCH CLOSED
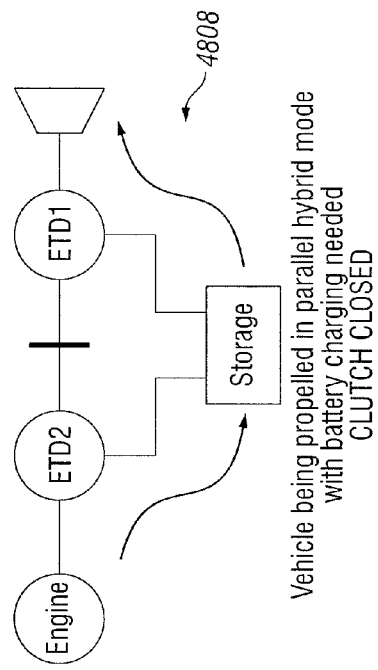
FIG. 48D — Vehicle being propelled in parallel hybrid mode with battery charging needed CLUTCH CLOSED

SYSTEM, METHOD, AND APPARATUS FOR CONTROLLING POWER OUTPUT DISTRIBUTION IN A HYBRID POWER TRAIN

RELATED APPLICATIONS

The present application is a continuation of U.S. patent application Ser. No. 13/350,728 entitled SYSTEM, METHOD, AND APPARATUS FOR CONTROLLING POWER OUTPUT DISTRIBUTION IN A HYBRID POWER TRAIN, filed on Jan. 13, 2012 which claims the benefit of U.S. Provisional patent application 61/432,324 entitled SYSTEM, METHOD, AND APPARATUS FOR CONTROLLING POWER OUTPUT DISTRIBUTION IN A HYBRID POWER TRAIN, filed Jan. 13, 2011, each of which is incorporated herein by reference.

BACKGROUND

The technical field generally relates to hybrid power train systems, and more particularly but not exclusively relates to control of hybrid power train systems operating in a motor vehicle. The introduction of two or more power sources into a power train introduces the possibility of selecting the power source for the load according to which power source is presently at a more optimal operating condition. For example, during a transient load situation, an electric motor may respond more optimally than an internal combustion engine, and the opportunity for the electric motor to manage the transient portion of the load is introduced. However, selecting the device that is more optimal under the present conditions, without considering future operating conditions, introduces the possibility of reaching a system limit—for example running a battery out of charge.

Additionally, certain operations may reduce the service life of components in the system, such as behaviors to save fuel economy that result in rapid cycling of battery charge. Further, the increased number of devices in the system includes an increased number of constraints for those devices that must be considered when coordinating devices to meet the desired output. Certain devices may not be available for full output in certain operating conditions, for example as an electric motor is heated the maximum power output becomes limited.

The optimal operating decisions for the devices also depend upon the duty cycle and operating conditions corresponding to a particular application. In addition, when a component in the system is failed or has a fault, the optimal operating decisions may be significantly different than when all components are operating correctly, but the determination of the new optimum remains complex. Further, a change in a component due to normal usage over time may alter the behaviors that are optimal. For example, if an aged aftertreatment catalyst requires more frequent regeneration events, or the maximum state-of-charge of an aged battery is lower than in a new battery, the optimal behaviors of the hybrid power train may change over time.

Therefore, further technological developments are desirable in this area.

SUMMARY

One embodiment is a unique system, apparatus, and method for controlling a hybrid power train. Other embodiments include unique methods, systems, and apparatus to calibrate and utilize a hybrid power train controller. Further embodiments, forms, objects, features, advantages, aspects, and benefits shall become apparent from the following description and drawings.

BRIEF DESCRIPTION OF THE DRAWINGS

FIGS. 7 and 8 depict an exemplary calculation for a propulsion electrical power limit.

FIGS. 9 and 10 depict an exemplary calculation for a regeneration electrical power limit.

FIG. 17 is a description of a rule-based controller operation.

FIGS. 20-26 depict an example basic cost optimization function for a system including a hybrid power train.

FIG. 37 through 43 depict an example operation to generate a controller calibration matrix.

FIGS. 48A-48D are schematic illustrations of example clutch operations.

DESCRIPTION OF THE ILLUSTRATIVE EMBODIMENTS

Figure 1:
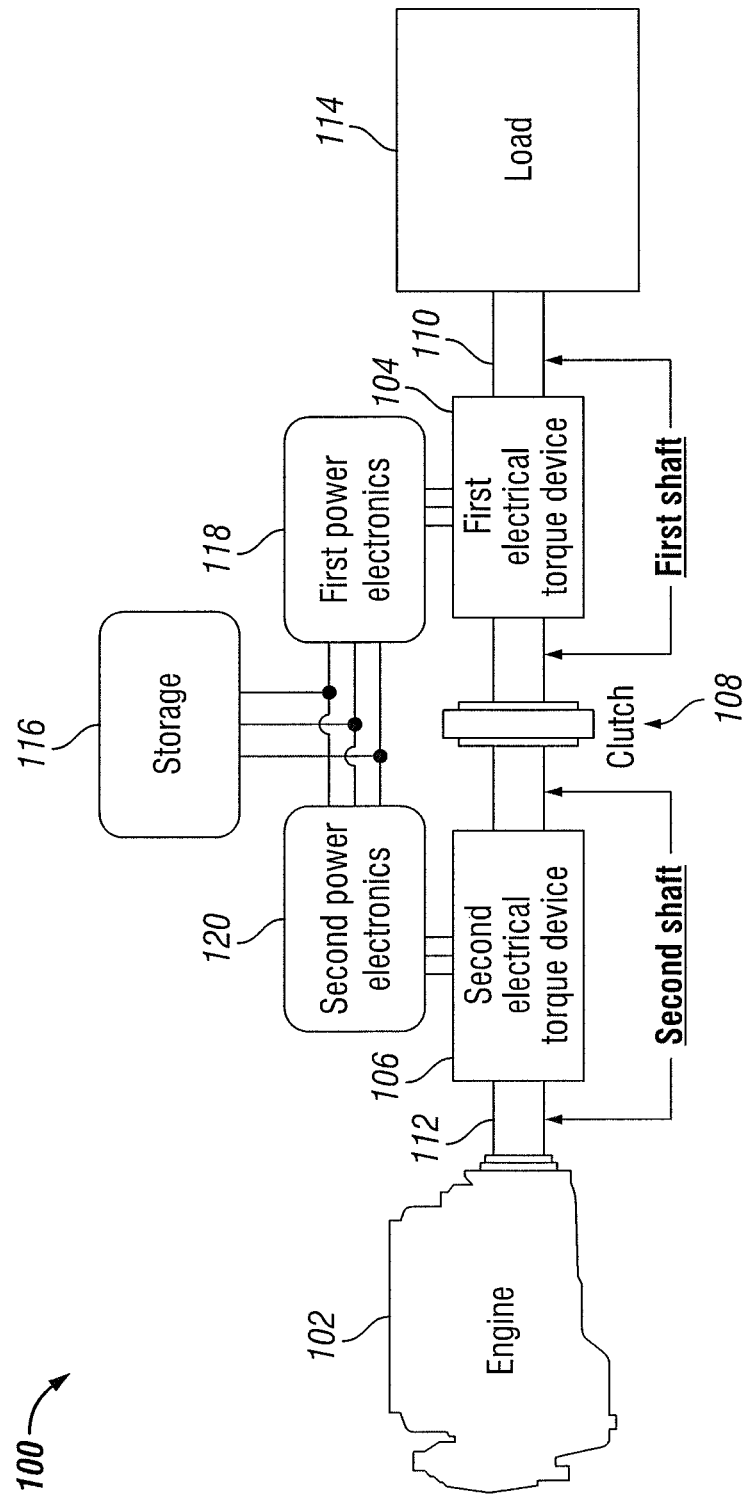
FIG. 1 is a schematic diagram of a hybrid power train architecture selectable between a series configuration and a parallel configuration.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Certain descriptions herein include a controller structured to perform various operations. In certain embodiments, the controller forms a portion of a processing subsystem including one or more computing devices having memory, processing, and communication hardware. The controller may be a single device or a distributed device, and the functions of the controller may be performed by hardware or software.

In certain embodiments, a controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components.

Certain operations described herein include an interpreting operation. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Certain descriptions herein include methods, techniques, and/or procedures including operational descriptions. Operations described are understood to be exemplary only, and operations may be combined or divided, and added or removed, as well as re-ordered in whole or part, unless stated explicitly to the contrary herein. Certain operations described may be implemented by a computer executing a computer program product on a computer readable medium, where the computer program product comprises instructions causing the computer to execute one or more of the operations, or to issue commands to other devices to execute one or more of the operations.

FIG. 1 is a schematic diagram of a hybrid power train architecture 100 selectable between a series configuration and a parallel configuration. The architecture 100 includes clutch 108 positioned between a first shaft mechanically coupled to a first electrical torque provider 104 (or, electrical torque device, or ETD), and a second shaft mechanically coupled to an engine and to a second electrical torque provider 106. Each of the electrical torque providers 104, 106 is electronically coupled to one or more electrical storage devices (e.g. a battery, hypercapacitor, etc.). In certain embodiments, power electronics 118, 120 are positioned between each electrical torque device and the electrical storage, for example to convert voltages, rectify electrical power, etc.

The first shaft 110 is mechanically coupled to a load 114. Any load 114 known in the art is contemplated herein, including at least a vehicle drive wheel, a motor/generator, a generator/motor, an engine (e.g. a hydraulic engine), a WER motor, etc. The load 114 may include a transmission, additional gearing or differentials, a driveline, machine shafts, etc. In a first position, the open clutch 108 provides the system as a series drive system. The first electrical torque provider 104 can draw power from the electrical storage device 116 and power the load 114, while the engine 102 can recharge the electrical storage device 116 through the second electrical torque device 106 as required. In a second position, the closed clutch 108 provides the system as a parallel drive system. The engine 102 and second electrical torque device 106 are mechanically coupled to the load. Either of the electrical torque devices 106, 104 can de-couple from the shafts, for example through an internal clutch or by de-magnetizing internal windings, allowing the engine 102 to power the load 114, and/or the electrical torque devices 106, 104 can add or subtract torque from the shafts 110, 112 to provide motive power or to regenerate the electrical storage device 116. The architecture 100 is an example, and any system that operates in series, parallel, selectably series-parallel, and/or other hybrid configurations having two different load driving torque providers are contemplated herein.

Figure 2:
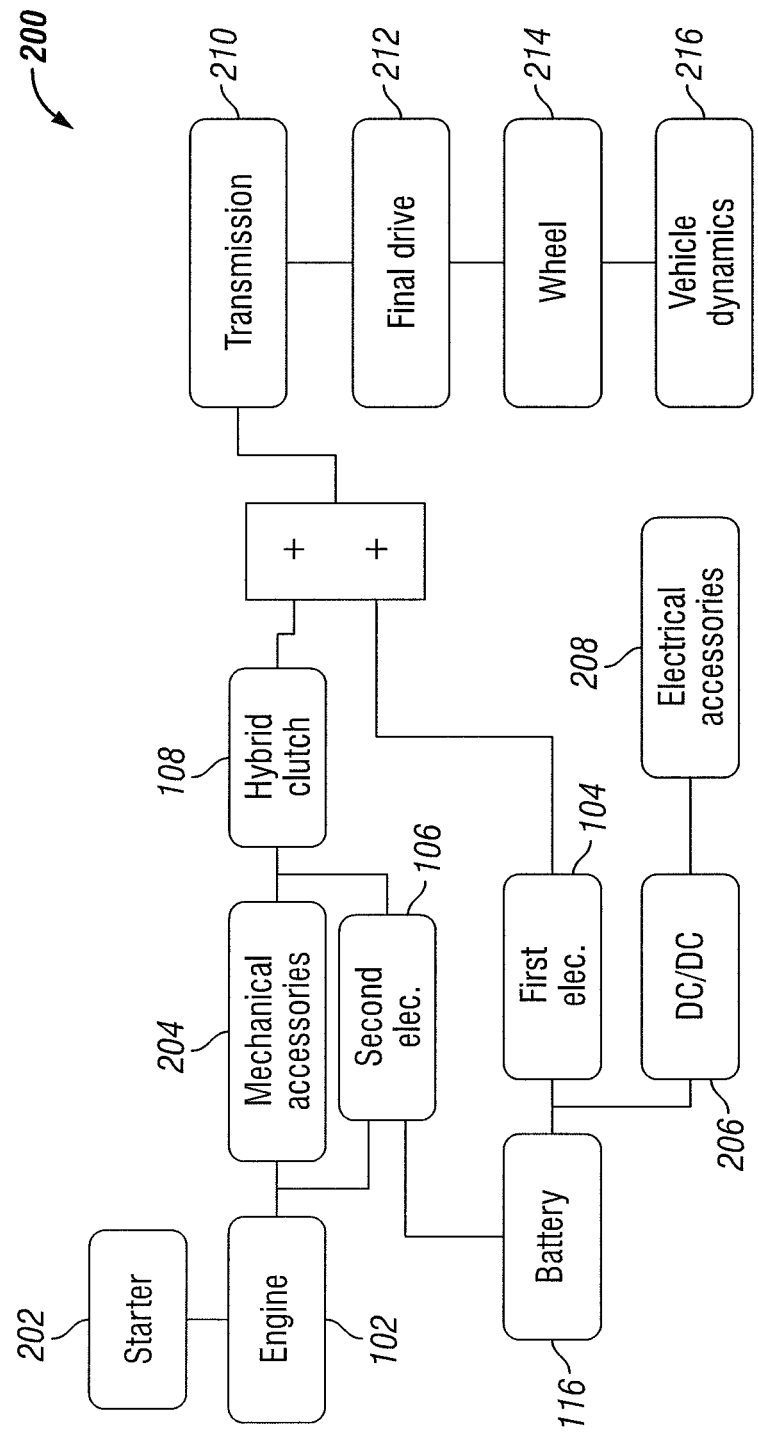
FIG. 2 is a schematic illustration of mechanical and electrical connections within an example hybrid power train, including vehicle dynamics.

Referencing FIG. 2, a schematic illustration of an system 200 of mechanical and electrical connections within an example hybrid power train. The system 200 includes an engine 102 coupled to a starter 202 and to a second electrical torque provider 106. The system 200 includes mechanical accessories 204 coupled to the engine 102 and to the second electrical torque provider 106. Mechanical accessories 204 may be selectively driveable by the engine 102 and/or second electrical torque provider 106, and/or may alternatively be selectively driven electrically. The system 200 further includes a hybrid clutch 108 that couples the engine 102 and the second electrical torque provider 106 to a transmission 210.

The system further includes a first electrical torque provider 104, which in the example is coupled to the transmission 210. In certain embodiments, the system 200 includes electrical accessories 208, which may be distinct devices from or at least partially shared devices with the mechanical accessories 204. The electrical accessories 208 are coupled via power electronics 206 to a battery 116 (or other electrical energy storage device(s)). In certain embodiments, the system 200 includes a final drive 212 coupled to the transmission 210, such as a rear axle gear and/or a differential, a wheel 214 coupled to the final drive 212, and/or vehicle dynamics 216 that affect the transfer of power (and/or torque) between the transmission 210 and the final motion of the vehicle or load.

Figure 3:
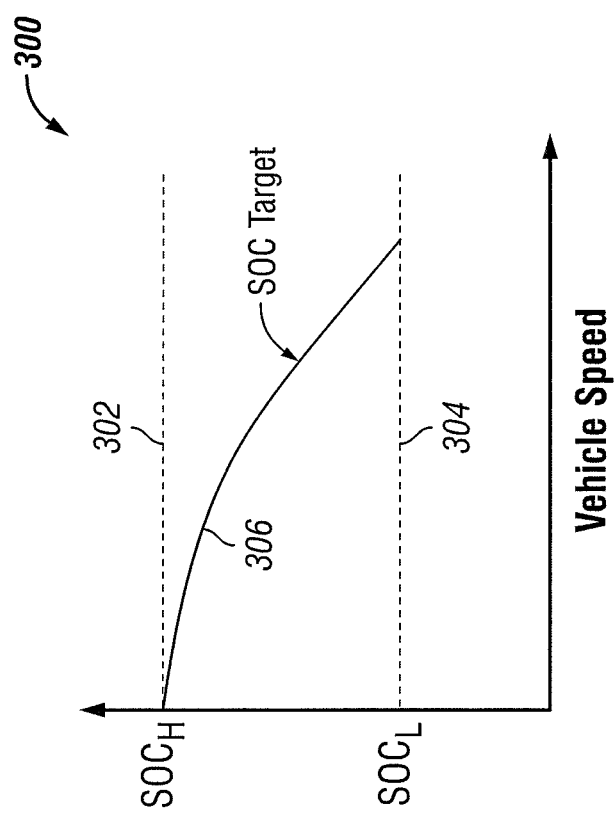
FIG. 3 illustrates an example relationship between a vehicle speed and a state-of-charge (SOC) target, including a high and low SOC target boundary.

FIG. 3 illustrates an example relationship 300 between a vehicle speed and a state-of-charge (SOC) target 306. The example includes a high SOC target boundary 302 and a low SOC target boundary 304. The example relationship 300 is non-limiting. In certain embodiments, the shape of the SOC target 306 may depend upon the characteristics of the battery, the weight of the vehicle, and/or the internal friction values of the vehicle. Information such as the SOC target 306 may be readily determined, such as by operating a vehicle of a selected weight between selected starting and stopping speed ranges, and determining an amount of charge restored to the battery 116 during deceleration operations from each of the varying speed ranges.

Figure 4:
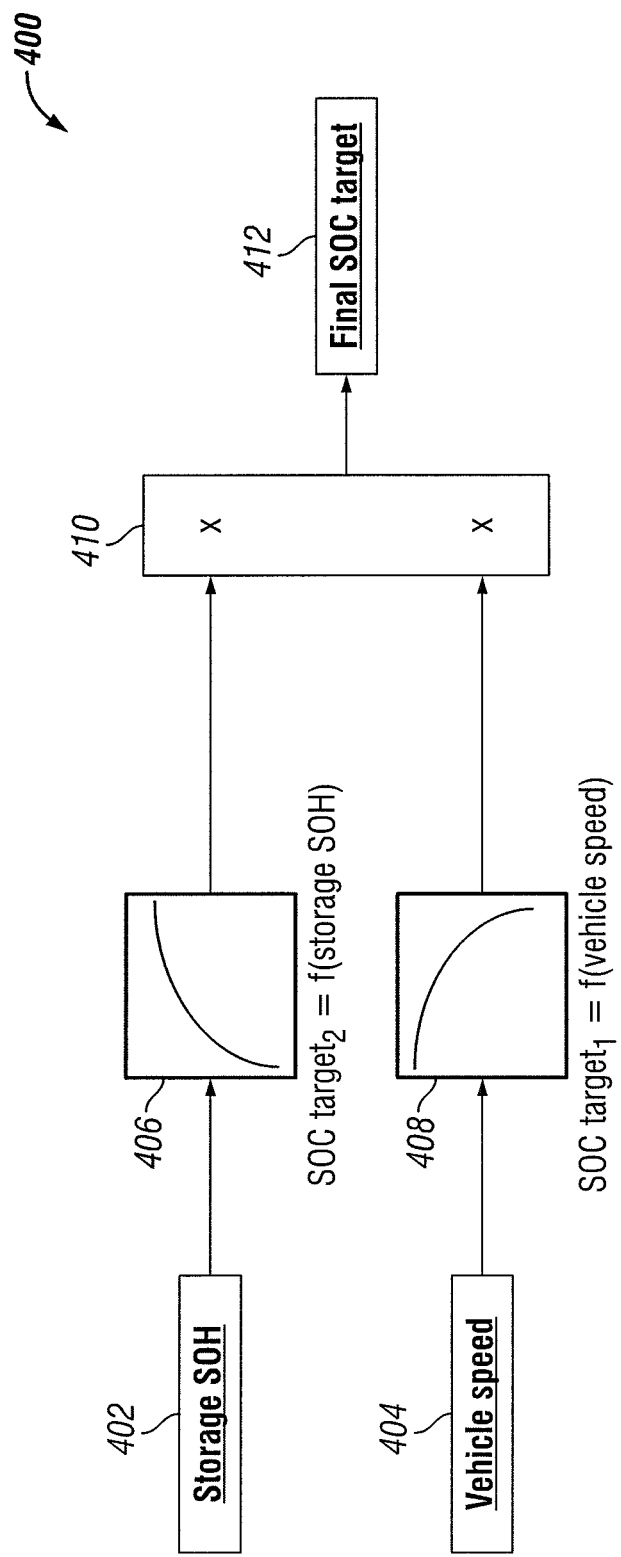
FIG. 4 is an illustration of an SOC target as a function of a storage device state-of-health (SOH).

FIG. 4 is an illustration 400 of an SOC target 412 as a function of a storage device state-of-health (SOH) 402. The illustration 400 shows a first relationship 406 that enforces an increasing SOC target with a strong battery (e.g. high SOH). The relationship 406 is an example, and can be determined according to selected criteria for the specific application, including a relationship where a degrading SOH may indicate that a higher SOC target is appropriate. In certain embodiments, a relationship 408 of the SOC target with vehicle speed 404 is combined with the relationship 406 to determine the final SOC target 412. The example illustration 400 demonstrates each relationship 406, 408 providing a factor for the final SOC target 412, and a multiplier operation 410 between the factors 406, 408 to provide the final SOC target 412.

Other exemplary factors that may affect the final SOC target 412, in certain embodiments, include temperature (of the battery, ambient, etc.), deviation from SOC, and/or cost impact to respond to charge/discharge under present conditions. The relationships 406, 408 illustrated are exemplary. The multiplier operation 410 is exemplary, and other combining operations may be utilized.

Figure 5:
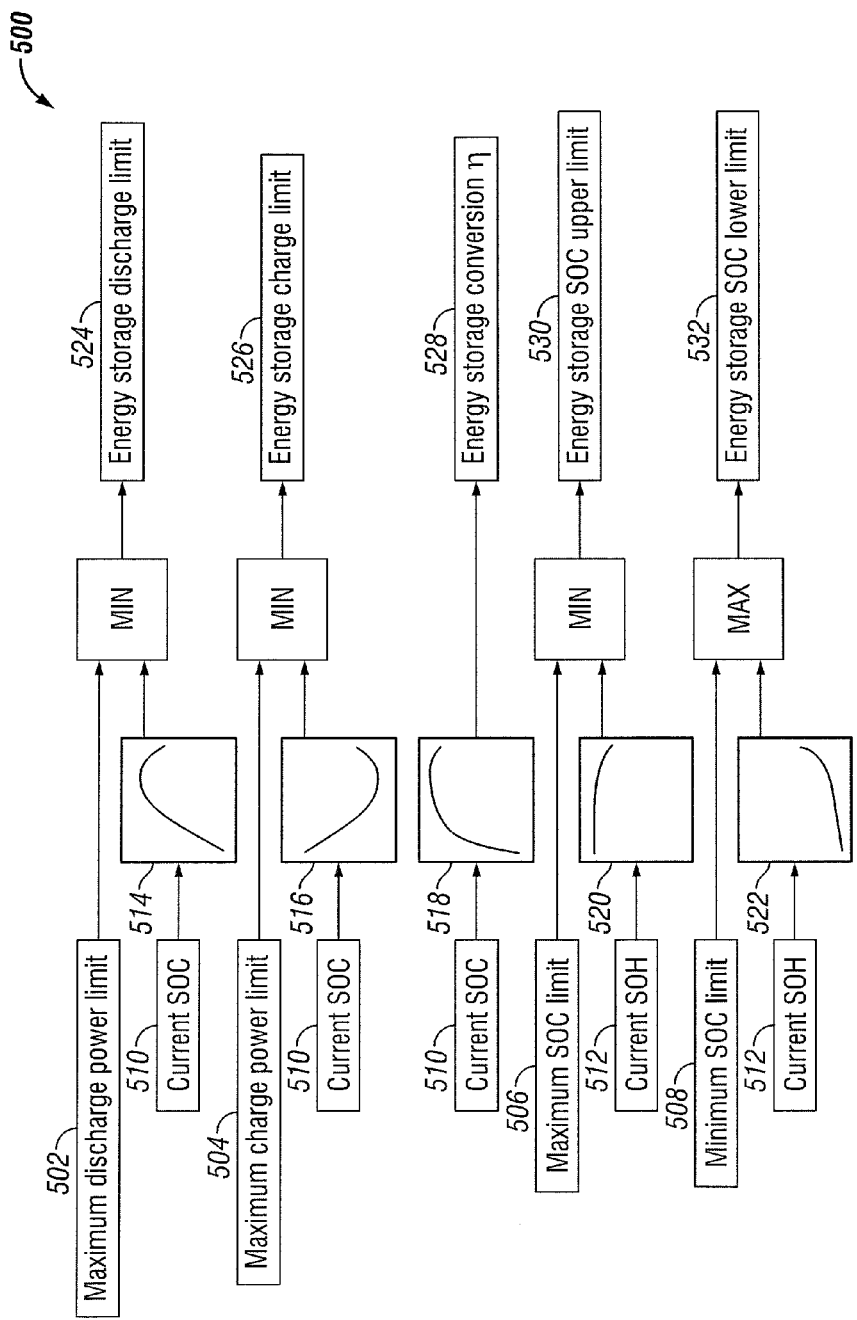
FIG. 5 provides an illustration of example energy storage device constraints and parameters, as a function of the SOC and SOH of the energy storage device.

FIG. 5 provides an illustration 500 of example energy storage device constraints and parameters, as a function 514, 516, 518, 520, 522 of the SOC and SOH of the energy storage device. Example parameters to provide constrains on SOC limits include a maximum discharge power limit 502 (for example implemented as a present SOC limit that enforces the discharge rate from the battery), a maximum charge power limit 504. The maximum discharge power limit 502 is used to determine an energy storage discharge limit 524, and the maximum charge power limit 504 is used to determine an energy storage charge limit 526. In certain embodiments, a current SOC 510 is utilized in a function 518 to determine a present energy storage conversion efficiency 528. In certain embodiments, a maximum SOC limit 506 is utilized in conjunction with a current SOH 512, for example to determine an energy storage SOC upper limit 530. In certain embodiments, a minimum SOC limit 508 is utilized with a current SOH 512 to determine an energy storage SOC lower limit 532. The relationships in the illustration are exemplary and non-limiting, and are readily determined by one of skill in the art contemplating a particular system. The relationships in the illustration 500 are usable, in one example, to determine feasibility of particular calibration values or of various planned control behaviors.

Figure 6A:
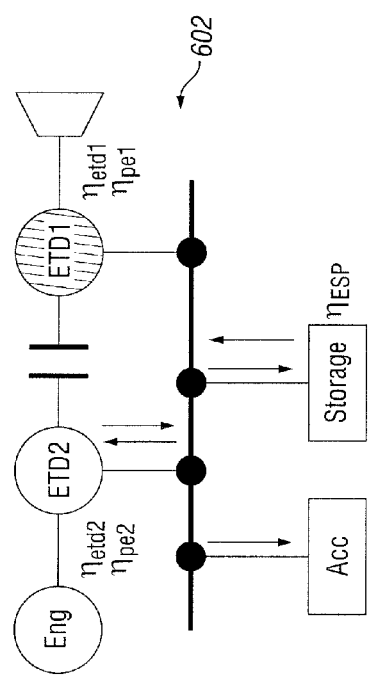
FIGS. 6A-6B are depictions of considerations to determine electrical limits in a hybrid power train.
Figure 6B:
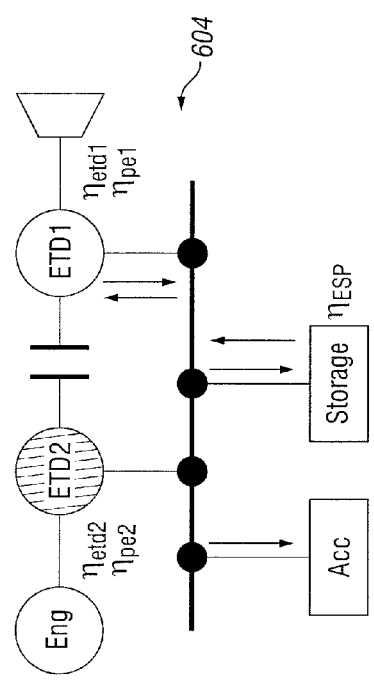

FIGS. 6A-6B are depictions of considerations 602 and 604, respectively, to determine electrical limits in a hybrid power train. Based on the amount of power available on the electric bus via the operations of ETD2 (e.g. a second electrical torque provider), storage, and the Accessories, the efficiencies of the battery providing power, of the electrical torque devices providing power, the efficiencies of the engine powering the electrical side (e.g. including internal engine friction, etc.), the motoring or regeneration constraints for first electrical torque device are computed. The maximum motoring or regeneration of the first electrical torque device can be utilized to determine the feasibility of particular calibration values or of various planned control behaviors. In the example, $\eta_{pe1}$ and $\eta_{pe2}$ are the power conversion efficiencies of the power electronics (not shown) positioned between the storage device and the respective electrical torque devices, and $\eta_{esp}$ is the conversion efficiency (e.g. chemical-electrical for a battery) of the electrical storage pack (or the electrical energy storage device) such as the battery.

FIGS. 7 and 8 depict an exemplary calculation 700 for a propulsion electrical power limit. The calculations 700 illustrated are examples and non-limiting. The calculations 700 utilize the available conversion efficiency information to determine the available power for propulsion from the first and second electrical torque providers. FIGS. 9 and 10 depict exemplary calculations 800 for a regeneration power limit. The calculations 800 illustrated are examples and non-limiting. The calculations 800 utilize the available conversion efficiency information to determine the available power for regenerating from the first and second electrical torque providers.

Figure 11:
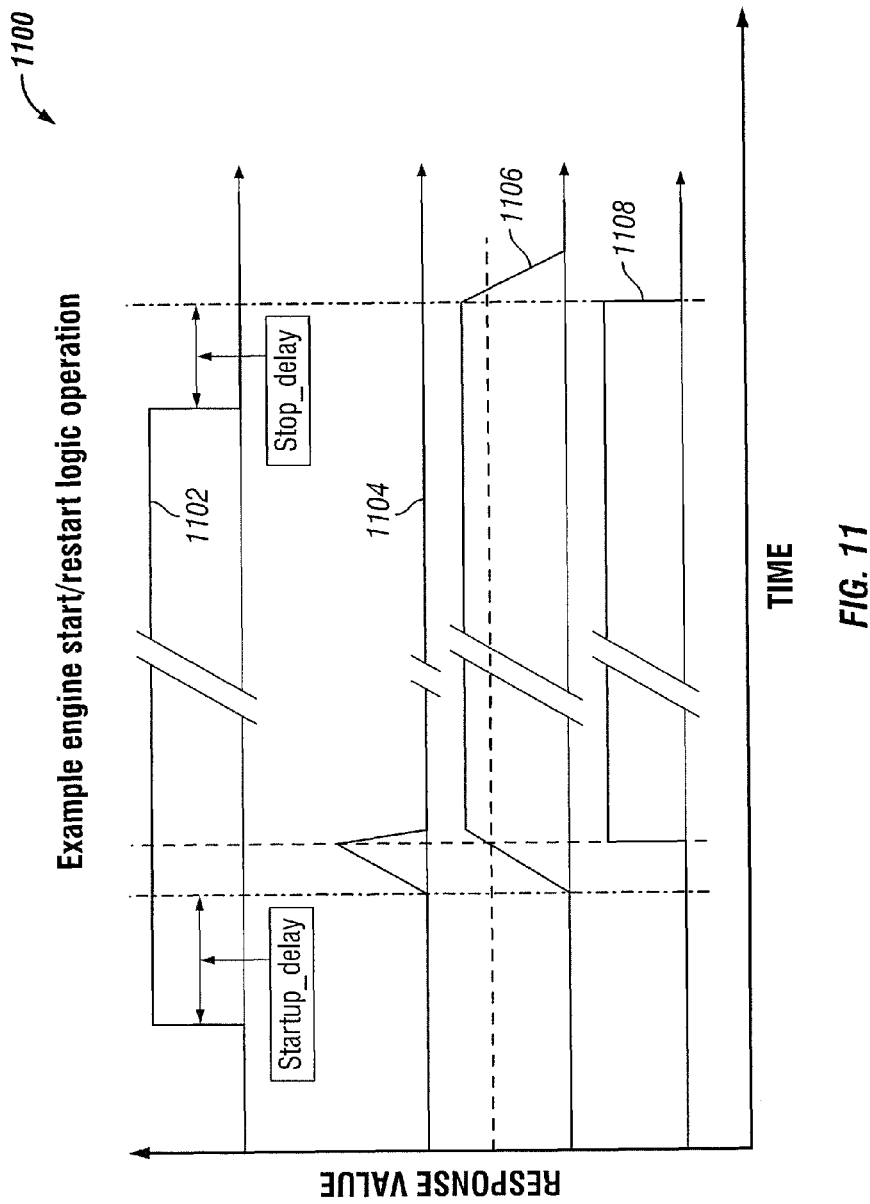
FIG. 11 depicts an illustrative time line for engine start and stop operations in a hybrid power train.

FIG. 11 depicts an illustrative time line for engine start and stop operations in a hybrid power train. The first curve 1102 depicts example engine on request values. The second curve 1104 depicts an engine start power command to the second electrical torque provider. The third curve 1106 depicts the engine speed, and the fourth curve 1108 depicts the state of the engine with regard to being considered in a running state and/or fueling.

In the example 1100, a startup delay is implemented after the engine is commanded ON and before the second electrical torque provider actively powers the engine. When the engine speed reaches a specified value, the engine begins self-operation and the power from the second electrical torque provider to the engine ramps off. After the engine is commanded to the off state, a stop delay is implemented before the engine is shut down.

Figure 12:
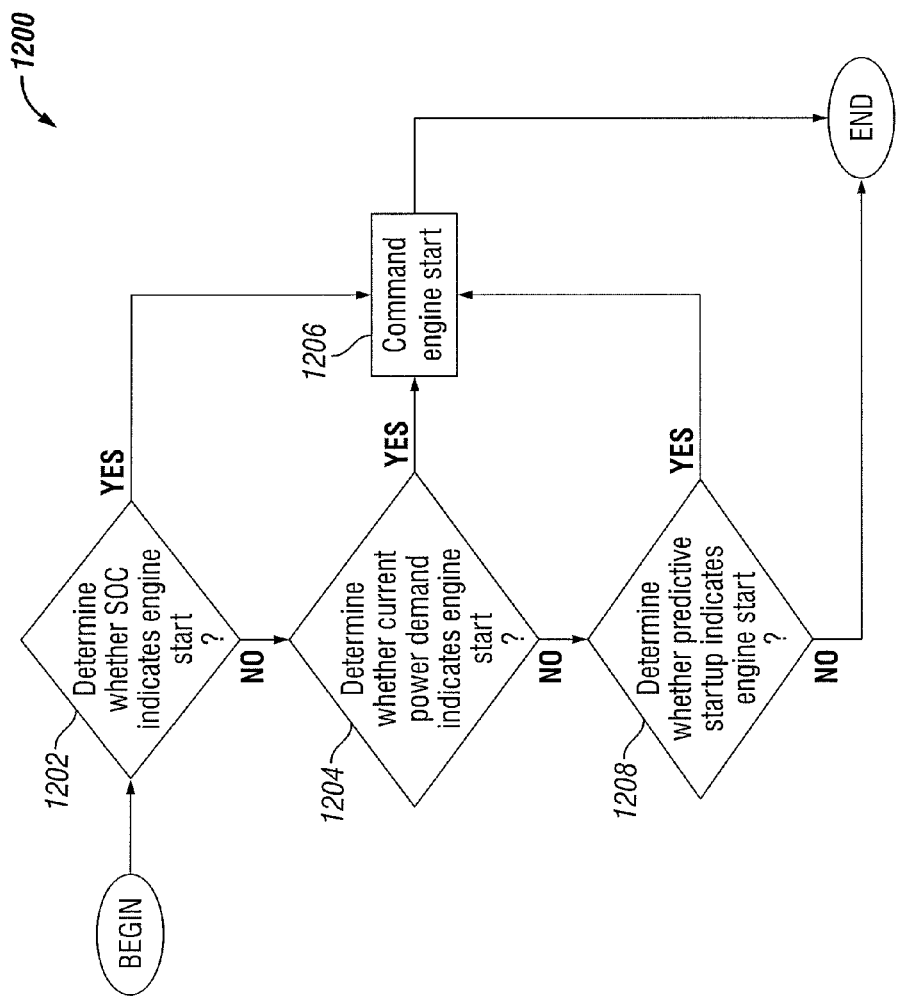
FIG. 12 is a schematic flow diagram of an operation to start an engine of a hybrid power train.

FIG. 12 is a schematic flow diagram of an procedure 1200 to start an engine of a hybrid power train. The procedure 1200 includes an operation 1202 to determine whether a SOC of the battery indicates an engine start is desired. In response to the operation 1202 being YES, the procedure 1200 includes an operation 1206 to command the engine start. In response to the operation 1202 being NO, the procedure 1200 includes an operation 1204 to determine whether the current power demand indicates that an engine start is desired. In response to the operation 1204 being YES, the procedure 1200 includes an operation 1206 to command the engine start. In response to the operation 1204 being NO, the procedure 1200 further includes an operation 1208 to determine whether a predictive startup indicates an engine start. In response to the operation 1208 being YES, the procedure 1200 includes an operation 1206 to command the engine start.

Figure 13:
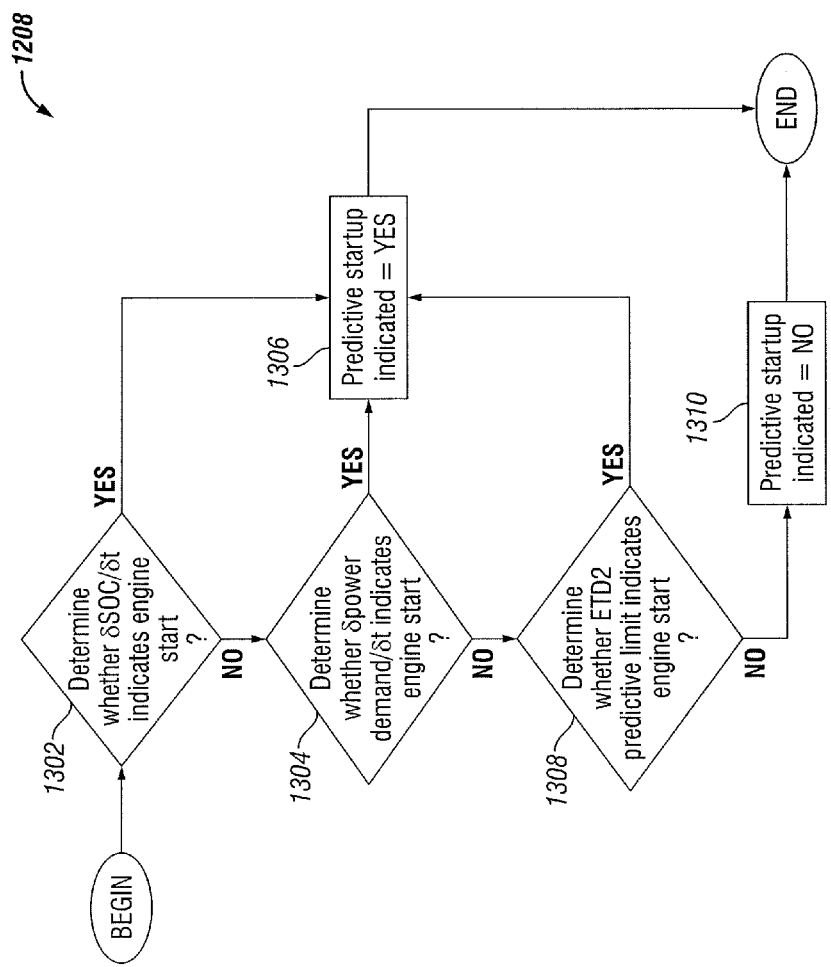
FIG. 13 is a schematic flow diagram of an operation to determine whether a predictive startup of an engine is indicated.

FIG. 13 is a schematic flow diagram of an operation 1208 to determine whether a predictive startup of an engine is indicated. The example operation includes an operation 1302 to determine whether a time derivative (or other time based rate of change) of the SOC of the electrical storage device indicates that an engine start is indicated. In response to the operation 1302 being YES, the operation 1208 determines at operation 1306 that a predictive startup indication is YES. In response to the operation 1302 being NO, the operation 1208 includes an operation 1304 to determine whether a time rate of change of the hybrid power train power output indicates an engine start. In response to the operation 1304 being YES, the operation 1208 determines at the operation 1306 that a predictive startup indication is YES. In response to the operation 1304 being NO, the operation 1208 includes an operation 1308 to determine whether an electrical torque provider predictive limit indicates an engine start. The operation 1308 includes, for example, determining that a capability of the electrical torque provider to start the engine is reducing with time, and that the system may soon encounter an operating condition where the electrical torque provider will not have the capability to start the engine. In response to the operation 1308 being YES, the operation 1208 determines that a predictive startup indication is YES, in response to the operation 1308 being NO, the operation 1208 determines at operation 1310 that a predictive startup indication is NO.

Figure 14:
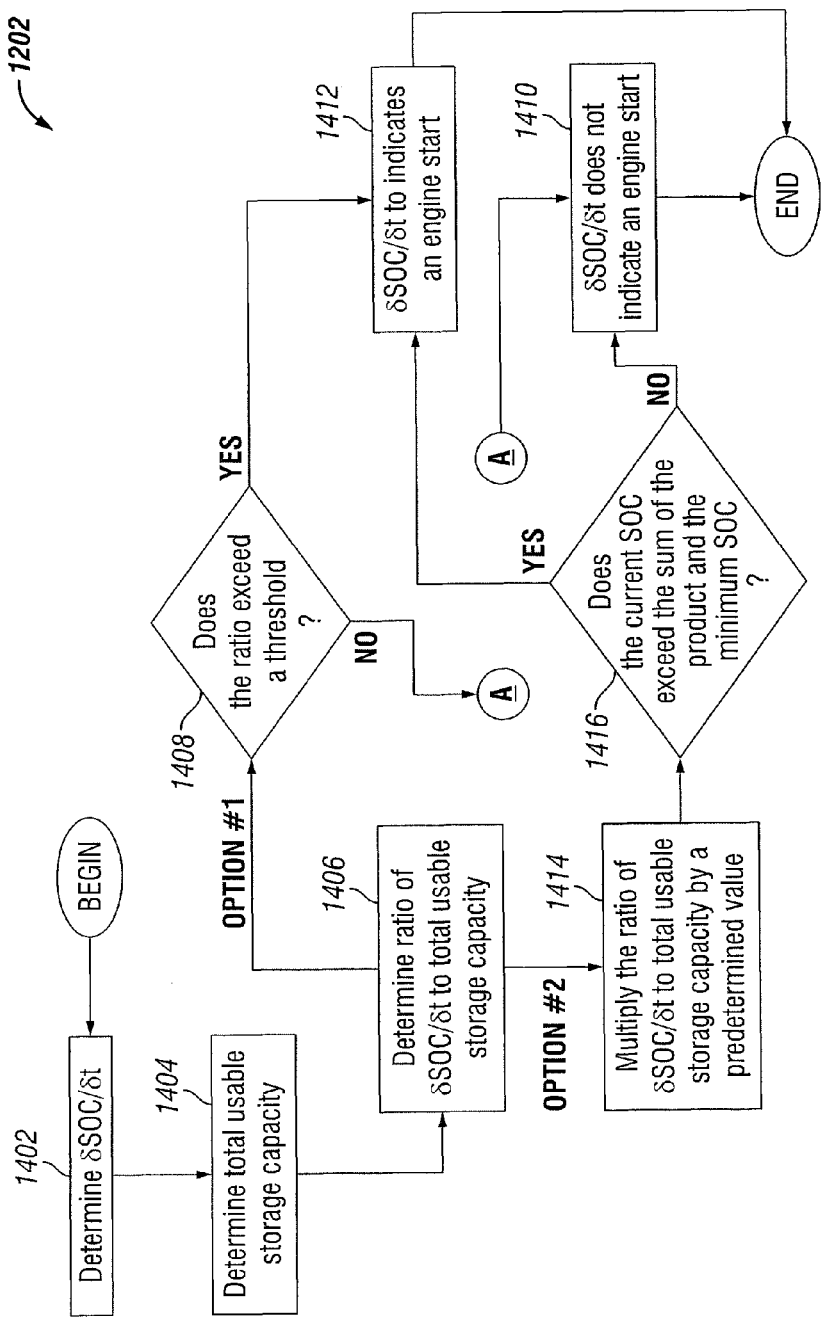
FIG. 14 is a schematic flow diagram of an operation to determine whether a rate of change of a SOC indicates a startup of an engine.

FIG. 14 is a schematic flow diagram of an operation 1202 to determine whether a rate of change of a SOC indicates a startup of an engine. The operation 1202 includes an operation 1402 to determine a time rate of change of the SOC, and an operation 1404 to determine a total usable storage capacity of the electrical storage device. The operation 1202 further includes an operation 1406 to determine a ratio of the time rate of change to the total usable storage capacity. In a first example, the operation 1202 includes an operation 1408 to determine if the ratio from 1406 exceeds a threshold value, and YES provides the operation 1412 to indicate an engine start. A NO provides the operation 1410 to indicate that an engine start is not indicated in response to the time rate of change of the SOC. In a second example, the operation 1202 includes an operation 1414 to multiply the ratio from 1406 by a predetermined value, and an operation 1416 determine whether a current SOC exceeds the sum of the product from 1414 and a minimum allowable SOC. A determination of YES from operation 1416 indicates an engine start.

In certain embodiments of the operation 1202, the δSOC/δt is filtered and/or rate limited, the thresholds of 1408, 1416 are adjusted according to a current SOH of the electrical storage device, a hysteresis is applied to the thresholds of the operation 1408, 1416 (e.g. to prevent start request toggling of the engine), and/or the multiplying in operation 1414 can be replaced with other mathematical operations, such as raising the ratio to a predetermined power.

Figure 15:
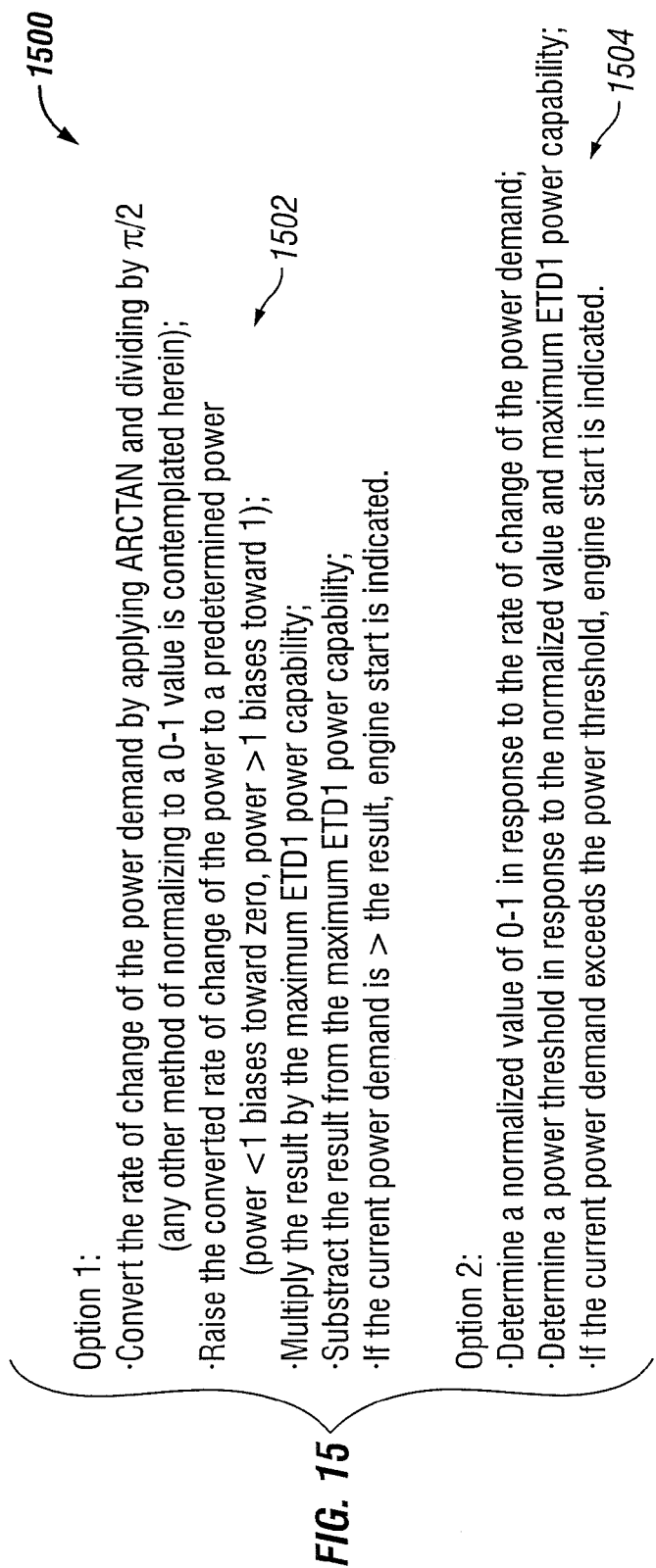
FIG. 15 is a description of an operation to determine whether a change in power demand indicates an engine start.

FIG. 15 is a description of an operation 1500 to determine whether a change in power demand indicates an engine start. In certain embodiments, the operation 1500 may be utilized in the procedure 1204.

The example operation 1500 includes a first option 1502, where the rate of change of the power demand is normalized, for example to a 0-1 value, by the described operation or any other method. The option 1502 includes raising the converted rate of change op power to a predetermined value, multiplying the result by a maximum power capability of the first electrical torque device, and subtracting the result from the maximum power capability of the first electrical torque device. If the current power demand is greater than the result, an engine start is indicated.

The operation 1500 includes an additional or alternative option 1504, which includes determining a normalized value from 0-1 from the rate of change of the power demand, determining a power threshold from the normalized value and a maximum power capability of the first electrical torque device, and indicating an engine start of the current power demand exceeds the power threshold. In certain embodiments, the rate of change of the power demand may be filtered or rate limited, and/or a hysteresis value may be applied to the power demand thresholds which indicate engine starting and stopping.

Figure 16:
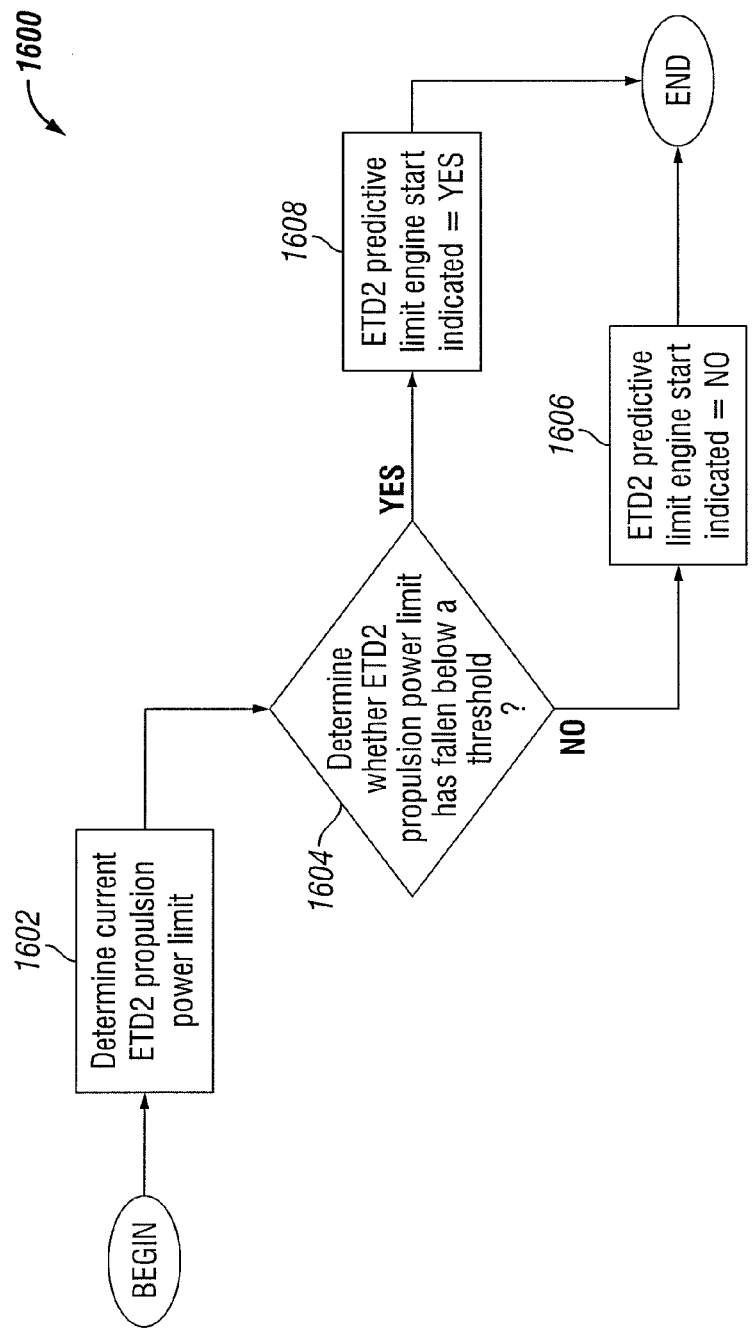
FIG. 16 is a schematic flow diagram of an operation to determine whether a second electrical torque provider predictive limit indicates a startup of an engine.

FIG. 16 is a schematic flow diagram of an operation 1600 to determine whether a second electrical torque provider predictive limit indicates a startup of an engine. In certain embodiments, the operations 1600 may be utilized in a procedure 1200.

The operation 1600 includes an operation 1602 to determine a current second electrical torque provider propulsion power limit (e.g. available power that is not required to operate accessories, etc.), and operation 1604 to determine whether the current second electrical torque provider propulsion power limit has fallen below a threshold. If the operation 1604 is YES, then the operation 1608 sets the predictive limit engine start to YES, and if the operation 1604 is NO, then the operation 1606 sets the predictive limit engine start to NO.

In certain additional or alternative embodiments, a hysteresis value is applied to the threshold, e.g. to prevent request toggling. In certain embodiments, the rate of change of the second electrical torque provider propulsion limit with time, the rate of change of the propulsion limit to the relative magnitude of the current propulsion limit and/or to the relative magnitude of the maximum propulsion limit may be utilized to set the engine predictive start value. Other values that may be utilized to set the engine predictive start value include the rate of change of the second electrical torque provider propulsion limit with time relative to the machine power demand, a threshold power limit determined from the machine power demand and an incremental power required for engine start, and/or a threshold power limit from a calibration based on engine size and/or other starting effort indicator.

FIG. 17 is a description of a rule-based controller operation 1700. In certain embodiments, the rule-based controller operation 1700 is utilized when machine power demand is greater than zero. In the described operations, the ETD1 is a first electrical torque provider, and the ETD2 is a second electrical torque provider. The engaged clutch logic may be substituted with parallel operation of the hybrid power train, and the disengaged clutch logic may be substituted with series operation of the hybrid power train.

Figure 18B:
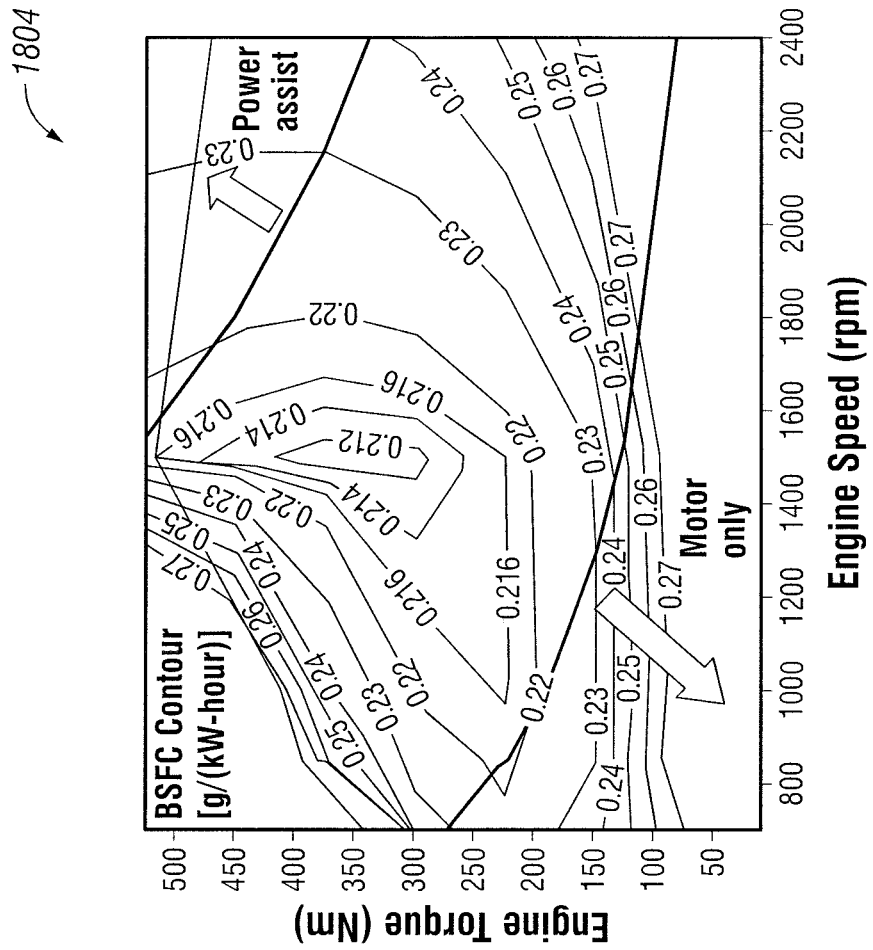
FIGS. 18A-18B are schematic diagrams of a rule-based controller operation.
Figure 18A:
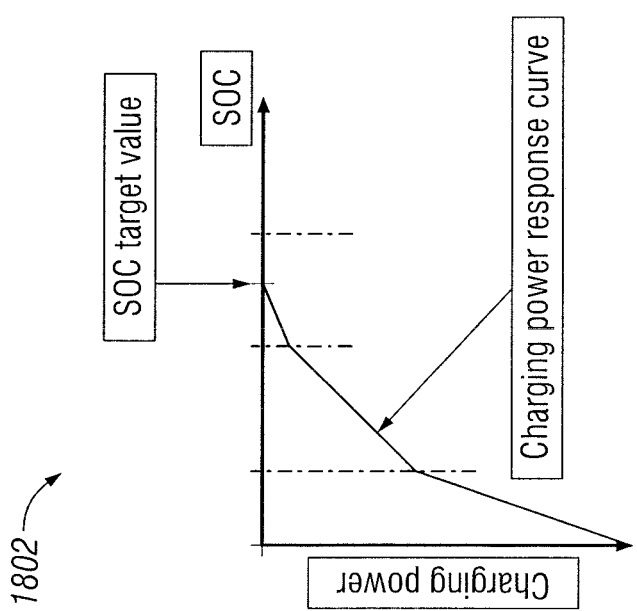

FIG. 18A provides an illustrative charging curve 1802 describing charging power applied to a battery based upon the current SOC relative to a SOC target value. In the example, the charging effort increases as the batter gets further from the target SOC. The example curve 1802, or any other charging effort curve, may be utilized with any feature, algorithm, or embodiments described herein. In FIG. 18B an example operating space diagram 1804 illustrates a speed-load map for the hybrid power train with an engine performance curve mapped onto the diagram 1804. Above a threshold operating space, approximately equating to high power operations as illustrated, an example hybrid power train is scheduled to operation in a parallel configuration with the electrical portion assisting the engine. Below a threshold operating space, approximately equating to lower power operations as illustrated, an example hybrid power train is scheduled to turn the engine off and operating electrically.

Figure 19:
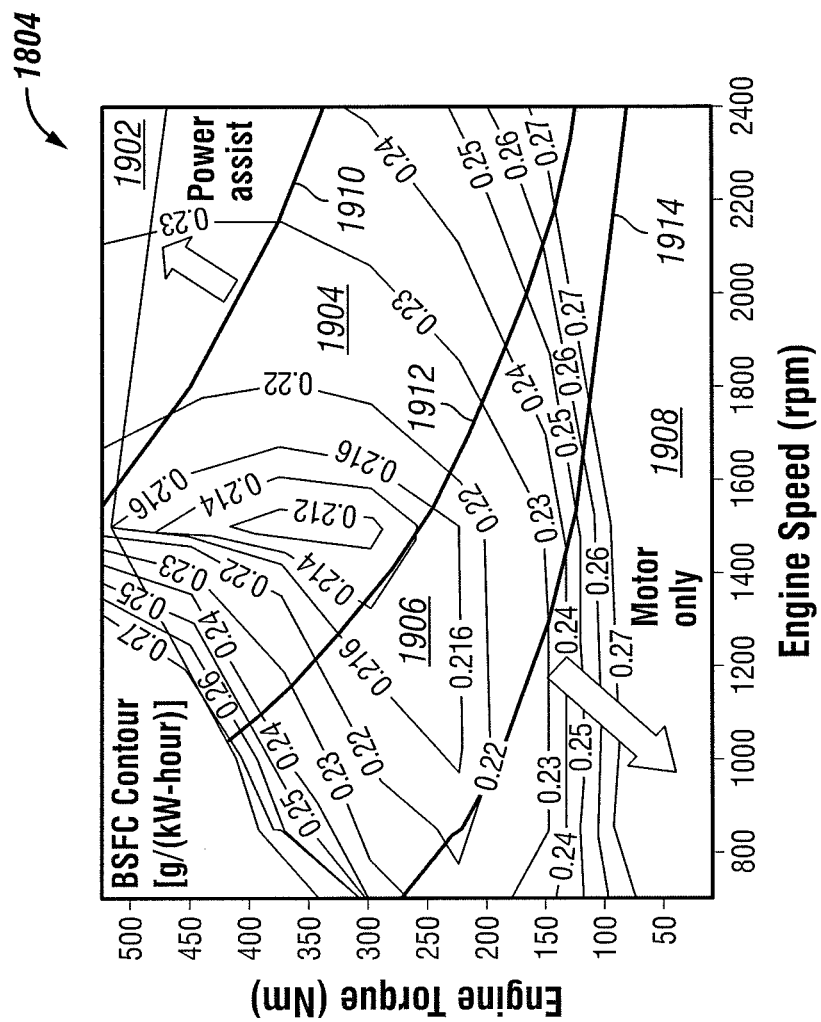
FIG. 19 is a schematic diagram of a rule-based controller to operate a clutch.

FIG. 19 is a schematic diagram of a rule-based controller including an operation space diagram 1804. The diagram 1804 is similar to the diagram 1804 from FIG. 18, although the operating dividers 1910, 1912, 1914 need not be in the same positions. At a first region 1902, the example hybrid power train operates the engine and the electric motor(s) in a power assist configuration. At a second region 1904, the example hybrid power train operates the engine and the electric motor(s) in a parallel configuration. At a third region 1906, the example hybrid power train operations in a series manner, providing all motive power from a first electrical torque provider and charging the battery from the engine as required or when it is determined to be efficient. In a fourth operating region 1908, the example hybrid power train operates on electric power only, providing charging to the battery from the engine only as required.

The example regions 1902, 1904, 1906, 1908 are non-limiting. In certain embodiments, other example operations include engaging the clutch and/or switching into a parallel configuration in response to: the engine being running, and/or the machine power demand being greater than a parallel power threshold. In certain embodiments, other example operations includes disengaging the clutch and/or switching into a series configuration in response to: the machine power demand being positive but below the parallel power threshold, the machine power demand being negative and machine shaft speed is below an engine stall threshold value. In certain embodiments, operations include applying a hysteresis in either or both directions (switching to parallel and/or switching to series), and/or applying hysteresis to regions 1902, 1904, 1906, 1908.

Figure 20:
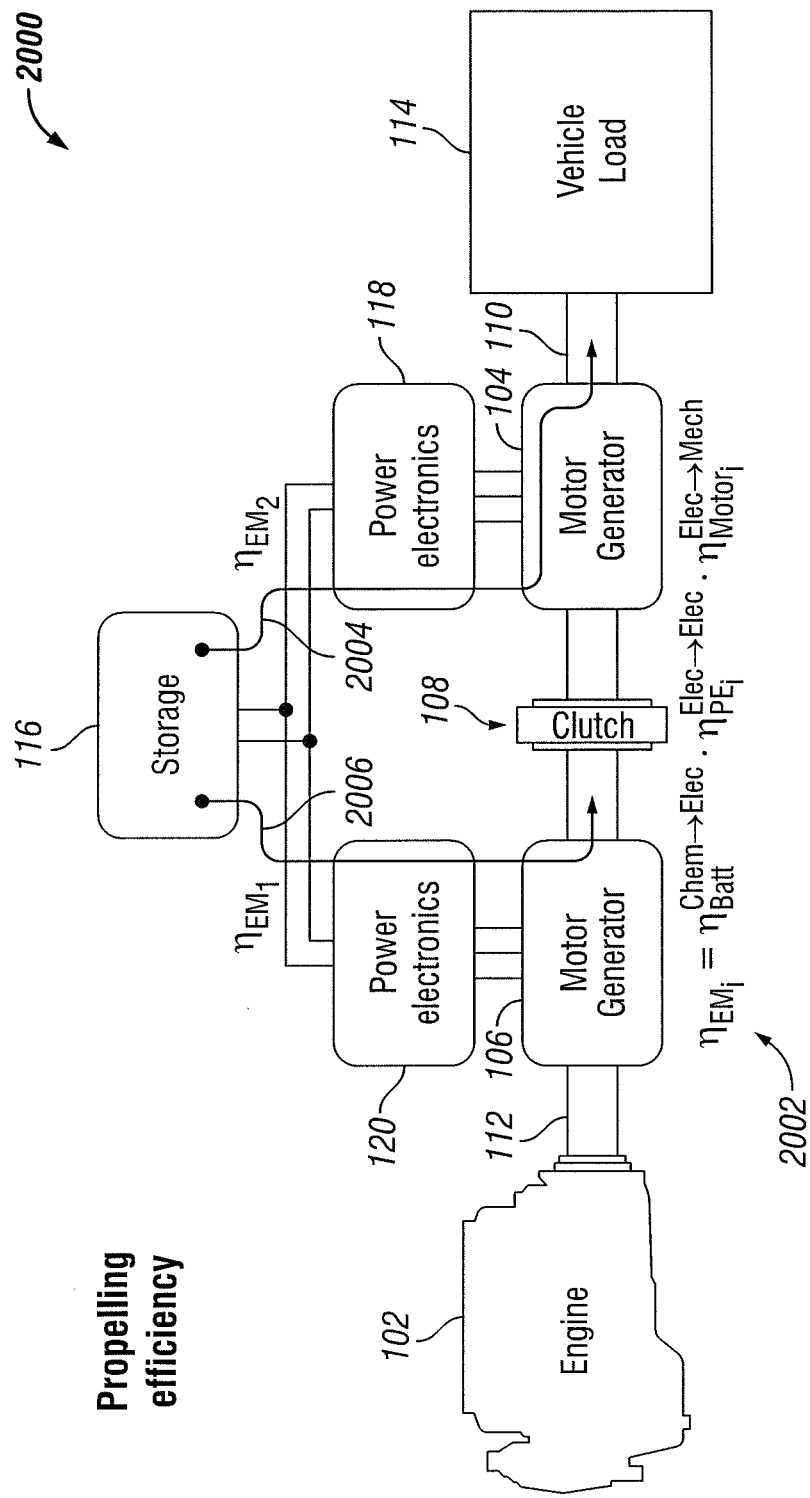

FIGS. 20-26 provide a description of a basic cost optimization function for a system including a hybrid power train. The examples of FIGS. 20-26 are illustrative and non-limiting. FIG. 20 illustrates a system 2000 and an example propulsion efficiency calculation. The efficiencies of power flows 2004, 2006 from the battery 116 to the motive power (e.g. including power electronics conversion efficiencies) are illustrated. The efficiency 2002 of each electronic torque provider includes the chemical conversion efficiency of the battery, the power electronics efficiencies, and the electrical to mechanical energy conversion efficiency of each of the motors.

Figure 21:
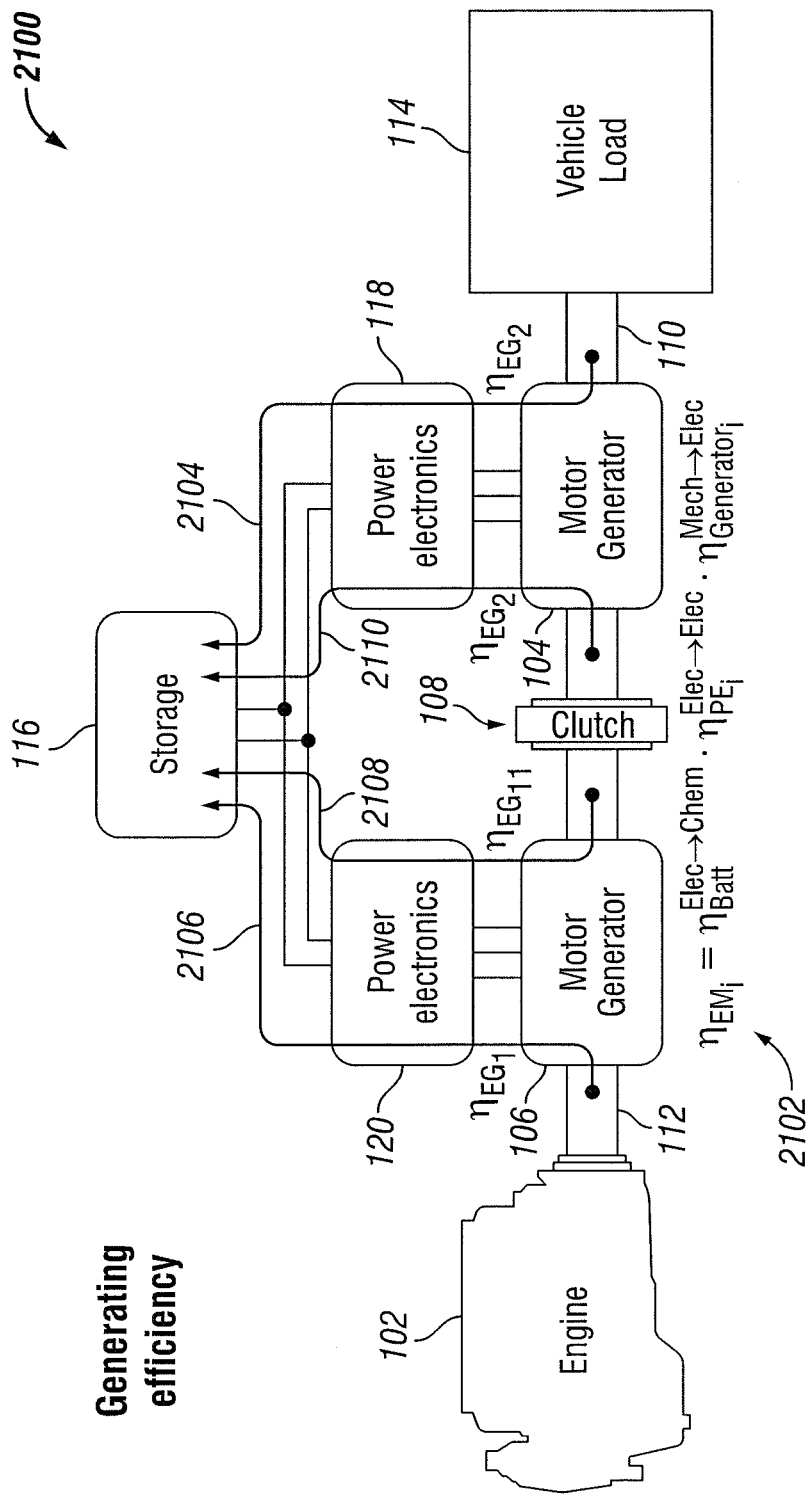
Figure 27C:
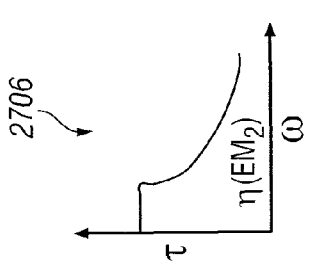
FIGS. 27A-27G are illustrations of a number of efficiency functions provided as a function of operating conditions including machine shaft speed and/or output power.
Figure 27B:
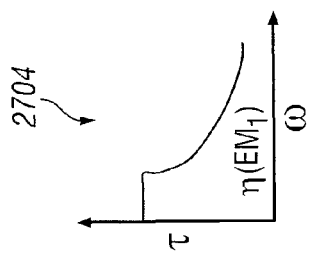
Figure 27A:
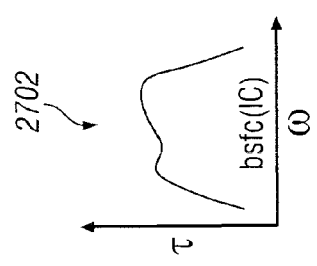
Figure 27G:
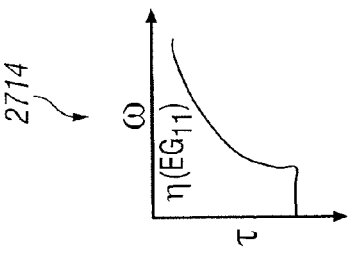
Figure 27F:
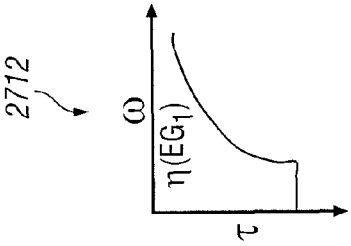
Figure 27E:
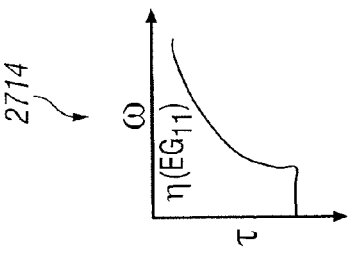
Figure 27D:
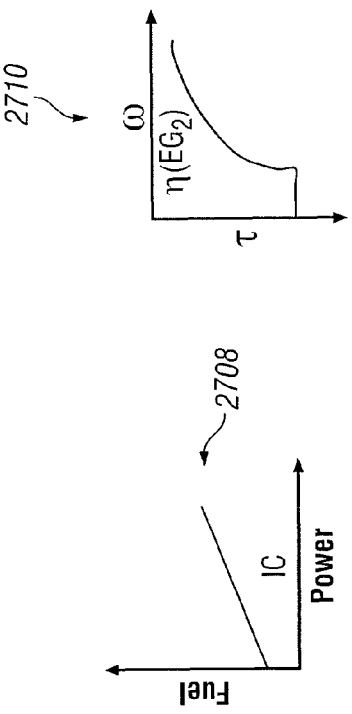

FIG. 21 illustrates a system 2100 and an example generating efficiency calculation. The efficiencies of the power flows 2104, 2106, 2108, 2110 are illustrated. In one example, the generating efficiency 2102 of each electrical torque provider is shown, accounting for the battery chemistry, the power electronics, and the mechanical to electrical conversion efficiency of each torque provider. The second electrical torque provider 120 is illustrated with a corrected efficiency $\eta_{EG11}$ to account for the friction effects of turning the engine 102 when the second electrical torque provider 120 is regenerating. However, the base efficiency $\eta_{EG1}$ may alternatively be used, where the engine 102 can be mechanically decoupled from the second electrical torque provider 120 and/or where the friction of the engine 102 is explicitly modeled.

FIGS. 22 through 26 provide an example basic optimization cost function that is utilizable to compare relative costs of specific operation behaviors. Any other cost algorithm is contemplated herein. The example calculations 2200, 2300, 2400, 2500, 2600 consider battery charging conditions, battery discharging conditions, and the entire cycle efficiency for storing and retrieving electrical energy from the battery. The following nomenclature is utilized:

$P_{Emi}$=$i^{th}$ motor net power out to mechanical shaft (+ve)
$P_{EG_i}$=$i^{th}$ generator net power in from mechanical shaft (−ve)
$\eta_{EM_i}$=$i^{th}$ motor net electrical efficiency from power source in to shaft power out
$\eta_{EG_i}$=$i^{th}$ generator net electrical efficiency from shaft power source in to electric power in Note: for $EG_1$ the efficiency is impacted in energy recovery mode (regen braking) as the engine acts as a friction load ($\eta_{EG_{11}}$)
$Q_{LHV}$=The lower heating value (also known as net calorific value, net CV, or LHV) of a fuel is defined as the amount of heat released by combusting a specified quantity (initially at 25° C. or another reference temperature)

FIGS. 27A-27G are illustrations of a number of efficiency functions 2702, 2704, 2706, 2708, 2710, 2712, 2714 corresponding to an internal combustion engine 2702, 2708, electrical torque providers in a motoring mode 2704, 2706, and the electrical torque providers in a generating mode 2710, 2712, and the combined efficiency of the second electrical torque provider in a generating mode mechanically coupled to the engine 2714. The efficiency functions are provided as a function of operating conditions including machine shaft speed for the electrical torque providers and the engine brake specific fuel consumption, and as a function of engine power for engine fuel consumption. Utilization of the system of equations of FIGS. 22-26 require efficiency values at various operating conditions, such as the efficiency values provided in FIGS. 27A-27G. Calibrated efficiency tables can be readily determined for a given real or planned system.

FIGS. 28-32 depict an illustrative embodiment 2800 for capturing the results of an analysis using an exemplary basic cost optimization function into a controller usable data set, and operating a run-time controller in response to the controller usable data set. The controller usable data set includes a behavior matrix 2802, and provides a power division description 2812, where an internal combustion engine and a number of electrical torque providers are operated in response to the power division description. The controller usable data set further includes an control interface for responding to an electrical energy storage device SOC target, and an SOC correction factor 2808 determined from the SOC target and a current SOC. In one example, the behavior matrix 2802 provides values for power output from the various devices in response to the machine power demand and/or the vehicle speed. A specific value 2804 from the behavior matrix 2802 provides the current operating point. The initial power division description is provided to the online computation 2812, that corrects for the current battery SOC correction factor ($\lambda$), for the differences in shaft speeds 2810, and for the current clutch state 2806 (or hybrid power train configuration).

Figure 29:
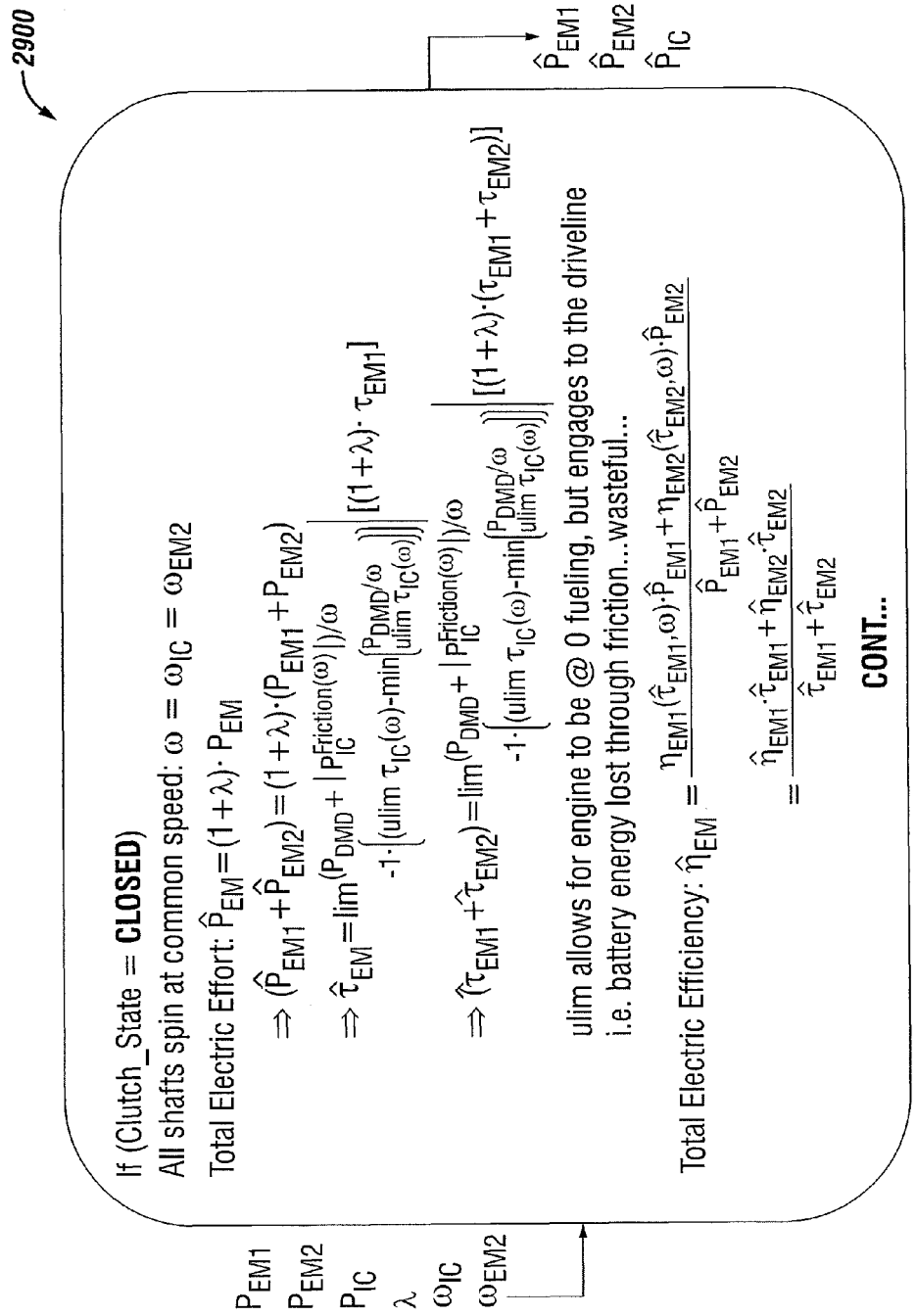
Figure 30:
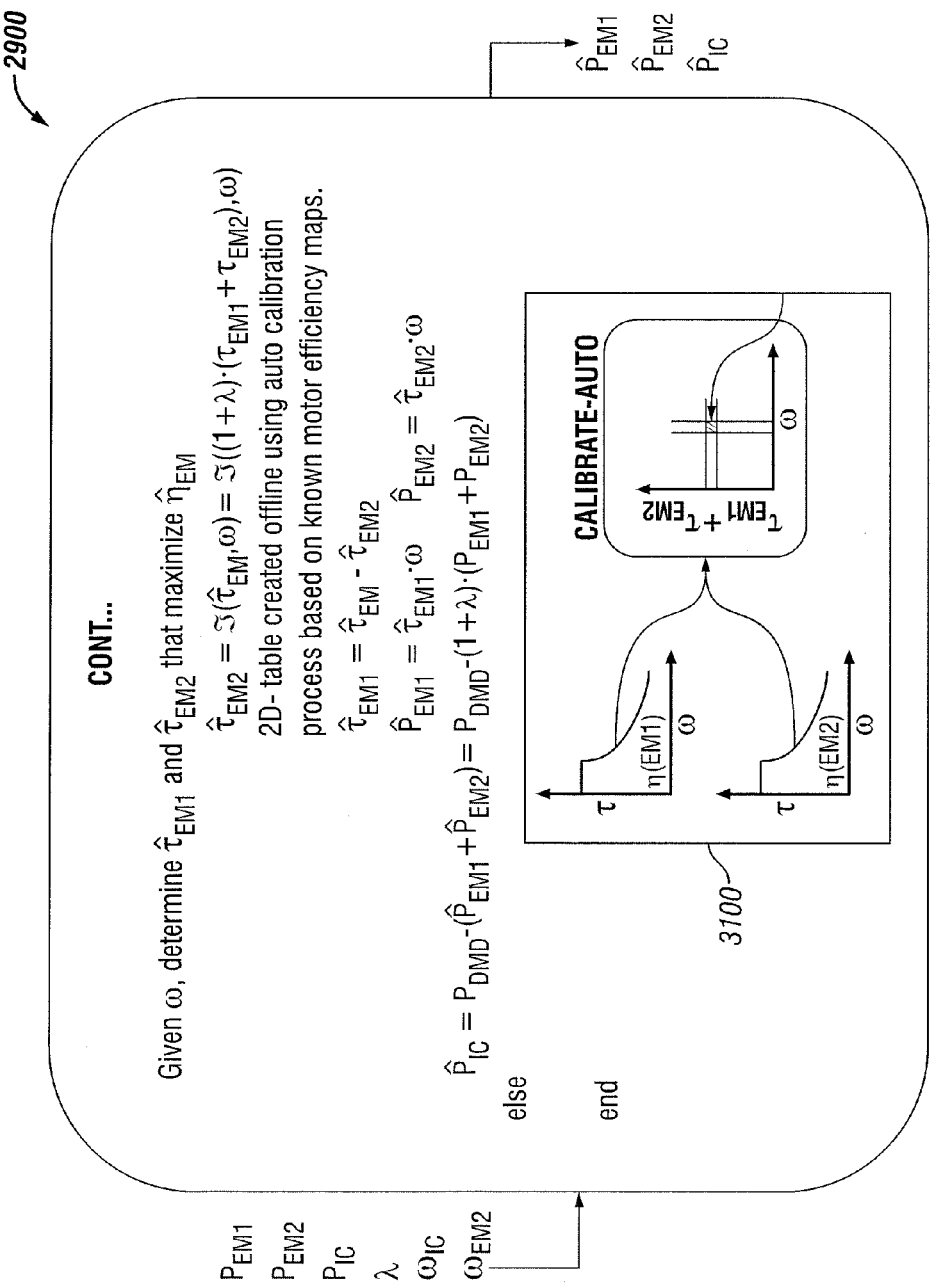
Figure 31:
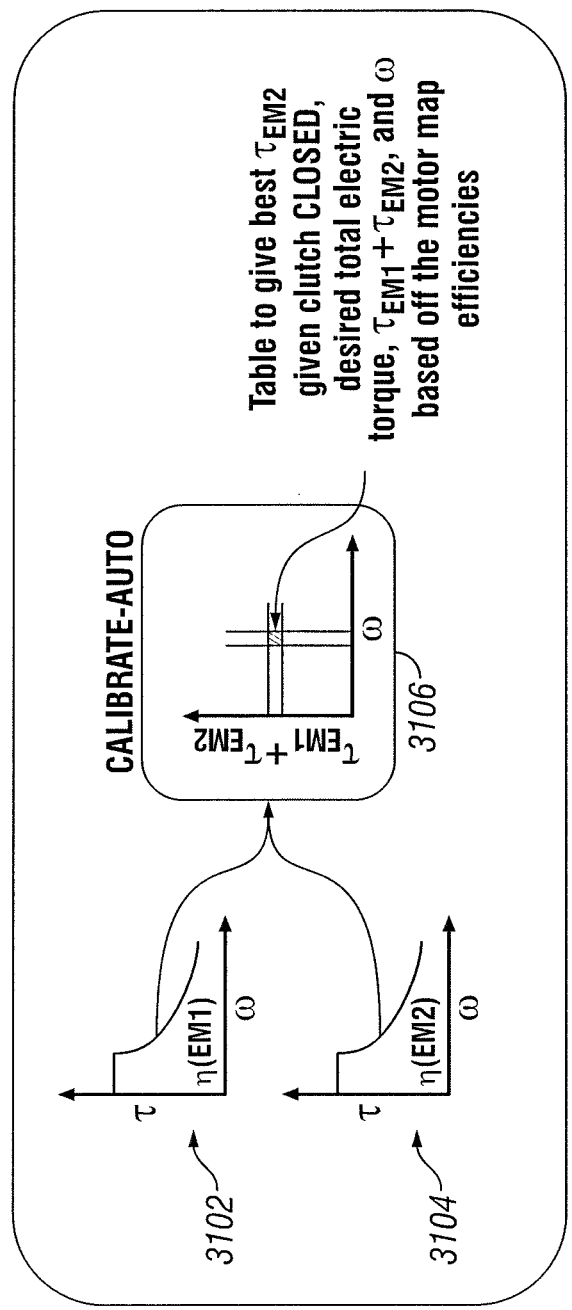
Figure 32:
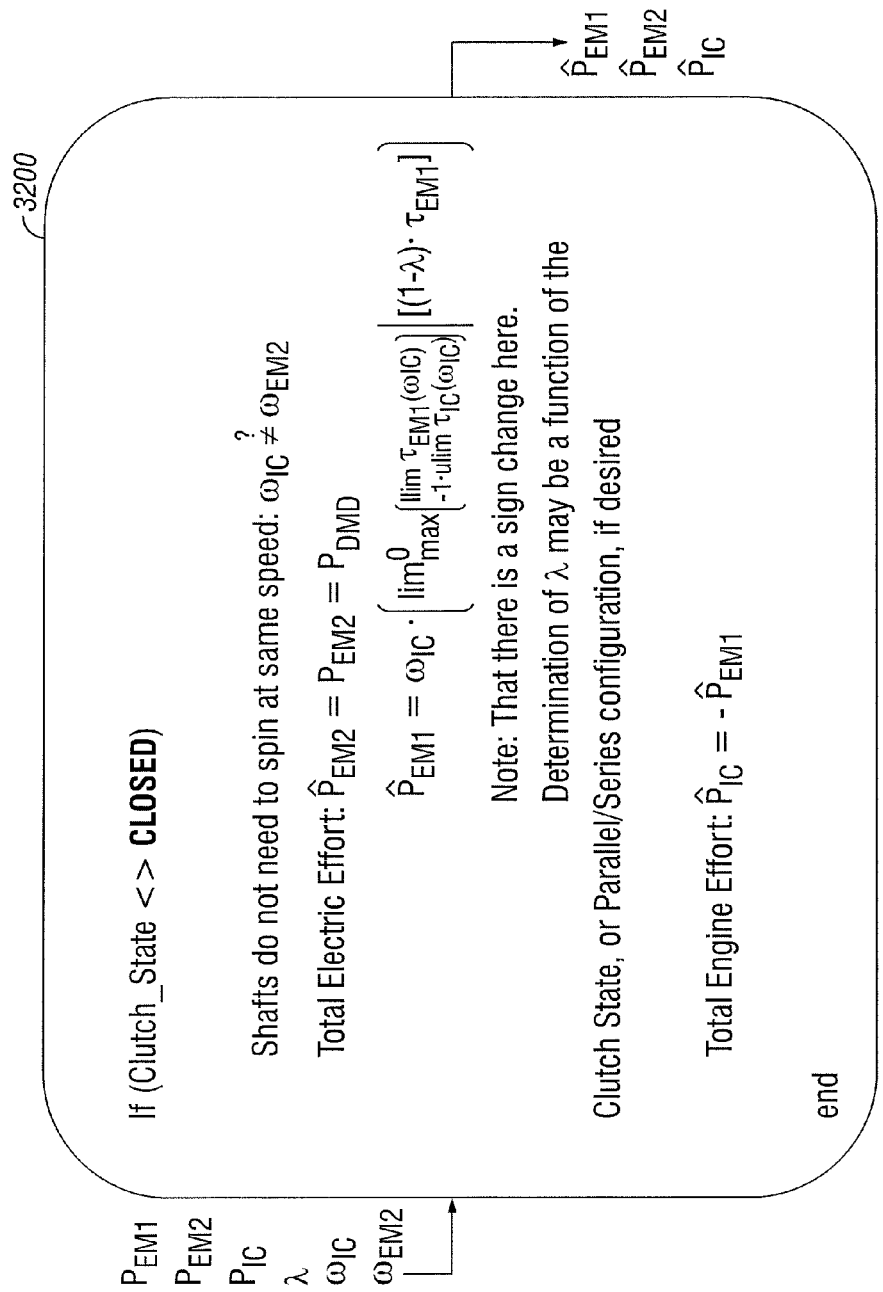

Referencing FIG. 29, the illustration 2900 includes the clutch closed (or a parallel configuration) and enforces the boundary condition that all shafts are spinning at the same speed. The best efficiency from a motoring efficiency map 3100 is utilized, for example provided by individual motoring efficiency maps 3102, 3104. If the clutch is not closed (or a series configuration), referencing FIG. 32 the illustration 3200 allows for an optimization of the total electrical effort, enforcing the condition that the electrical torque device an the load side of the clutch must provide the machine power demand, and that the engine and the electrical torque device on the engine side of the clutch must provide net zero power. The $\lambda$ value in FIG. 32, which allows for variable system response with regard to the SOC variation, may itself be a function of the series-parallel state of the system, and/or the clutch position.

Figure 33:
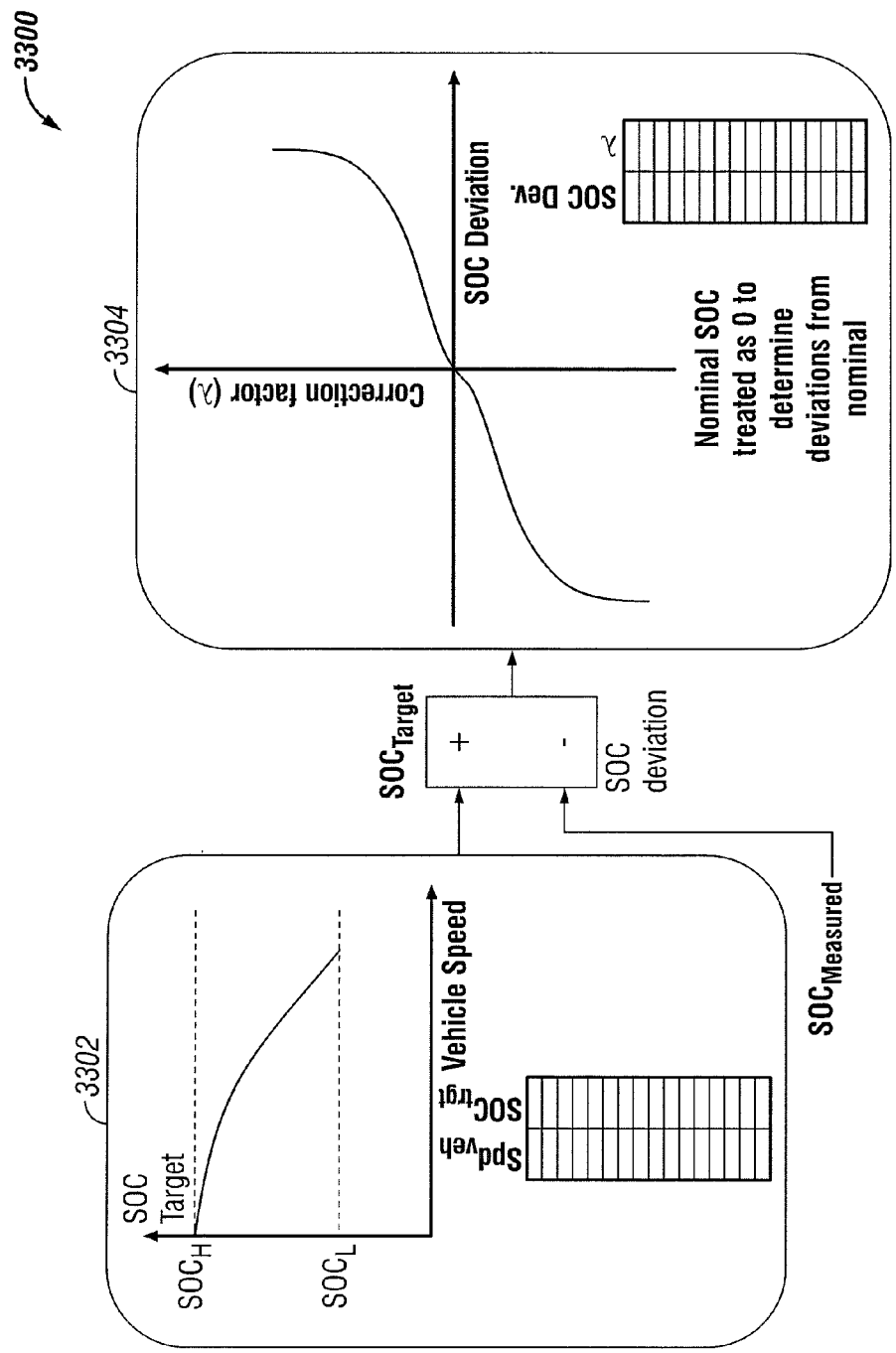
FIG. 33 depicts an example operation to determine a λ value to provide a variable system response to a SOC offset.
Figure 34:
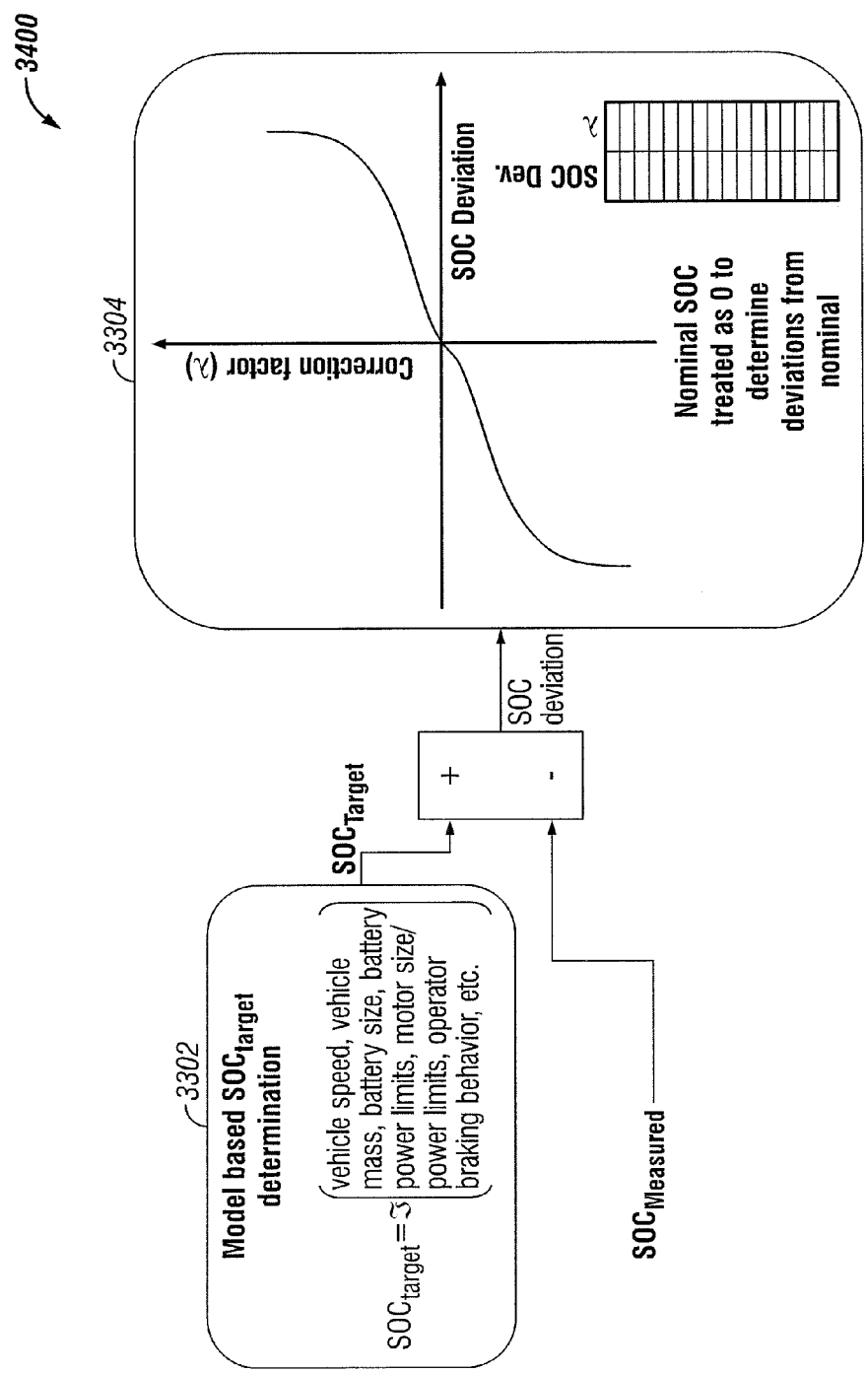
FIG. 34 depicts another example operation to determine a λ value to provide a variable system response to a SOC offset.
Figure 35:
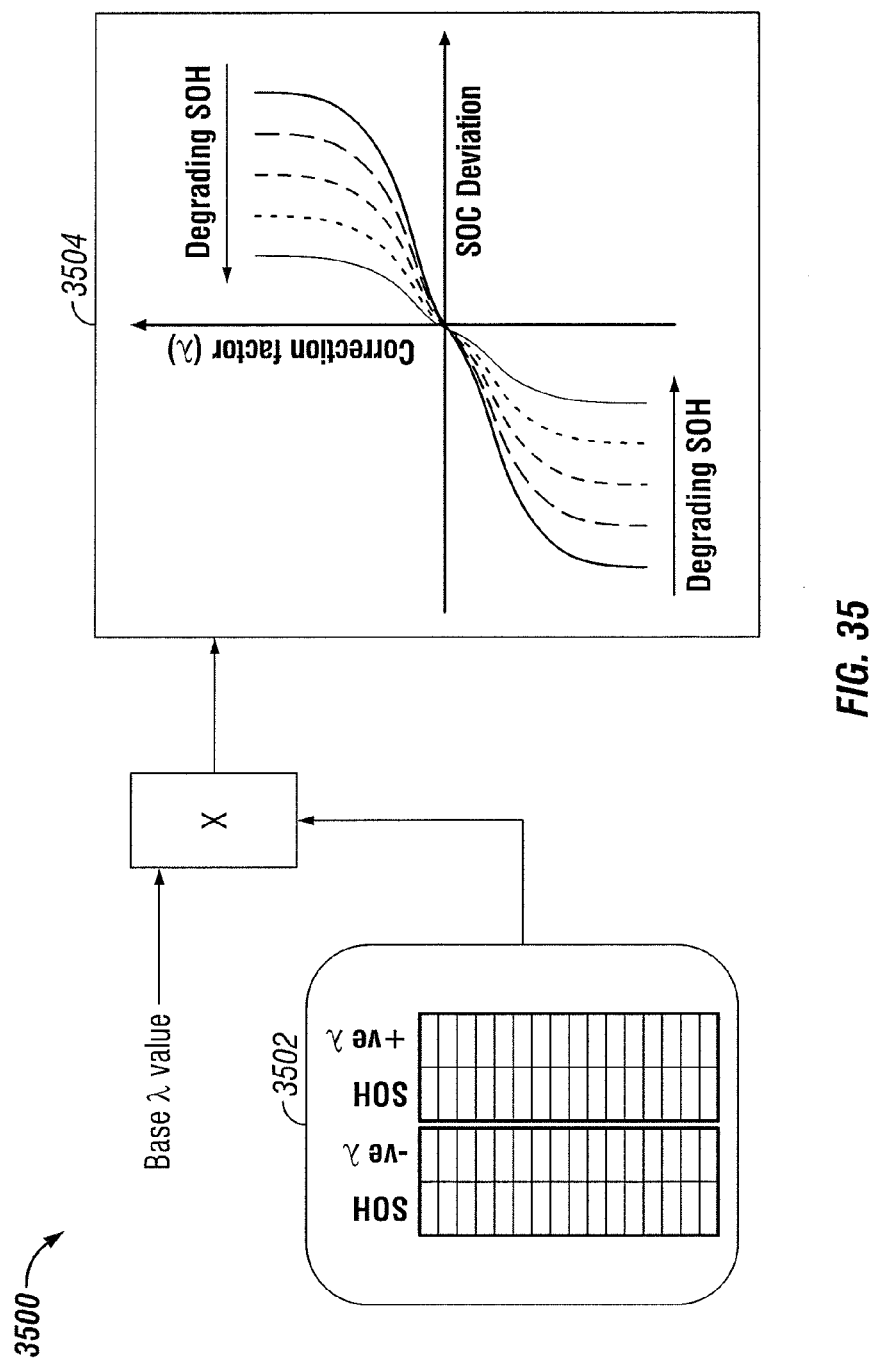
FIG. 35 depicts another example operation to determine a λ value to provide a variable system response to a SOC offset.
Figure 36:
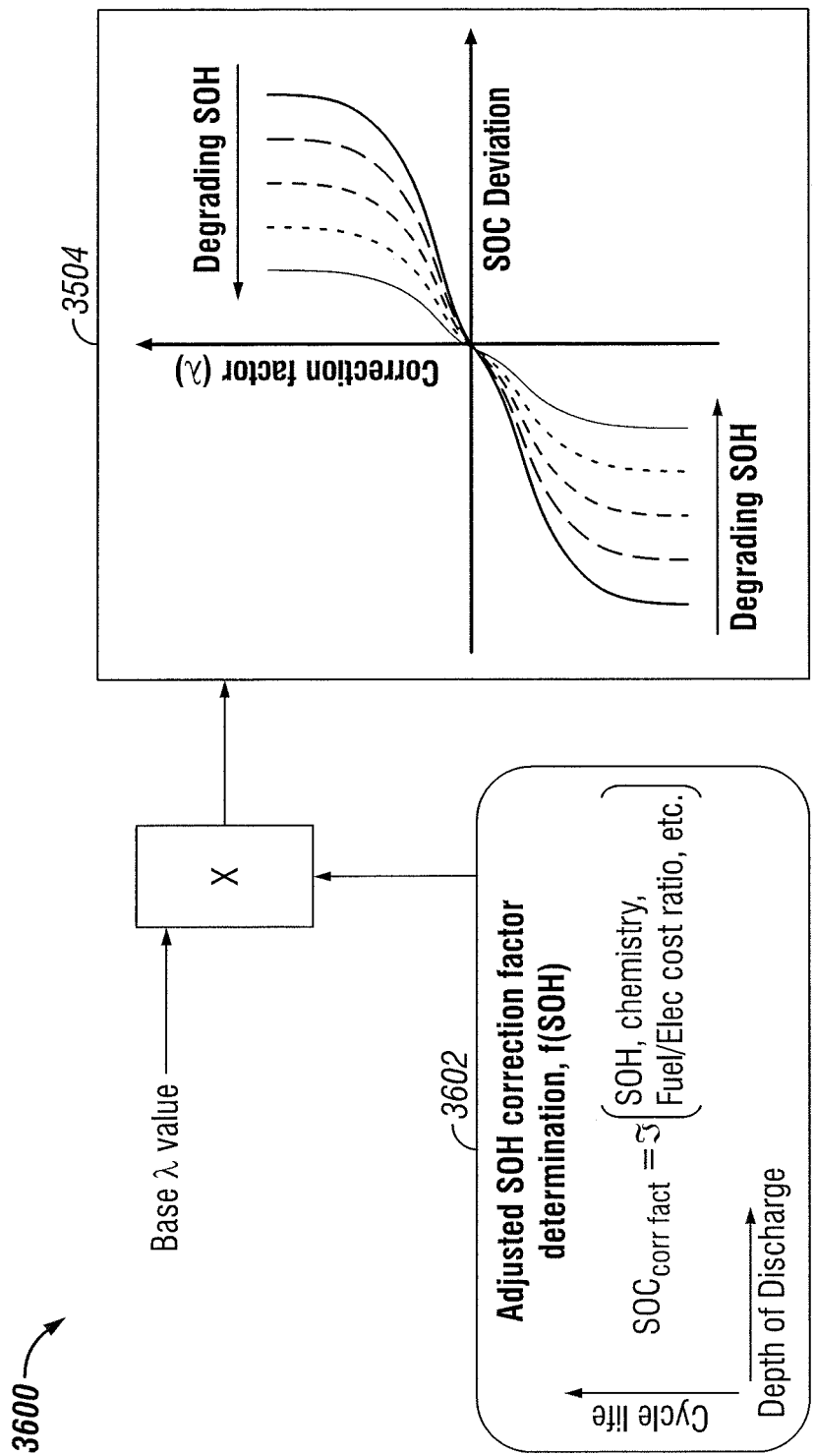
FIG. 36 depicts another example operation to determine a λ value to provide a variable system response to a SOC offset.

Referencing FIG. 33, a $\lambda$ correction value 3300 determined in response to a SOC correlation 3302 is illustrated. The $\lambda$ calculation 3304, in an example embodiment, increases non-linearly away from the target SOC (at the target SOC, the SOC deviation=zero). The positive and negative SOC deviation sides may have asymmetric $\lambda$ responses. The SOC target in FIG. 33 is determined in response to the vehicle speed. Referencing FIG. 34, the illustration 3400 provides a SOC determination in response to one or more parameters in the SOC calculation 3302. Referencing FIG. 35, in the illustration 3500 a base $\lambda$ is utilized and modified by a SOH correlation 3502 of the battery, yielding the $\lambda$ output of the correlation 3504. The base $\lambda$ value may, in one example, be determined according to the embodiments of FIG. 33 and/or FIG. 34. An example correlation 3504 includes the λ value increasing more rapidly at lower SOC deviation values in response to the SOH of the battery degrading. Referencing FIG. 36, the illustration 3600 includes the SOH correction factor correlation 3602 being a function of depth of discharge, cycle life, cost ratios of fuel and electricity, battery chemistry (e.g. more robust battery types and/or expense of the battery type may affect the desired response to SOC deviation).

Figure 28:
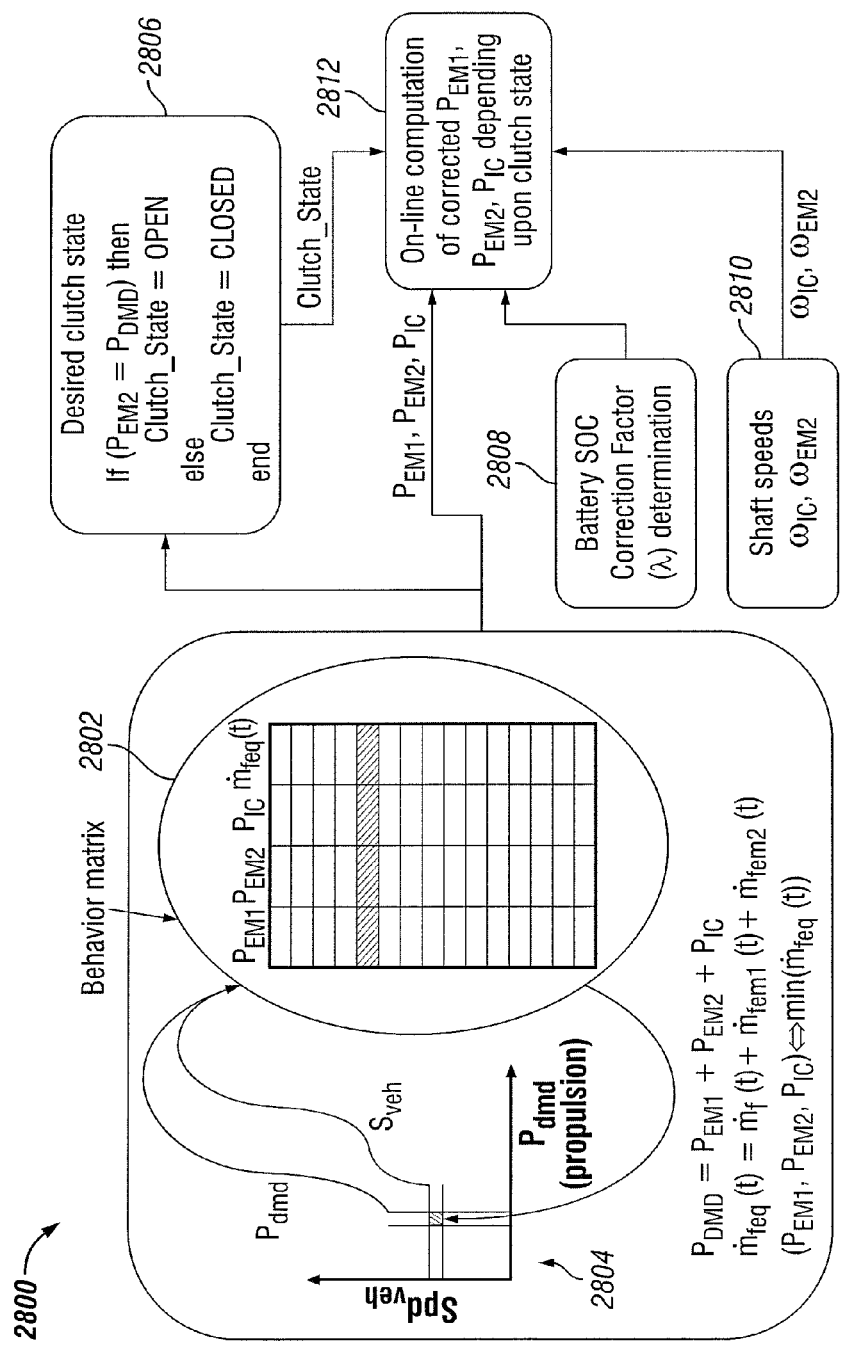
FIGS. 28 through 32 depict an illustrative embodiment for capturing the results of an analysis using an exemplary basic cost optimization function into a controller usable data set, and operating a run-time controller in response to the controller usable data set.

Referencing FIG. 28, the behavior matrix 2802 may be stored on a controller during run-time. The parameter $P_{DMD}$ is the machine power demand, $Spd_{veh}$ is the vehicle speed, machine shaft speed, or other parameter that can be correlated to efficiency data e.g. as depicted in FIG. 27. The value λ is the battery SOC correction factor that defines the strength of the system response to the SOC deviation. The clutch state can be used alternatively with series- or parallel-configuration in certain embodiments. Referencing FIG. 31, the input to 3102, 3104 is the total electrical torque contribution and machine shaft speed, and the output of 3106 is the torque contribution for one or both of the electrical torque devices. The output of 3106 can be for either device where two devices are present; where one device is defined by the load, the second device may be defined by the output of 3106.

FIGS. 37 through 43 depict an example operation to generate a controller calibration matrix. The operations in FIGS. 37 to 43 are examples and non-limiting, and may be performed offline or during down time on the controller, although a sufficiently powerful controller may alternatively run the operations of FIGS. 37 to 43 during run-time. The example operations determine an optimal or progressively improving set of behavior matrices that may be utilized as behavior matrices 2802 during run-time on a controller. In one example, a behavior matrix 2802 determined to improve the operating cost of a hybrid power train is provided to a controller as a calibration matrix.

Figure 37:
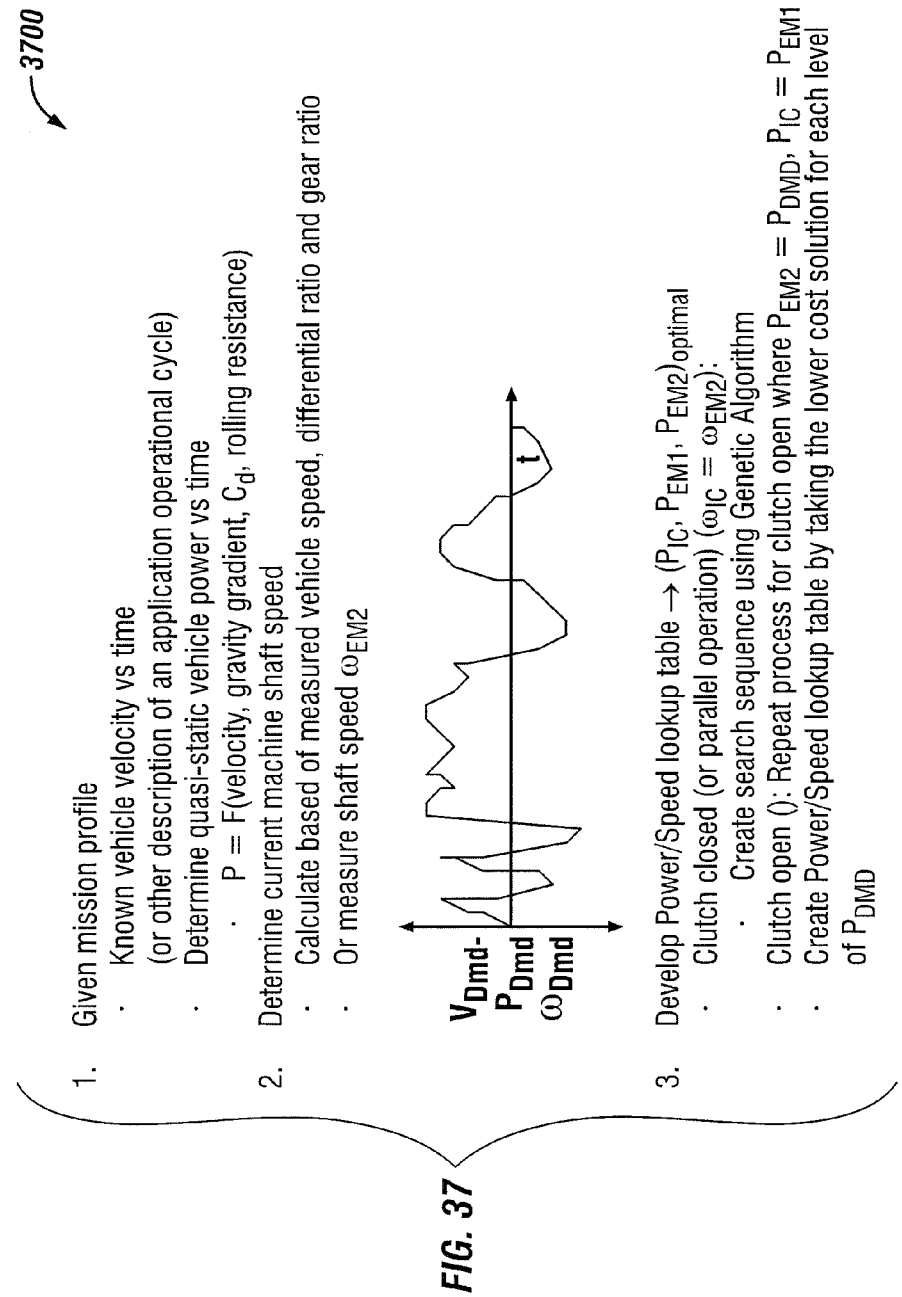
Figure 42:
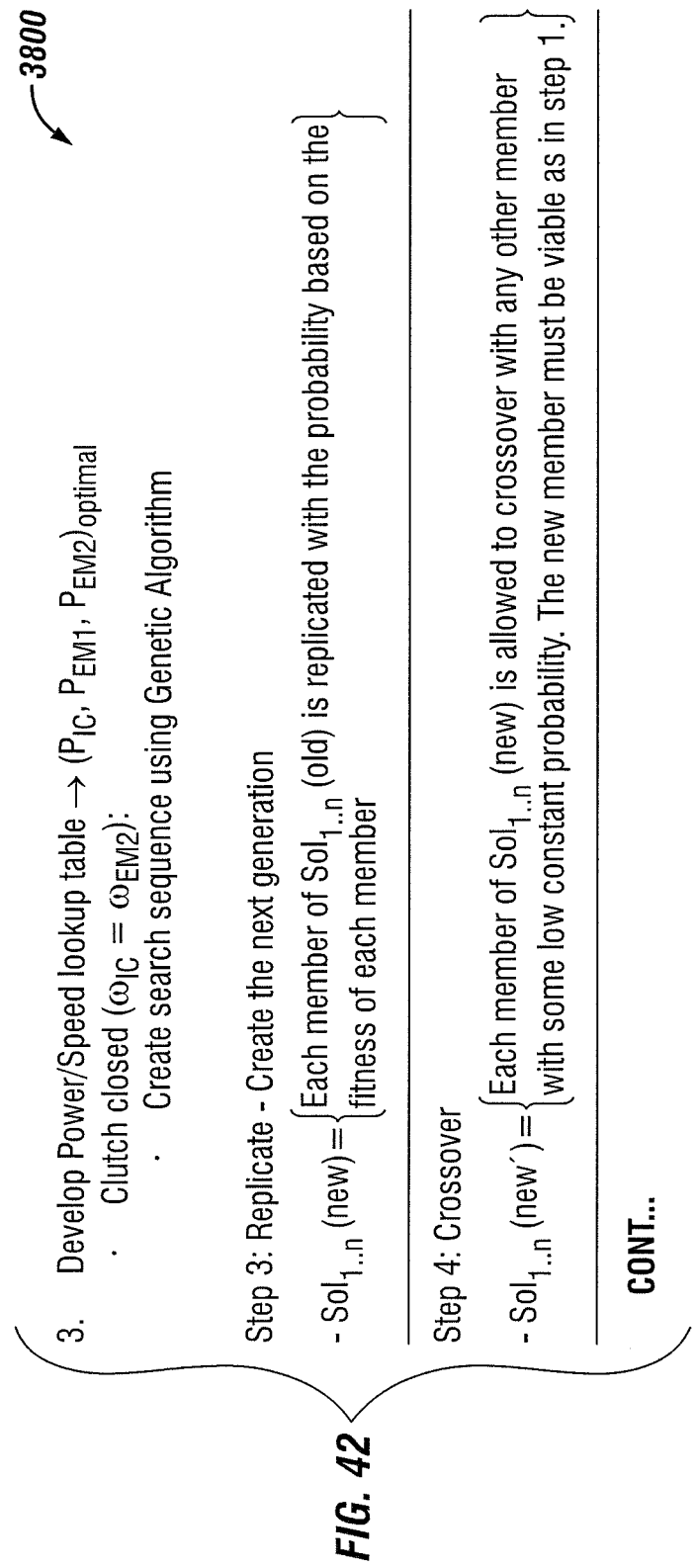
Figure 43:
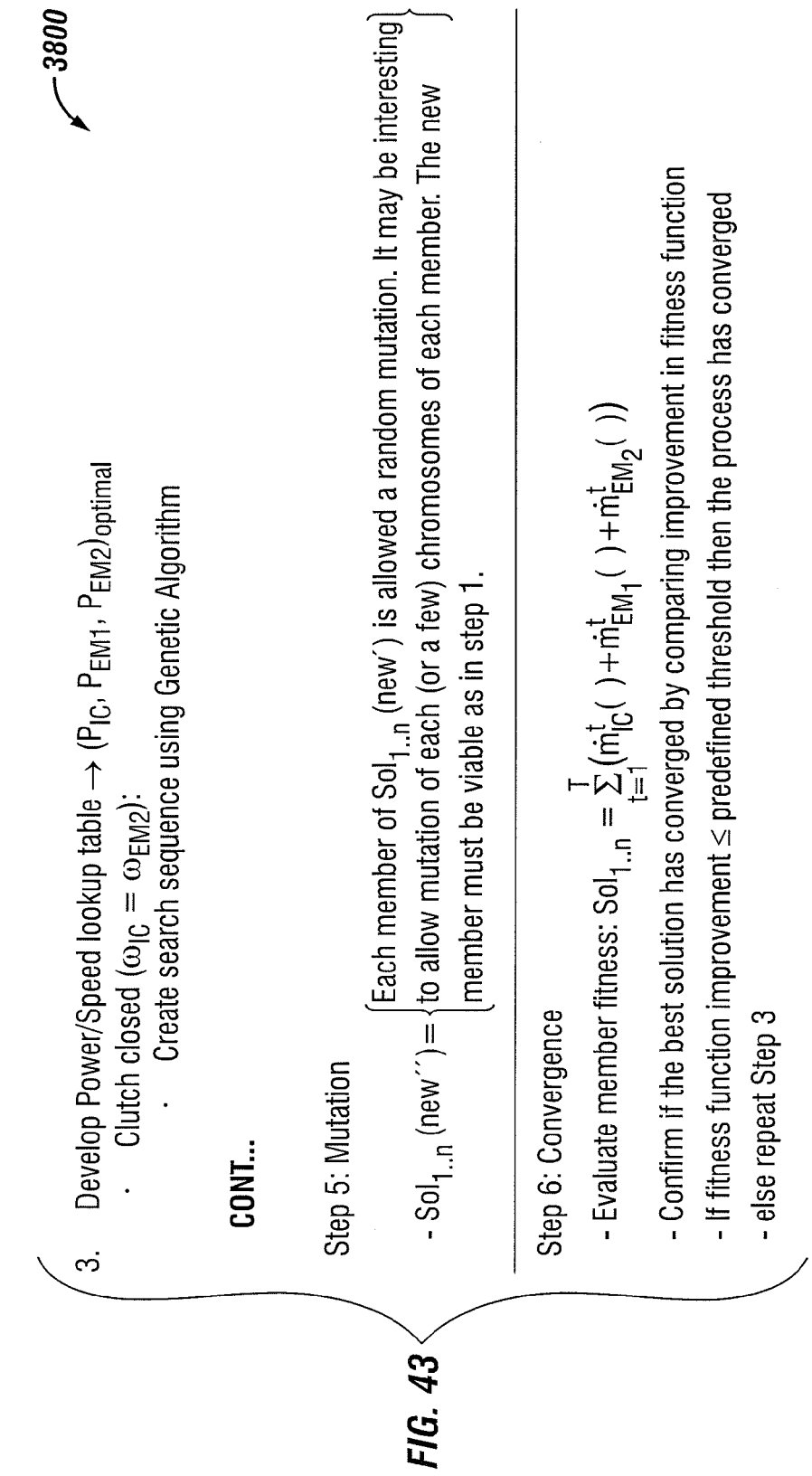

FIG. 37 is an illustration 3700 providing example operations to define a mission profile (e.g. a driving route), and to determine the machine shaft speed over the mission. The mission and shaft speeds may be data-based, planning logic, or determined in any other manner. Continuing in FIG. 38, the illustration 3800 continues with behavior matrices that are developed, either randomly, with educated guesses, utilizing previous calibration matrices, etc. Continuing with FIG. 39, the illustration includes dividing the potential power output states of the power devices into discrete operation conditions, and operating the behavior matrices through the mission, sequentially changing the behavior matrices in a genetic algorithm format, Monte Carlo format, or through any other sequencing means known in the art. Each potential solution is checked for feasibility (e.g. battery power runs too low with certain behaviors, etc.), and the most fit members of the feasible solutions are passed to the next generation. Continuing with FIG. 42, the illustration 3800 includes replicating and allowing gene crossing between members, and continuing with FIG. 43 a desired mutation rate is applied. The solutions are checked for convergence—according to any desired criteria such as a reducing improvement rate. In certain embodiments, a most fit member after convergence is determined may be provided as a calibration matrix.

Figure 44:
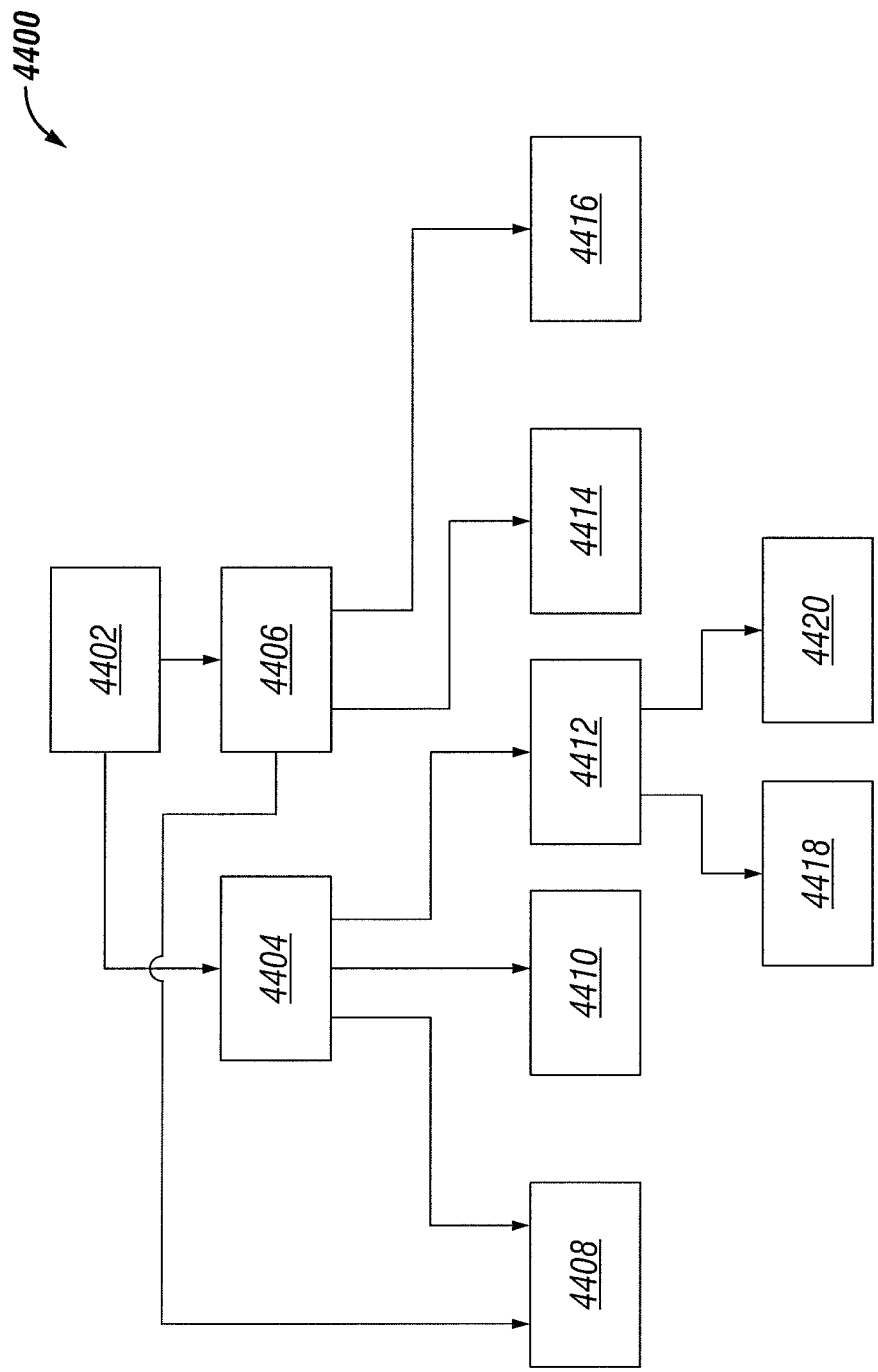
FIG. 44 illustrates an example controller rule-based runtime logic.

FIG. 44 illustrates an example controller rule-based run-time logic 4400. A machine power demand 4402 is determined. If the hybrid power train is operating in a series power mode, a transition is made to series operation 4404. If the hybrid power train is operating in a parallel power mode, a transition is made to a parallel power mode 4406. In the series power mode 4404, if a change in the machine power demand exceeds the power available on the electrical torque provider that is powering the load, the logic 4400 transitions to a parallel operating mode request 4412. From the parallel operating mode request 4412, if the parallel operating mode is not allowed, the logic 4400 transitions to a maximal power output mode 4420 for the electrical torque provider that is powering the load. It is noted at the maximal power output mode 4420 that the machine power demand is unachievable.

If the parallel operating mode is allowed at parallel operating mode request 4412, the logic 4400 transitions to parallel operation 4418. During parallel operation 4418, an example operation includes maximizing a power output of an electrical torque provider on the engine-side of the clutch, and making up any additional required power from the engine to achieve the machine power demand.

At the series operation 4404, if there is a negative change in the machine power demand present that is greater than the negative power available from the electrical torque provider that is powering the load, the logic 4400 concludes with operating mode 4410 requesting parallel operation for a negative power assist, and/or providing the electrical torque provider that is powering the load with the lowest available power.

Figure 46:
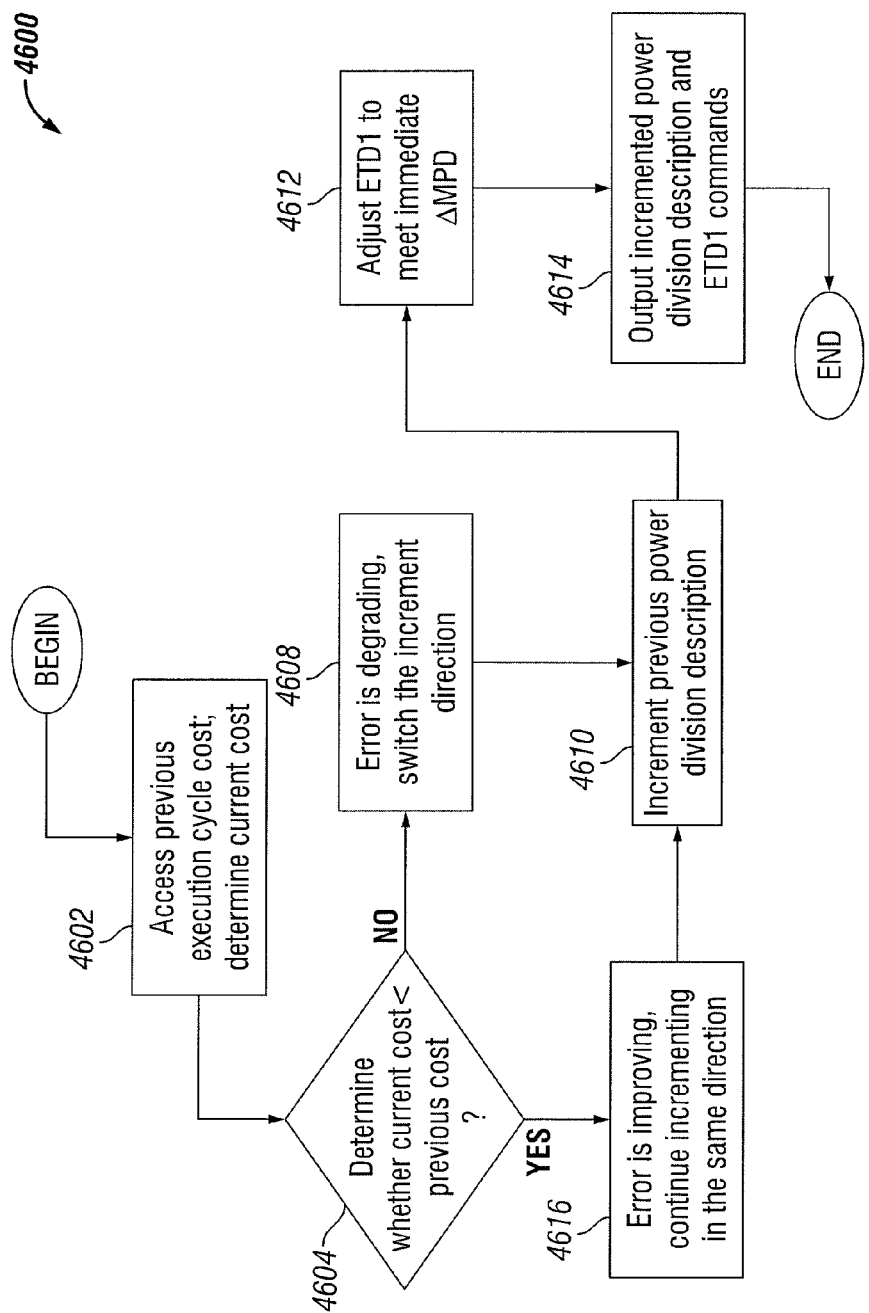
FIG. 46 is a schematic flow diagram of an operation to operate an optimizing controller.
Figure 47:
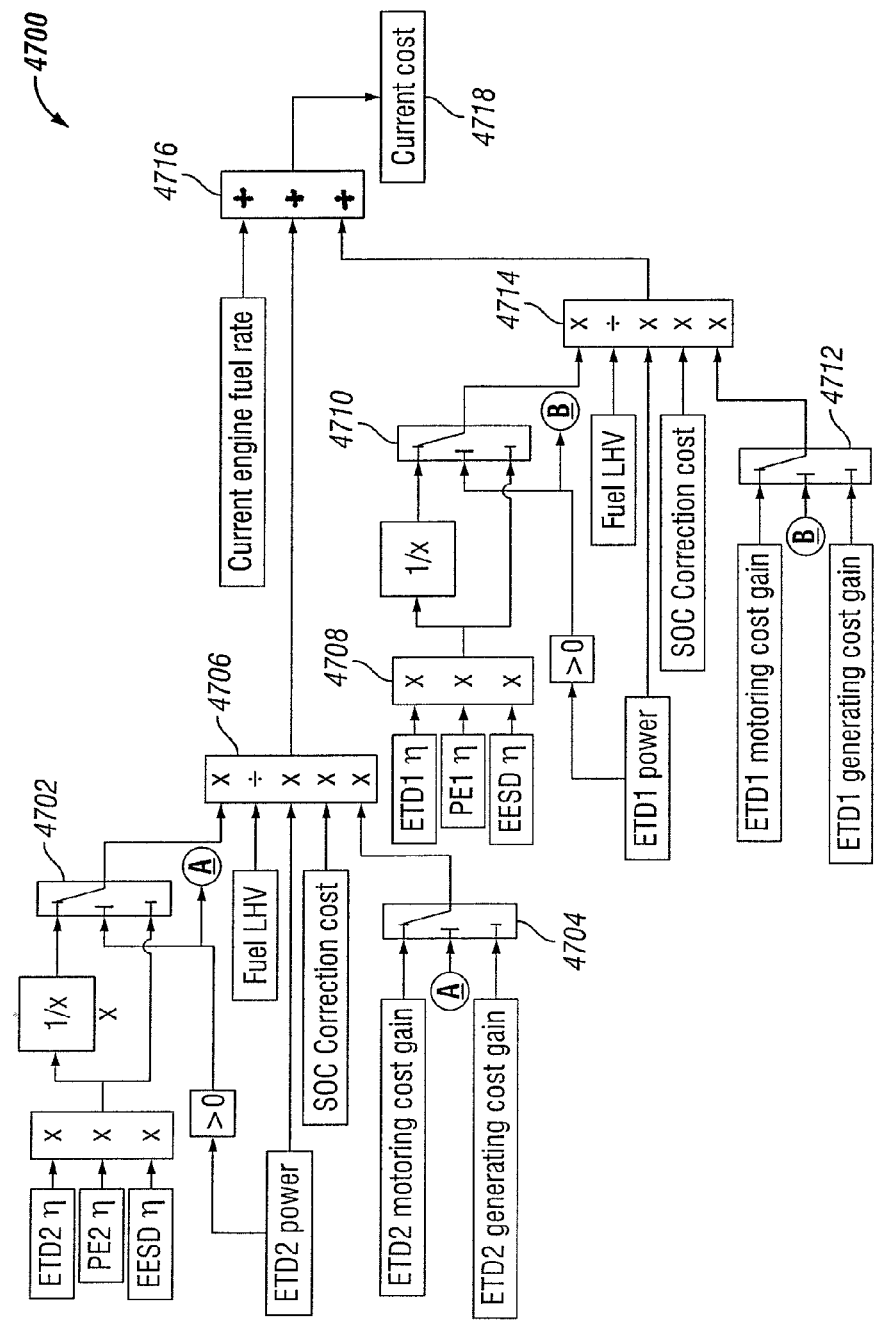
FIG. 47 is an illustration of operations for an optimizing controller.

At the series operation 4404, if the change in the machine power demand is within the capability of the electrical torque provider that is powering the load, an optimizing algorithm 4408 is executed, for example as described herein in accordance with a predetermined behavior matrix. In another example, a run-time optimization as illustrated in FIGS. 46-47 or similar operation may be performed.

At the parallel operation 4406, if a positive power demand change is requested that is greater than that available on the electrical torque provider on the load-side of the clutch, an operation 4416 includes maximizing the electrical torque provider on the load-side of the clutch, increasing or maximizing the electrical torque provider on the engine-side of the clutch, and providing the balance of the machine power demand with the engine.

At the parallel operation 4406, if a negative power demand change is requested that is greater than that available on the electrical torque provider on the load-side of the clutch, an operation 4414 includes minimizing the electrical torque provider on the load-side of the clutch, decreasing or minimizing the electrical torque provider on the engine-side of the clutch, and providing the balance of the machine power demand with the engine (e.g. down to an engine braking maximum value, if available).

At the parallel operation 4406, if a machine power demand change is requested that is less than that available on the electrical torque provider on the load-side of the clutch, the optimizing algorithm 4408 is executed, for example as described herein in accordance with a predetermined behavior matrix. In another example, a run-time optimization as illustrated in FIGS. 46-47 or similar operation may be performed.

The described operations in FIG. 44 provide an optimization routine when machine power demand changes are small and within the capability of one of the electrical torque devices to meet. The operations provide for rapid response to machine power demand changes with the opportunity to optimize operations during steadier operating periods. The operations described are illustrative and non-limiting.

Figure 45:
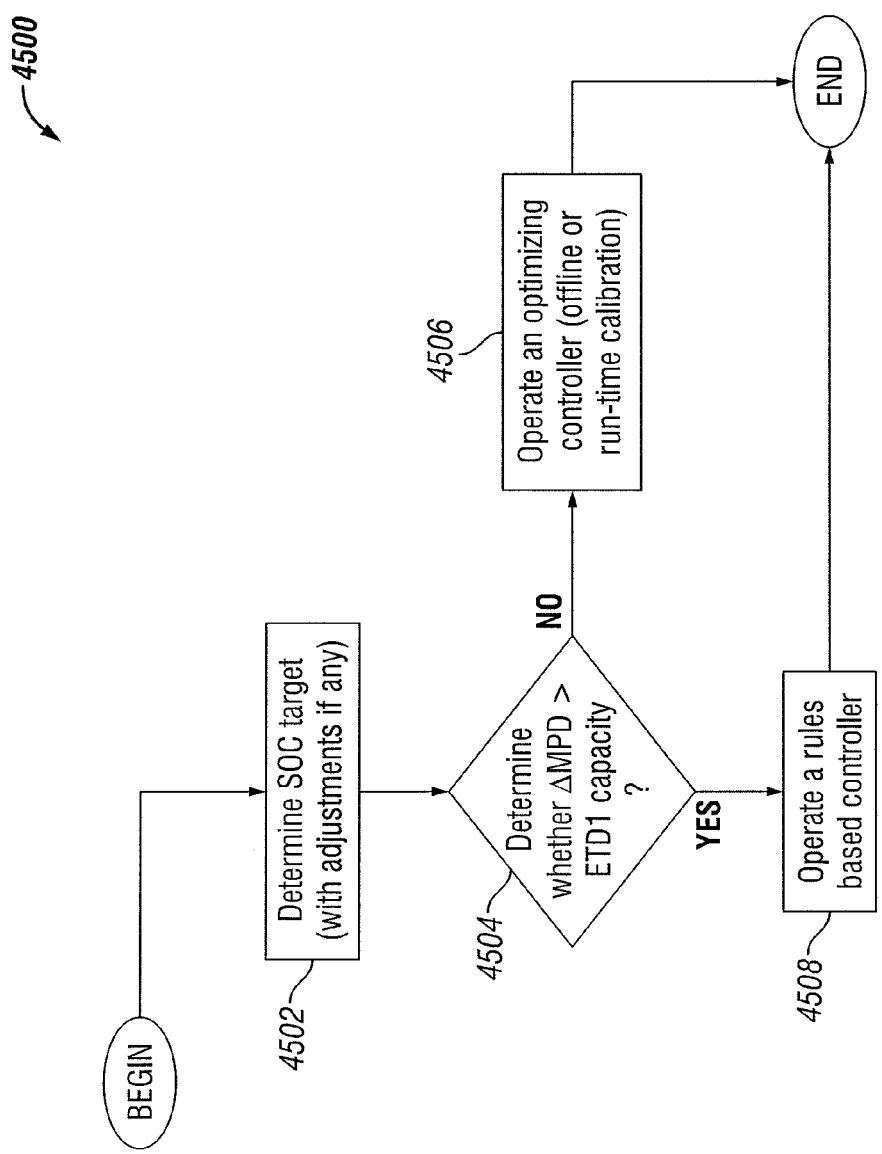
FIG. 45 is a schematic flow diagram of an operation to select a rules based controller or an optimizing controller.

Referencing FIG. 45, a schematic flow diagram of a procedure 4500 to operate an optimizing controller is illustrated. The procedure includes an operation 4502 to determine the SOC target, and an operation 4504 to determine whether a change in the machine power demand is greater than the electrical torque provider on the load side of the clutch. In response to the operation 4504 being YES, the procedure 4500 includes an operation 4508 to operate a rules-based controller (e.g. see FIG. 44, operations 4414, 4416, 4412). In response to the operation 4504 being NO, the procedure 4500 includes an operation 4506 to operate an optimizing controller—either offline calibrated (e.g. a behavior matrix) or a procedure such as in FIGS. 46 and 47.

FIG. 46 is a schematic flow diagram of a procedure 4600 to operate an optimizing controller. The operations of the procedure 4600 include accessing a previous cycle cost and determining a current cycle cost (operation 4602), determining whether the cost is increasing (operation 4604 being NO) or decreasing (operation 4604 being YES). Where operation 4604 indicates NO, the error is degrading and the increment direction (of the power division between devices, e.g.) is reversed (operation 4608), the power division is incremented (4610), the electrical torque provider on the load side of the clutch is adjusted to meet transient power demands (operation 4612), and the updated power commands in response to the power division incrementing and the transient adjustments to the electrical torque provider on the load side of the clutch are outputted (operation 4614). Where the cost is decreasing (operation 4604 being YES), the procedure includes an operation 4616 to continue incrementing the power division description in the same direction, and the concluding operations 4610, 4612, 4614. The procedure 4600 thereby "walks" the power division description into favorable cost conditions, is operable in run-time, and provides quick response to changes in the machine power demand.

In certain embodiments of FIGS. 46 and 47, operations includes applying a noise function to the increment value and/or the cost comparison value, and/or operating a closed loop controller with either the sign of the cost change, or a rate of the cost change as an error value. The closed loop controller may be P, PI, fuzzy logic, or other controller type. An example closed loop controller includes gain scheduling or other features to increase response (rate of change in the power division description) as desired, for example where the rate of change of the cost is high. In certain embodiments, increments may be applied to engine-total electric contribution split; then additional increment logic to split within the electric system, or increments applied only to engine-total electric split, with rules or efficiency lookup values (e.g. as in FIG. 31) to determine how to split the total electric contribution among ETDs (electrical torque devices).

FIG. 47 is an illustration of operations 4700 for an optimizing controller to determine a current cost 4718 of operations. The operations 4700 are usable, in one example, with a procedure 4600 such as illustrated in FIG. 46. The operations 4700 are self-explanatory, but some clarification is provided herein. The switch 4702 provides an output of the reciprocal of the total efficiency (power electronics efficiency multiplied by storage device and drive efficiencies) of the second electrical torque provider when the power of the second electrical torque provider is positive, and otherwise provides the total efficiency of the second electrical torque provider. The product block 4706 provides an equivalent fuel cost of the second electrical torque provider. The switch 4704 provides a gain value for the second electrical torque provider depending upon the motoring or generating state. The product block 4708 provides a total efficiency of the first electrical torque provider, the switch 4710 provides the total efficiency or the reciprocal thereof based on the motoring state of the first electrical torque provider, the switch 4712 provides a gain value for the first electrical torque provider depending upon the motoring or generating state, and the product block 4714 provides an equivalent fuel cost for the first electrical torque provider. The sum block 4716 outputs the equivalent fuel cost for the current operating condition of the hybrid power train.

The operations 4700 are illustrative and non-limiting. Other operations to determine a fuel cost or other cost equivalent for a hybrid power train are contemplated herein. In certain embodiments, the operation 4700 normalize to a unit-less cost value, a currency cost (e.g. $), or other selected baseline for comparison. In certain embodiments, costs for emission, audible noise, aftertreatment operations, regeneration of aftertreatment components, service life impacts to batteries or aftertreatment components, or any other cost values are determined. The SOC correction cost is determined by any method, including total charge cycle efficiency for generating and storing battery power, fuel versus regeneration estimate of future charging source (e.g. an electrical charger present at the destination), and/or a cost determined utilizing the principles in FIGS. 33-36 (e.g. SOC correction cost as $f(\lambda)$). The SOC correction cost may further include an integral term to increase the cost as a deviation persists over time. In certain embodiments, fuel LHV may include a nominal engine thermal efficiency, and/or the current engine thermal efficiency.

Figure 49A:
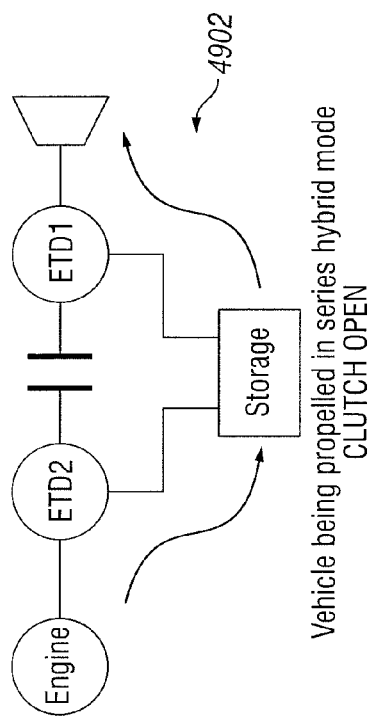
FIGS. 49A-49C are other schematic illustrations of example clutch operations.
Figure 49B:
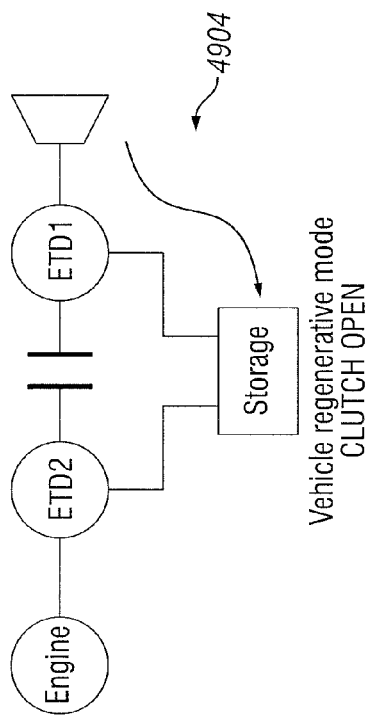
Figure 49C:
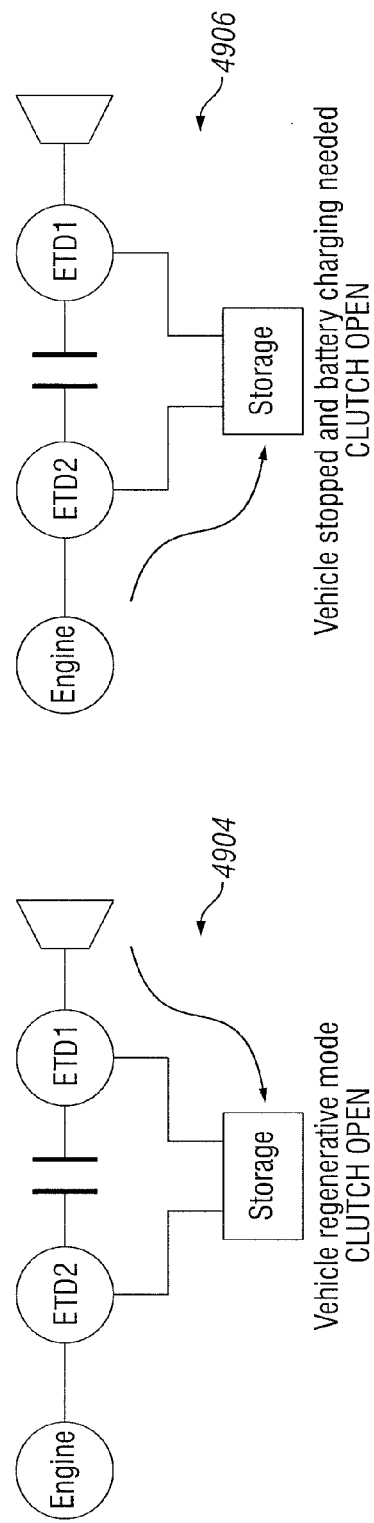

Referencing FIGS. 48A-48D example clutch operations are illustrated. In a first operation 4802, the clutch is open and the vehicle is being propelled in an all electric mode (from ETD1). In a second operation 4804, the clutch is open and the vehicle is being propelled in an all electric mode, where an engine start has been requested. In a third operation 4806, the clutch is closed and the vehicle is being propelled in a parallel operating mode from both the engine and electrical devices—the battery is discharging in the operations 4806. In a fourth operation 4808, the clutch is closed and the vehicle is being propelled in a parallel operating mode, with battery charging occurring. Referencing FIGS. 49A-49C further example clutch operations are illustrated. In an operation 4902 the clutch is open and the vehicle is being propelled in a series operating mode, with the engine charging the battery through the second electrical torque device. In another operation 4904, the clutch is open and the vehicle is not being propelled—the first electrical torque device is returning vehicle kinetic energy to the battery. In another operation 4906, the vehicle is stopped, the clutch is open, and the engine is recharging the battery through the second electrical torque provider.

An exemplary technique for controlling a hybrid power train is described. The technique includes an operation to determine a machine shaft torque demand and a machine shaft speed, and in response to the machine shaft torque demand and the machine shaft speed, the technique includes an operation to determine a machine power demand. The operation to determine a machine shaft torque demand includes any torque determination understood in the art, including without limitation interpreting an accelerator pedal position or request, interpreting a cruise control or power take-off control position or request value, interpreting a datalink or network-provided torque request. The operation to determine the machine shaft speed includes any shaft speed determination understood in the art, including receiving a sensor input representative of the machine shaft speed, receiving a machine shaft speed value from a datalink or network, and/or receiving one or more values of other parameters from which the machine shaft speed may be calculated.

The machine power demand is a description of the usable power at the machine shaft that achieves the machine torque demand at the present machine shaft speed. The machine shaft includes any power receiving device positioned downstream of all power providing components within a hybrid power train included in the machine. For example, and without limitation, the machine shaft may be a driveline, a transmission tailshaft output, a rear axle of a vehicle, a power take-off shaft, a pump input shaft.

The machine includes a hybrid power train. The hybrid power train, as used herein, includes a power providing device having at least two power providers operating with differing power mechanisms. An exemplary hybrid power train includes an internal combustion engine and at least one electrical torque provider. Another exemplary hybrid power train includes an internal combustion engine and a hydraulic torque provider. In certain embodiments, the description herein stating an electrical torque provider can be adapted for a hydraulic torque provider, and the description herein stating an electrical energy storage device can be adapted for a hydraulic accumulator. Further, the description herein stating power electronics positioned between an electrical torque provider and an electrical energy storage device can be adapted for a power converter within a hydraulic power system.

The exemplary technique further includes an operation to adjust the machine power demand to a non-zero value in response to determining that the machine shaft speed is zero and the machine shaft torque demand is greater than zero. One of skill in the art will appreciate that the machine power required to achieve a given torque target is zero when the shaft speed is zero; however, when the torque request is greater than zero the final power output of the machine is expected to be a value greater than zero. The adjusted power value is any zero speed power value understood in the art. Exemplary adjusted power values include a vehicle launch power determined according to the desired launch power for a selected operator feel, and/or a zero speed power value determined to avoid harm to any driveline or power train component and to provide the desired initial acceleration—for example a limit within the transmission, driveline, or rear axle gear may define the zero speed power limit. In certain embodiments, the zero speed power value is determined in response to a vehicle mass, or other load inertia description, where a vehicle mass or load inertia description is available.

The exemplary technique further includes an operation to determine a power division description between an internal combustion engine and one or more electrical torque providers. The power division description is a power amount provided by each component, such that the sum of the power from each component combines to the machine power demand. The power division description may be an absolute or relative value. The technique further includes operating the internal combustion engine and the electrical torque provider(s) in response to the power division description. Operating the internal combustion engine and the electrical torque provider(s) in response to the power division description includes, without limitation, providing the power from the devices according to the power division description, and/or progressing acceptably from a current power output for each device to the power from the devices according to the power division description.

For example, the power division description may include 50% of the machine power demand to be provided by the internal combustion engine, 25% from the first electrical torque provider, and 25% from the second electrical torque provider, and the technique operates the devices accordingly. In certain embodiments, the devices are mechanically coupled to operate at an identical speed, or at a fixed ratio of speeds between the devices, and the technique includes providing the determined power amounts for each device at the fixed speed. In a further example, where all of the devices are operating at 1,000 rpm, the technique includes operating the internal combustion engine at a torque value to provide the determined power contribution for the internal combustion engine at 1,000 rpm, and operating each of the electrical torque providers at a selected torque to provide the determined power amount for each of the electrical torque providers at 1,000 rpm. In certain embodiments, the power devices are coupled through a power splitter, a torque converter, or other device that allows the speeds of each device to float or change in relative ratios between each other.

An exemplary technique further includes an operation to determine an engine cost function that includes an engine operating cost as a function of engine power output. The engine cost function may account for the specific cost of achieving the engine power output at the machine shaft speed, or the engine cost function may further account for the specific cost of achieving the engine power output at a selected speed within a range of allowable speeds where the speed of the engine is allowed to change. The specific cost includes a fuel cost, an engine wear cost, an oil service life cost, and/or any other cost understood in the art. In certain embodiments, the specific cost is determined from fuel consumption estimated to achieve the engine power output. For example, a speed-load table mapping a brake specific fuel consumption (BSFC) may be implemented to determine the specific cost for the internal combustion engine. Additionally or alternatively, an incremental cost in the considered system (e.g. equivalent miles or dollars toward an engine re-build, equivalent miles or dollars toward an engine oil change, etc.) is provided for consideration into a cost function.

The exemplary technique further includes an operation to determine an electrical cost function that includes the electrical torque provider operating cost as a function of the electrical torque provider power output. In certain embodiments, the electrical cost function determines an equivalent fuel cost of providing power with the electrical torque provider. An exemplary equivalent fuel cost includes the efficiency of corresponding power electronics, where the power electronics are electrically positioned between the corresponding electrical torque provider and an electrical energy storage device.

The electrical cost function may further include the efficiency of converting power from the electrical energy storage device to provide to the electrical torque provider. In certain embodiments, the entire cycle efficiency of utilizing a present unit of charge on the electrical energy storage device, converting the unit of charge through the power electronics, dissipating the unit of charge in the electrical torque provider to provide mechanical power, consuming a subsequent unit of fuel in the internal combustion engine to power a generator, converting the mechanical power in the generator to a unit of charge that is provided through the power electronics to the electrical energy storage device to replace the present unit of charge that is under consideration for present consumption. In addition to the entire cycle efficiency, and additional or alternate embodiment considers the estimated fraction of all future charge events that will be provided by regenerative braking, and the efficiencies of the regenerative braking. For example, an embodiment where 5% of all electrical power to the electrical energy storage device is provided by regenerative braking may indicate a higher cost from the electrical cost function relative to an embodiment where 10% of all electrical power to the electrical energy storage device is provided by regenerative braking.

In certain embodiments, the electrical cost function includes a generating operating region, and the electrical cost function includes an electrical energy storage efficiency and/or an electrical energy storage efficiency and recovery efficiency (i.e. the entire storage and recovery cycle efficiency). For example, the cost of the internal combustion engine providing a power output that is greater than the machine power demand, with the electrical torque provider simultaneously operating in a generating operating region is described by the cost functions and considered when determining the power division description. In certain embodiments, the technique further includes an operation to determine the power division description in response to the engine cost function and the electrical cost function.

The electrical cost function may be a function averaging the entire electrical system, and/or a function provided for each electrical torque provider, with each electrical torque provider considered independently. In certain embodiments, a second electrical torque provider is considered independently by determining a second electrical cost function that includes a second electrical torque provider operating cost as a function of a second electrical torque provider power output. The technique further includes determining the power division description further in response to the engine cost function, the electrical cost function, and the second electrical cost function. An exemplary second electrical cost function further includes an efficiency of the power electronics corresponding to the second electrical torque provider. In certain embodiments, the second electrical cost function includes a generating operating region, and accounts for a second storage efficiency and/or a second storage and recovery cycle efficiency.

In certain embodiments, the technique includes operating the hybrid power train in one or more operating modes. In a first operating mode, the technique includes disengaging a clutch between the internal combustion engine and the first electrical torque provider, and providing all of the machine power demand with the first electrical torque provider. In a second operating mode, the technique includes engaging the clutch between the internal combustion engine and the first electrical torque provider and providing all of the machine power demand with the internal combustion engine. In a third operating mode, the technique includes engaging the clutch between the internal combustion engine and the first electrical torque provider and dividing the machine power demand between the internal combustion engine and the first electrical torque provider. In a fourth operating mode, the technique includes engaging the clutch between the internal combustion engine and the first electrical torque provider and dividing the power between the internal combustion engine and the second electrical torque provider. In a fifth operating mode, the technique includes engaging the clutch between the internal combustion engine and the first electrical torque provider and dividing the power between the first electrical torque provider and the second electrical torque provider. In a sixth operating mode, the technique includes engaging the clutch between the internal combustion engine and the first electrical torque provider and dividing the power between the internal combustion engine, the first electrical torque provider, and the second electrical torque provider. The described operating modes are exemplary and non-limiting. In certain embodiments, the clutch includes a range of positions between open and closed. In certain embodiments the hybrid power train may function without a clutch, including in a series or parallel arrangement, and further including by coupling power from the engine and one or more additional power providers through a power splitter, torque converter, or other coupling arrangement known in the art.

An exemplary technique further includes an operation to determine a cost disposition parameter, and determining each of the cost functions in response to the cost disposition parameter and a plurality of corresponding cost functions. For example, the cost disposition parameter may include a number of drive cycle routes, each one having an effect on the cost functions, where the technique includes selecting one of the cost functions, or a set of the cost functions, in response to the cost disposition parameter. Non-limiting examples of cost function effects according to the cost disposition parameter include an emissions cost effect (e.g. due to varied emissions targets or penalties), a fuel economy cost effect, an oil service life cost effect, a system responsiveness cost effect, a noise emissions cost effect, and/or a battery service life effect. The implementation of a cost disposition parameter allows one of skill in the art to prioritize differing aspects of a total cost according to the environment of the system, or the priorities of the operator.

For example, a first cost disposition parameter corresponds to a first set of cost functions, a second cost disposition parameter corresponds to a second set of cost functions, and the technique includes determining whether the first cost disposition parameter or the second cost disposition parameter is to be utilized in the present application of the technique. Further exemplary cost disposition parameters include a duty cycle category and/or a drive route parameter. Exemplary operations to determine each cost function in response to the cost disposition parameter include selecting the cost functions corresponding to the cost disposition parameter, and/or interpolating between two proximate cost functions according to the cost disposition parameter.

Certain further embodiments of the technique include an operation to adjust the power division description in response to an electrical storage device state-of-charge (SOC). An exemplary technique includes determining the electrical cost function(s) that describe the electrical torque provider(s) operating cost as a function of the power output for the corresponding electrical torque provider, and further as a function of the SOC for the electrical energy storage device.

In certain embodiments, the technique includes determining a vehicle speed, and determining the power division description in response to the machine power demand and the vehicle speed. In a further embodiment, the technique includes determining a number of nominal power division descriptions as a two-dimensional function of the vehicle speed and the machine power demand. The technique further includes determining the power division description by performing a lookup operation utilizing the plurality of nominal power division descriptions. For example, the lookup operation includes cross-referencing the vehicle speed and machine power demand to a table having nominal power division descriptions, and selecting the nominal power division description closest to the vehicle speed and machine power demand. The exemplary lookup operation may further include interpolating and/or extrapolating in one or both dimensions.

Certain exemplary embodiments include the power division description providing the power division between the internal combustion engine, a first electrical torque provider, and a second electrical torque provider. An exemplary technique further includes disengaging a clutch positioned between the internal combustion engine and the second electrical torque provider in response to determining that the second electrical torque provider provides the entire machine torque demand.

In certain embodiments, the engine cost function includes an emissions cost for the engine—for example determined from the nominal emissions of the engine at the speed and torque indicated by the present engine speed and the contemplated power contribution of the engine. A further exemplary embodiment includes the engine cost function having a second emissions cost. For example, the first engine emissions cost may be determined for $NO_x$ emissions and the second engine emissions cost may be determined for particulate emissions. Non-limiting examples of engine emissions utilized for the engine cost include a cost of $NO_x$ output, a cost of CO output, a cost of $CO_2$ output, a cost of particulate output, a cost of metal or ash output determined according to estimated oil utilization at the considered engine operating conditions, and/or a cost to emissions of blowby estimated at the considered engine operating conditions. The quantification of any emissions value may be determined according to any economic terms available, including at least a cost of emissions compliance, an economic value of an emissions efficient vehicle determined according to market considerations, a regulatory cost of various vehicle emissions levels, and/or a cost to remove the considered emissions from the environment after release.

In certain further embodiments, the engine cost function further includes a secondary effect cost. Exemplary and non-limiting secondary effect costs include an incremental life loss of an aftertreatment component, an incremental regeneration cost of the aftertreatment component, and/or an incremental operating cost of the aftertreatment component.

For example, and without limitation, an engine operating condition may contribute an incremental amount to a life loss of an aftertreatment component—for example by contributing an incremental particulate amount to a particulate filter, the filter will require a regeneration event at a future time which will remove an incremental amount of the service life of the aftertreatment component and cost a quantifiable amount. Accordingly, a cost according to the incremental life loss of the aftertreatment component is attributable to the particulate emission by the engine secondary to the direct emissions cost of the particulate emission.

In another example, and without limitation, the engine operating conditions may contribute an incremental amount to a regeneration cost of the aftertreatment component, and/or offset the regeneration cost of the aftertreatment component. In the example, an engine operating condition that provides a passive regeneration amount to the aftertreatment component (e.g. by providing sufficient temperature and oxygen for an incremental amount of soot to be oxidized) may be deemed to be a lower cost operation than an engine operating condition that provides a low temperature, and that will, over time, require active (and presumably fuel consuming) regeneration efforts. The associated fuel cost, aftertreatment component life cost (e.g. due to higher temperatures in the aftertreatment component from active regeneration relative to passive regeneration), or other costs associated with the engine operating condition relative to regenerating the aftertreatment component can be quantified and considered in the engine cost function. In certain further embodiments, one or more of the emissions cost or secondary effect costs include a discontinuity in the cost function.

In another example, the engine operating condition contributes to the incremental operating cost of an aftertreatment component. For example, and without limitation, a selective catalytic reduction (SCR) system provides a reagent (typically urea or $NH_3$) in response to $NO_x$ emissions from the internal combustion engine. Accordingly, the engine operating condition, and associated $NO_x$ output, contributes to the operating cost of the SCR system, and the secondary cost associated with $NO_x$ emissions can be quantified. In a further embodiment, in certain SCR systems, the ratio of NO to $NO_2$ in the engine affects the efficiency of the SCR system, and the specific $NO_x$ components of the engine can be utilized in determining the secondary cost of the $NO_x$ emissions.

The described power division operations may be performed when the machine power demand is positive or negative, and any power provider in the system may be providing power of a positive or negative magnitude regardless of the magnitude of the machine power demand. Exemplary and non-limiting examples include the machine power demand being positive, with the internal combustion engine providing positive power and an electrical torque provider providing negative power (e.g. to regenerate a battery). Another exemplary and non-limiting example includes the machine power demand being positive, with the internal combustion engine providing negative power (e.g. by motoring without fueling) and an electrical torque provider providing positive power.

In certain embodiments, the power division description includes an engine braking target power value. The engine braking target power value includes a negative amount of power to be provided by the engine. The engine provides negative power according to the components available in a particular system, including without limitation, negative power provided by compression braking, compression braking with variable valve timing, backpressure from a variable geometry turbine or an exhaust throttle, negative power from vacuum provided by an intake throttle, and/or any other negative power implementation understood in the art. In certain embodiments, the negative power may be available only in discrete increments (e.g. according to a number of cylinders used for compression braking). In certain embodiments, the power division description is corrected according to the discrete negative power increments available from the engine, and/or the engine selects a nearest negative power operating condition and an electrical torque provider corrects the machine power output to meet the machine power demand.

Another exemplary technique includes an operation to determine a machine shaft torque demand and a machine shaft speed, and in response to the machine shaft torque demand and the machine shaft speed, the technique includes an operation to determine a machine power demand. The technique further includes an operation to determine a power division description between an internal combustion engine, a first electrical torque provider, and a second electrical torque provider. The technique further includes an operation to determine a clutch position, where the clutch position is engaged or disengaged. The descriptions herein utilize a clutch position, however unless stated explicitly to the contrary, certain embodiments determine whether a hybrid power train is in a parallel arrangement or a serial arrangement, where the clutch engaged corresponds to the parallel arrangement and the clutch disengaged corresponds to the serial arrangement.

The clutch, for embodiments having the clutch, is interposed between the first electrical torque provider on a first side and the internal combustion engine and the second electrical torque provider on a second side. In certain further embodiments, a load is on the side of the clutch having the first electrical torque provider. The load receives the power output of the hybrid power train, and is at any position downstream of all power providing components in the hybrid power train. Exemplary and non-limiting loads include the drive wheels of a vehicle, a transmission tail shaft, a vehicle drive line, a power takeoff shaft, or a generator output shaft.

The exemplary technique further includes an operation to determine a baseline power division description in response to a vehicle speed and the machine power demand. The vehicle speed, in certain embodiments, may be substituted with a load kinetic energy description, such as a rotating kinetic energy of a flywheel, rotating machine, etc. The technique further includes an operation to determine an SOC deviation for an electrical energy storage device. The SOC deviation is the difference between a present SOC of the electrical energy storage device and a target SOC for the electrical energy storage device.

The electrical energy storage device is electrically coupled to the first electrical torque provider and the second electrical torque provider. The description herein includes a single electrical energy storage device coupled to both electrical torque providers, however except where explicitly stated to the contrary an electrical energy storage device may be coupled to only a single electrical torque provider. Further, additional electrical energy storage devices may be present in a given system, each device coupled to at least one electrical torque provider. For example, and without limitation, a hypercapacitor or ultra-capacitor may be incorporated into the electrical system and provide additional electrical energy storage capacity and electrical energy transient control.

The exemplary technique further includes an operation to adjust the baseline power division description in response to the SOC deviation and the clutch position. In certain embodiments, determining the SOC deviation for the electrical energy storage device includes determining a difference between a present SOC and a target SOC. In certain embodiments, the technique includes an operation to adjust the SOC deviation in response to a present vehicle speed, a temperature of the electrical energy storage device, a state-of-health (SOH) of the electrical energy storage device, the machine power demand, and/or an integrated state-of-charge deviation over time. The operation to adjust the SOC deviation includes either an adjustment of the target SOC, and/or an adjustment directly of the SOC deviation downstream of determining a difference between the present SOC and the target SOC.

An exemplary operation to adjust the SOC deviation in response to the present vehicle speed includes reducing the SOC deviation in response to an increasing vehicle speed, and/or reducing the SOC target value in response to the increasing vehicle speed. In certain embodiments, the reduction in the SOC target value is made in response to determining an amount of the kinetic energy of the vehicle that will be recharged to the battery in response to a future deceleration event. The efficiency of a generator, the power electronics between the generator and the electrical energy storage device, and the chemical efficiency of the electrical energy storage may all be estimated or calculated to determine the SOC target value. Additionally, the fraction of the vehicle kinetic energy likely to be recovered is estimated or calculated.

In certain embodiments, the operational history of the vehicle may be considered, for example by tracking an SOC before and an SOC after a vehicle deceleration event. A driver that utilizes service brakes heavily will yield a lower regeneration recovery percentage, and a driver that decelerates too slowly, allowing engine and vehicle friction to provide the bulk of the deceleration force will likewise yield a lower regeneration recovery percentage. Accordingly, the technique further includes, in certain embodiments, tracking data to determine an SOC recovery value in response to the vehicle speed, and provides the SOC deviation adjustment in response to both the vehicle speed and the SOC recovery value.

An exemplary operation to adjust the SOC deviation in response to the temperature of the electrical energy storage device includes increasing a SOC deviation, and/or increasing the SOC target value in response to a lower temperature of the electrical energy storage device. In certain batteries, a storage capacity of the battery is reduced in response to a lower battery temperature. The specific amount of battery capacity reduction with temperature is known to one of skill in the art having information normally provided by a battery manufacturer and/or by simple empirical sampling. In certain embodiments, the target SOC is increased to account for the increased battery capacity with temperature. In certain embodiments, only a fraction of the increased battery capacity is utilized, especially, in one example, where a subsequent battery temperature decrease is expected (resulting in a subsequent discharge regardless of system need). Exemplary situations where subsequent discharge is expected include a determination that an ambient temperature has reduced significant and/or an extended period of a low load operation of the hybrid power train.

An exemplary operation to adjust the SOC deviation in response to a SOH of the electrical energy storage device includes an operation to increase the SOC deviation in response to a reduced SOH of the electrical energy storage device (e.g. to increase a system response to the SOC deviation), an operation to reduce the SOC target in response to the reduced SOH (e.g. recognizing that a total capacity of the electrical energy storage device is reduced, and/or that each charge cycle of the electrical energy storage device reduces the service life), and/or an operation to increase the SOC target in response to the reduced SOH (e.g. recognizing that each charge cycle of the electrical energy storage device reduces the service life). The response to adjust the SOC target in response to the reduced SOH, in certain embodiments, is further determined according to present operating conditions. An exemplary operation includes increasing the target SOC in response to a reduced SOH during highly transient conditions to prevent the electrical energy storage device from becoming depleted, and cyclically increasing and/or decreasing the target SOC in response to the reduced SOH during steady state conditions to minimize the number of the electrical energy storage device charge cycles.

The operation to adjust the SOC deviation in response to the machine power demand includes an operation to decrease the SOC deviation and/or the SOC target value in response to a high machine power demand. Decreasing the SOC target value in response to a high machine power demand maximizes initial system response to the machine power demand. In certain embodiments, in response to a sustained high machine power demand, the SOC target value is increased, for example after the internal combustion engine has reached an operating point where the machine power demand can be met with the engine alone. The increase of the SOC target value allows the system to have extra energy capacity to respond to ongoing power demands.

The operation to adjust the SOC deviation in response an integrated SOC deviation over time includes an operation to increase the SOC deviation as the SOC deviation is sustained. In certain embodiments, the gain on the integrated SOC deviation is intentionally positioned to allow a prescribed amount of overshoot/undershoot in the SOC, to avoid cycling the SOC too rapidly and degrading the quality of the electrical energy storage device. In certain alternate or additional embodiments, the gain on the integrated SOC deviation is positioned to allow the SOC to deviate for a prescribed period of time, but to enforce the SOC target after extended periods away from the target. The prescribed period of time may be related to the time of event occurrences where an SOC deviation is considered beneficial—for example the time to climb a short hill or to merge onto an interstate from a lower speed ramp. The described utilizations of the integrated SOC are exemplary and non-limiting.

An exemplary baseline power division description includes a total electrical contribution and a total engine contribution. The exemplary technique further includes, in response to determining the clutch is engaged, an operation to adjust the baseline power division description by dividing the total electrical contribution between a first electrical torque provider and the second electrical torque provider in response to the machine shaft speed. For example, a system includes a first electrical torque provider and a second electrical torque provider, and the technique includes determining an efficiency and maximum power of each of the electrical torque providers at the present machine shaft speed, and selecting a power for each of the electrical torque providers that maximizes the total electrical contribution efficiency.

In certain embodiments, the technique further includes an operation to determine a net power flux to the electrical energy storage device in response to the SOC deviation. The exemplary technique further includes adjusting the baseline power division description further in response to the net power flux. In certain embodiments, the net power flux is added to the total electrical contribution, and subtracted from the total engine contribution, such that the machine power provided by the hybrid power train is not affected by the net power flux. The technique further includes providing the adjusted total electrical contribution, and determining a contribution for each of the first electrical torque provider and the second electrical torque provider in response to the adjusted total electrical contribution, an efficiency for the first electrical torque provider, a capacity of the first electrical torque provider, an efficiency of the second electrical torque provider, and/or a capacity of the second electrical torque provider.

An exemplary technique further includes, in response to determining the clutch is disengaged, an operation to adjust the baseline power division description by commanding the second electrical torque provider to achieve the machine power demand, by commanding the first electrical torque provider to provide the net power flux to the electrical energy storage device, and by commanding the internal combustion engine to power the first electrical torque provider. The system operating with the clutch disengaged is operating in a series operating mode, where only the second electrical torque provider is mechanically coupled to the load, and the second electrical torque provider accordingly applies all of the machine power demand. The first electrical torque provider is decoupled from the load, but coupled to the electrical energy storage device, and the internal combustion engine can power the first electrical torque provider to charge the electrical energy storage device.

Several exemplary and non-limiting baseline power division descriptions are providing following. Any of the power division descriptions may include absolute or relative values. Relative power values may be provided in terms of the machine power demand (e.g. a percentage of the machine power demand), or relative to any other variable in the system. Any one or more of the power contributions individually may be negative or positive, and the sign of the machine power demand may be negative or positive.

A first example includes a total electrical contribution and a total engine contribution, where the total electrical contribution and the total engine contribution combined provide the machine power demand. A second example includes a power contribution for each of the internal combustion engine, the first electrical torque provider, and the second electrical torque provider, where the total power contributions provide the machine power demand. A third example includes a total electrical contribution, a total engine contribution, and a net power flux to the electrical power storage device, where the total electrical contribution, the total engine contribution, and the net power flux combine to provide the machine power demand.

A fourth example includes a power contribution for each of the internal combustion engine, the first electrical torque provider, the second electrical torque provider, and a net power flux to the electrical power storage device, where the total power contributions and the net power flux provide the machine power demand. A fifth example includes a total electrical contribution, a total engine contribution, a net power flux to the electrical power storage device, and a net power flux to accessories, where the total electrical contribution, the total engine contribution, the net power flux to the electrical energy storage device, and the net power flux to the accessories combine to provide the machine power demand. A sixth example includes a power contribution for each of the internal combustion engine, the first electrical torque provider, the second electrical torque provider, a net power flux to the electrical power storage device, and a net power flux to accessories, where the total power contributions, the net power flux to the electrical energy storage device, and the net power flux to the accessories provide the machine power demand.

The exemplary technique further includes reducing the SOC deviation and/or reducing a response to the SOC deviation in response to an increasing vehicle speed. An exemplary embodiment includes increasing a response to the SOC deviation in response to a magnitude of the SOC deviation, and/or increasing a response to the SOC deviation over time in response to the SOC deviation being maintained. A further embodiment includes responding to the SOC deviation with a proportional and/or integral response.

An exemplary technique includes an operation to determine the SOC deviation in response to a target SOC. The technique further includes determining the target SOC in response to a vehicle speed—for example reducing the target SOC in response to an increased vehicle speed and increasing the target SOC in response to a decreased vehicle speed. Another exemplary technique includes determining the target SOC in response to a vehicle mass. Exemplary operations to determine the target SOC in response to the vehicle mass include reducing the SOC as a function of the total vehicle kinetic energy (determined, for example, as proportional to a baseline mass kinetic energy calibration, or as a full model), or increasing the SOC at low or zero total vehicle kinetic energy. In a further embodiment, the technique includes increasing the target SOC over a range of operating conditions in response to an increased vehicle mass. A vehicle having a higher mass stores a greater amount of kinetic energy in motion, and requires deeper withdrawals from the electrical energy storage device during acceleration events such as high acceleration operation and/or climbing hills. Accordingly, relative to a vehicle having a lower mass, the technique operated in a vehicle having a higher mass may increase the high target SOC and/or decrease the low target SOC. All described behaviors are exemplary and non-limiting.

In certain embodiments, the technique includes determining the target SOC in response to an electrical energy storage device capacity. The electrical energy storage device capacity varies under certain operating conditions, including temperature, age, and SOH. In certain embodiments, the technique includes determining a higher target SOC in response to an increased temperature of the electrical energy storage device, determining a higher or lower target SOC in response to an aged electrical energy storage device, and/or determining a higher or lower target SOC in response to an electrical energy storage device having a low (or degraded) SOH. All described behaviors are exemplary and non-limiting.

With an aged electrical energy storage device, having a lower total capacity than a new electrical energy storage device, the technique may require a higher target SOC due to the inability to store as much of the regenerative electrical energy available during challenging duty cycle events such as rolling hills or stop-and-go traffic. Accordingly, the technique sets a higher target SOC during certain operations. During other engine operations, for example during high speed level operation, the technique sets a lower target SOC to provide for a greater margin for accepting electrical energy from regeneration during subsequent vehicle deceleration. One of skill in the art, having the benefit of the disclosures herein, can determine how to set the target SOC in response to an aged electrical energy storage device and the generally known conditions of a particular application in which the hybrid power train is installed. All described behaviors are exemplary and non-limiting.

With an electrical energy storage device having a degraded SOH, many of the same conditions apply relative to the aged electrical energy storage device. In certain embodiments, the expected applications and expected loads indicate that the target SOC is increased for an electrical energy storage device having a degraded SOH. In other embodiments, the expected applications and expected loads indicate that the target SOC is decreased for an electrical energy storage device having a degraded SOH. All described behaviors are exemplary and non-limiting.

In certain embodiments, the technique includes determining the target SOC in response to an electrical energy storage device throughput limit. An exemplary operation includes determining that charging or discharging the electrical energy storage device will exceed a throughput limit for the electrical energy storage device, and the technique includes trimming the target SOC until the throughput limit is not exceeded. In certain operations, the technique includes determining that the draw frequency and amount from the electrical energy storage device greatly exceeds the electrical energy storage device throughput limit, and the technique includes increasing the target SOC to build up a reserve of power, or decreasing the target SOC to build up a reserve of regenerating capacity. In certain embodiments, in response to the electrical energy storage device being reached or exceeded, the technique includes adjusting the target SOC such that the charging or discharging rate is brought within the limits of the electrical energy storage device. All described behaviors are exemplary and non-limiting.

In certain embodiments, the technique includes determining the target SOC in response to a first electrical torque provider throughput limit. The first electrical torque provider provides charging to the electrical energy storage device when the hybrid power train operates in a series configuration. In certain embodiments, the technique includes adjusting the target SOC such that a charging rate of the electrical energy storage device does not exceed the first electrical torque provider throughput limit. In certain embodiments, the technique includes determining that the draw frequency and amount from the electrical energy storage device greatly exceeds the first electrical torque provider throughput limit, and the technique includes increasing the target SOC to build up a reserve of power, or decreasing the target SOC to build up a reserve of regenerating capacity. All described behaviors are exemplary and non-limiting.

In certain embodiments, the technique includes determining the target SOC in response to a second electrical torque provider throughput limit. The technique including determining the target SOC in response to the second electrical torque provider throughput limit operates with similar considerations related to those described with respect to the first electrical torque provider throughput limit preceding.

In certain embodiments, the technique includes determining the target SOC in response to an operator braking behavior. Exemplary operations to determine the target SOC in response to the operator braking behavior include lowering the target SOC to provide a reserve of regenerative capacity in response to frequent operator braking behavior at a level that provides efficient regeneration opportunity. Another exemplary operation includes providing a target SOC that optimizes the health of the electrical energy storage device in response to operator braking behavior that is infrequent and/or that provides little regeneration opportunity. All described behaviors are exemplary and non-limiting.

A further exemplary technique includes determining a SOH of the electrical energy storage device, and further adjusting the response to the SOC deviation in response to the SOH. An exemplary operation includes increasing the response to the SOC deviation in response to the SOH being reduced. An exemplary technique includes adjusting a response to the SOC deviation in response to an operating temperature of the electrical energy storage device, for example increasing a response to the SOC deviation in response to a lower operating temperature.

An exemplary technique includes operating a closed loop controller having the SOC deviation as an error value, where the closed loop controller includes an integral control term. The closed loop controller accordingly brings the SOC to the target SOC according to the response provided by the closed loop controller. In certain embodiments, the target SOC is updated to provided periodic charge or discharge of the electrical energy storage device, and/or to allow the system to make a fuel efficient adjustment by discharging the electrical energy storage device to avoid an inefficient operation elsewhere in the system, and/or to charge the electrical energy storage device to recover energy that is made available elsewhere in the system.

Generally, the closed loop controller has a relatively long response time to allow the system to realize the benefits of the hybrid system by utilizing the electrical energy storage to smooth inefficient transient operation. A relatively long response time depends upon the system, especially the duty cycle of the application, and the number and severity of transient operations in the system. A highly transient system may have a wider range of SOC target values and a relatively responsive closed loop controller. A system with few transients and long periods of steady state operation may have a narrower range of SOC target values and a relatively soft closed loop controller. The described closed loop controller is exemplary and non-limiting.

Another exemplary technique includes adjusting the SOC deviation and/or a response to the SOC deviation, in response to the machine power demand. In certain embodiments, a lower machine power demand indicates a more aggressive response to the SOC deviation, and a higher machine power demand indicates a softer response to the SOC deviation. In the exemplary embodiment, when the machine power demand is high, the response to the SOC deviation is lowered such that operations to bring the SOC to the target SOC do not interfere with the system responsiveness. In certain further embodiments, the technique includes adjusting the SOC deviation and/or a response to the SOC deviation in response to a rate of change of the machine power demand. Where the rate of change of the machine power demand is high, an exemplary technique includes reducing the response to the SOC deviation. A change in the SOC deviation may be implemented for any operation that adjusts the response to the SOC deviation—generally reducing the SOC deviation results in a lower response to the SOC deviation.

A further exemplary technique includes, in response to the machine power demand being negative, increasing an SOC target for the electrical energy storage device, where the SOC deviation is determined in response to the SOC target. The operation to increase the SOC target allows the system to capture an opportunistic regeneration event and improve overall fuel economy. An additional or alternative method includes, in response to the machine power demand being high, reducing an SOC target for the electrical energy storage device, where the state of charge deviation is determined in response to the SOC target. The operation to decrease the SOC target allows the system to remain responsive to a particular operator demand.

Yet another exemplary set of embodiments is a technique, including an operation to determine a machine shaft torque demand and a machine shaft speed, and in response to the machine shaft torque demand and the machine shaft speed, an operation to determine a machine power demand. The technique further includes an operation to determine a power division description between an internal combustion engine, a first electrical torque provider, and a second electrical torque provider, and an operation to determine a hybrid power train configuration as one of series and parallel. The technique further includes an operation to determine a baseline power division description in response to a vehicle speed and the machine power demand. The technique further includes an operation to determine a SOC deviation for an electrical energy storage device electrically coupled to the first electrical torque provider and the second electrical torque provider, and adjusting the baseline power division description in response to the SOC deviation and the hybrid power train configuration.

The exemplary technique further includes an operation to determine the SOC deviation for the electrical energy storage device by determining a difference between a present SOC and a target SOC. A further embodiment includes adjusting the SOC deviation in response to a present vehicle speed, a temperature of the electrical energy storage device, a state-of-health of the electrical energy storage device, the machine power demand, and/or an integrated state-of-charge deviation over time.

In certain embodiments, the baseline power division description includes a total electrical contribution and a total engine contribution, and the technique further includes, in response to determining the hybrid power train configuration is parallel, adjusting the baseline power division description by dividing the total electrical contribution in response to the machine shaft speed. A further embodiment includes determining a net power flux to the electrical energy storage device in response to the SOC deviation, where the adjusting the baseline power division description is in response to the net power flux. Additionally or alternatively, the technique includes dividing the total electrical contribution in response to a first efficiency of the first electrical torque provider at the machine shaft speed and a second efficiency of the second electrical torque provider at the machine shaft speed.

An exemplary technique further includes, in response to determining the hybrid power train configuration is parallel, adjusting the baseline power division description by commanding the second electrical torque provider to achieve the machine power demand, commanding the first electrical torque provider to provide a net power flux to the electrical energy storage device, and commanding the internal combustion engine to power the first electrical torque provider.

Yet another exemplary set of embodiments is a technique, including operating a hybrid power train having an internal combustion engine and one or more electrical torque providers. The technique further includes determining a machine power demand for the hybrid power train, determining a power division between the internal combustion engine and the electrical torque provider in response to the machine power demand, determining a state-of-charge (SOC) of an electrical energy storage device electrically coupled to the at least one electrical torque provider, and interpreting a target SOC for the electrical energy storage device in response to a vehicle speed. The technique further includes determining an SOC deviation for the electrical storage device, where the SOC deviation includes a function of a difference between the SOC of the electrical energy storage device and the target SOC of the electrical energy storage device. The technique further includes adjusting the power division in response to the SOC deviation.

In further embodiments, the technique includes decreasing the target SOC in response to an increasing vehicle speed. An exemplary technique includes adjusting the target SOC in response to a temperature of the electrical energy storage device. A further exemplary technique includes decreasing the target SOC in response to a decreasing temperature of the electrical energy storage device. In certain embodiments, the technique includes adjusting one of the target SOC and the SOC deviation in response to a state-of-health of the electrical storage device.

Yet another exemplary embodiment includes adjusting a cost of the SOC deviation in response to a state of health of the electrical energy storage device. In certain embodiments, the technique includes operating a cost function utilizing an engine cost function and an electrical cost function to determine the power division between the engine and the electrical torque provider(s), and further applying the cost of the SOC deviation to adjust the power division and/or to determine a net power flux to the electrical energy storage device. An exemplary technique further includes increasing a cost of the SOC deviation in response to a decreased state of health of the electrical energy storage device.

In certain embodiments, the system includes a first electrical torque provider and a second electrical torque provider, and the power division is either an engine contribution and a total electrical contribution, or the engine contribution, the first electrical torque provider contribution, and the second electrical torque provider contribution. where the power division is the engine contribution and a total electrical contribution, the technique includes an operation to determine the first electrical torque provider contribution, and the second electrical torque provider contribution from the total electrical contribution in response to the efficiencies of the first electrical torque provider and the second electrical torque provider at present operating conditions.

In certain embodiments, the technique includes determining the SOC deviation as a function of vehicle mass, electrical energy storage device capacity, an electrical energy storage device power limit (e.g. power throughput, influx current, effluent current, etc.), a torque capacity of an electrical torque provider, a power capacity of an electrical torque provider, and/or a detected operator braking behavior. In certain embodiments, where a torque capacity or a power capacity of an electrical torque provider is utilized to determine the SOC deviation, the SOC deviation is adjusted and/or a response to the SOC deviation is adjusted such that the constraint of the torque capacity or power capacity is maintained. In certain additional or alternative embodiments, where the excess or deficient torque or power can be provided or absorbed by another torque provider (e.g. the engine or another electrical torque provider), the SOC deviation may be met and the constraint of the torque capacity or power capacity is also maintained. In certain embodiments, for example according to the cost functions of the engine, the electrical torque providers, and the SOC deviation cost, some adjustment of the SOC deviation is provided and some excess or deficient torque or power is provided or absorbed.

Yet another embodiment includes determining the SOH of the electrical energy storage device in response to a throughput event of the electrical energy storage device, a SOC event of the electrical energy storage device (e.g. the SOC reaching a high or low SOC threshold value), a regeneration cycle event of the electrical energy storage device, and/or an age of the electrical energy storage device. The technique includes modeling a SOH of the electrical energy storage device and/or applying rules to the estimated SOH of the electrical energy storage device.

For example, a throughput event of the electrical energy storage device (e.g. a very high draw current from a battery) may be known to cause a failure in a known number of events, and/or a known average degradation over a number of events. Accordingly, a SOH effect of a single throughput event may be accumulated with other wear indicators to provide an estimate of the SOH. In another example, an SOC event of the electrical energy storage device may be known to cause a failure in a known number of events, and/or a known average degradation over a number of events. In the example, a very low SOC event may be noted and the SOH incremented, and/or an overcharge event of the electrical energy storage device may be noted and the SOH incremented.

In another example, the electrical energy storage device may be understood to experience a known amount of life loss per regeneration cycle—for example and without limitation tracked by triggering a first control flag at a threshold low SOC, and by triggering a second control flag at a subsequent threshold high SOC to indicate that a regeneration cycle has occurred. Each regeneration cycle may be deemed to increment the electrical energy storage device SOH by a predetermined amount.

In yet another example, the electrical energy storage device may be understood to experience a loss in the SOH over time. For example, and without limitation, the electrical energy storage device may be a battery having a known loss with time, that may further be a function of the battery temperature. Accordingly, an accumulated aging amount may be added to the SOH accumulation from one or more of the other indicators for the SOH. The aging amount may be determined according to any resolution available from input data (i.e. baseline aging data) and measured environment data (e.g. time and average temperature) for the electrical energy storage device. For example, a daily or hourly aging accumulation may be applied, or a monthly or yearly aging accumulation may be applied.

An exemplary technique includes determining the power division and the adjusting the power division by operating a cost comparison algorithm between achieving the machine power demand with the internal combustion engine and the electrical energy storage device(s). The exemplary technique may further adjust the power division by operating the cost comparison algorithm including a cost of the SOC deviation. The SOC deviation cost may be set to apply the desired balance of SOC targeting and operational responsiveness. Additionally or alternatively, an incremental cost to the SOH may be calculated from the current effects of an SOC deviation on the electrical energy storage device SOH, and converted into the same units as the engine cost function and electrical cost function. In one example, if the SOH accumulates to 100,000 to indicate that the electrical energy storage device requires replacement, and the electrical energy storage device costs $10,000 to replace, each incremental unit of the SOH can be equated to $0.10. The provide example is not specific to any system, but the cost of replacement for an electrical energy storage device, including the cost of service, downtime, and/or warranty costs, are understood to one of skill in the art contemplating a particular system.

Yet another exemplary set of embodiments is a technique, including operating a hybrid power train including an internal combustion engine and one or more electrical torque providers. The technique further includes determining a machine power demand and, in response to the machine power demand, determining a power division description. The technique further includes, in response to the power division description, operating the internal combustion engine and the at least one electrical torque provider, where operating the internal combustion engine includes starting the internal combustion engine in response to determining a battery SOC is about to fall below a limit.

Determining the battery SOC is about to fall below a limit includes estimating a time to fall below the limit at current usage and determining whether the estimated time is below a threshold. The time is selected according to the certainty of the battery SOC estimate, the extra power capacity of the system when operating on the internal combustion engine, and the preferences of the operator of the particular system. In certain embodiments, time values of 30 seconds, one minute, five minutes, or ten minutes, without limitation, may be utilized. In certain embodiments, determining the battery SOC is about to fall below a limit includes determining that the battery SOC is below a second limit (higher than the first limit) and that a rate of discharge is greater than a threshold value. The selection of the limit for the battery SOC may be any limit understood in the art, including a predetermined charge amount, a charge amount capable of providing the machine power demand for a predetermined period of time, and/or a limit selected to ensure enough power remains to start the engine (potentially further corrected for the power draw that will be available under current ambient conditions, or a conservatively determined set of ambient conditions).

In certain embodiments, the technique includes performing engine shutdown and engine startup operations with at least one time hysteresis value. The engine shutdown operation may include a first time hysteresis value (e.g. the engine must run for at least two minutes before a subsequent shutdown) and the engine startup operation may include a second time hysteresis value (e.g. the engine must be shut down for at least five minutes before a subsequent startup). The selected startup and shut down times are determined according to any criteria desired, including operator convenience or expectation, total start/stop cycles desired over the life cycle of the system, and/or any operational parameters such as system temperatures, oil pressures, or other parameters where it may be desirable to avoid rapid start/stop cycles of the engine.

An exemplary technique includes determining an engine shutdown time hysteresis value in response to a turbocharger temperature. For example, where a turbocharger temperature is elevated, it is undesirable to shut down the engine rapidly, and accordingly a shut down timer may be implemented to provide time for the turbocharger to cool before the engine is shut down. Further exemplary embodiments include determining a turbocharger temperature value, and preventing the engine shutdown operation in response to the turbocharger temperature value exceeding a threshold. The temperatures at which thermal wear or damage can occur to the turbocharger are understood to one of skill in the art contemplating a particular system.

In certain embodiments, the technique includes determining that an engine shutdown operation is requested and/or imminent, and the technique further includes performing an engine-based turbocharger cooldown operation in response to the requested or imminent engine shutdown operation. The engine-based turbocharger cooldown operation includes operating the engine for a period of time before the shutdown, operating the engine at a reduced load value for a period of time, operating the engine at an operating condition selected to cool the turbocharger for a period of time, and/or operating the engine until the turbocharger temperature cools to a threshold level.

Certain exemplary embodiments include operating the internal combustion engine by starting the internal combustion engine in response to determining that a power demand is about to exceed an electrical limit. The electrical limit may be a power or torque limit of one of the electrical torque providers, a throughput limit of the power electronics of one of the electrical torque providers, and/or a throughput limit of an electrical bus of the system, where the bus communicates electricity between the battery, the electrical torque providers, and/or vehicle accessories. When the internal combustion engine starts, the internal combustion engine can provide some of the machine power demand and relieve the electrical limit that is about to be exceeded. The determination of when the electrical limit is about to be exceeded is a mechanical step for one of skill in the art having the benefit of the disclosures herein. In certain embodiments, the system reserves enough capacity before the electrical limit is exceeded such that the engine can be started within the electrical limit while meeting the machine power demand.

Another exemplary embodiment includes determining that a battery throughput limit is about to be exceeded. The battery provides ongoing power to the accessories and to the electrical torque providers. When the battery throughput is about to be exceeded, the engine starting relieves some of the torque burden of the electrical torque providers which then relieves the battery throughput limit. In certain embodiments, where accessory draw alone may exceed a battery throughput limit, the engine can power the second electrical torque provider in a generating mode to provide power to the electrical bus and relieve the battery. The determination of when the battery throughput limit is about to be exceeded is a mechanical step for one of skill in the art having the benefit of the disclosures herein. In certain embodiments, the system reserves enough capacity before the battery throughput limit is exceeded such that the engine can be started within the battery throughput limit while meeting the machine power demand.

In certain embodiments, a technique includes determining that a power demand rate of increase exceeds a limit. In certain embodiments, the power demand rate of increase is high enough that, although an electrical limit is not imminent, the engine is started to ensure that the machine power demand can be met even if the power demand rate of increase persists. The threshold power demand rate of increase that indicates an engine start is selected according to the preference of one of skill in the art, but an exemplary non-limiting value includes a value consistent with a threshold power event such as that observed with a hill climb or merging event, and/or a threshold power request such as an accelerator pedal pressed past 80% or other selected value.

In certain embodiments, the technique includes operating the internal combustion engine by starting the internal combustion engine in response to determining that a battery SOC is below a threshold and/or determining that a power demand is above a threshold. An exemplary technique further includes determining an engine start capability index of an electrical torque provider, and operating the internal combustion engine by starting the internal combustion engine in response to the engine start capability index being below a first threshold.

The engine start capability index may be determined from any criteria known in the art, including without limitation, an excess power deliverability of the second electrical torque provider, an excess power deliverability of the power electronics corresponding to the second electrical torque provider, and/or an excess battery throughput deliverability to the second electrical torque provider. Where an excess power deliverability is less than a threshold greater than a power required to start the engine, the technique includes starting the engine. Where the excess power deliverability is degrading and the system is imminently going to be unable to start the engine, the technique includes starting the engine. For example, the technique includes operating the internal combustion engine by starting the internal combustion engine in response to determining that the engine start capability index is about to fall below a second threshold. Any system parameter affecting the excess power deliverability may be utilized to determine the excess power deliverability, including at least a maximum torque or power output of the second electrical torque provider relative to the machine power demand and the available torque or power from the first electrical torque provider, a temperature of the second electrical torque provider, a temperature of the power electronics corresponding to the second electrical torque provider, and/or a temperature of the battery.

In certain embodiments, the technique includes allowing an internal combustion engine shutdown in response to the hybrid power train operating in a series mode. An exemplary technique includes preventing an internal combustion engine shutdown in response to the internal combustion engine operating in a thermal management mode and/or a warm-up mode. The warm-up mode may be determined according to the engine recently starting after a predetermined period of time, according to an oil temperature and/or an engine coolant temperature, and additionally or alternatively according to an ambient temperature being below a threshold value. The thermal management mode may be determined according to an aftertreatment component being in an active regeneration state, a system component downstream of the engine requesting a temperature value, and/or according to a control state of the system marking the engine as being in a thermal management mode.

Yet another exemplary set of embodiments is a system. The system includes a hybrid power train having an engine, a first electrical torque provider, and a second electrical torque provider, and a load mechanically coupled to the hybrid power train. The hybrid power train further includes a clutch coupled to the engine and the second electrical torque provider on a first side, and coupled to the first electrical torque provider and the load on a second side. The system further includes an electrical energy storage device electrically coupled to the first electrical torque provider and the second electrical torque provider, and a controller structured to functionally execute operations to control the hybrid power train. The controller implements a time-based hysteresis on clutch engage-disengage.

In certain embodiments, the controller further smooths torque and/or power commands for the engine and the second electrical torque provider in response to determining that a clutch engage-disengage event is one of occurring or imminent. An exemplary operation to smooth the torque and/or power commands includes applying a rate limiter and/or a low-pass filter to the engine and/or electrical torque provider torque and/or power commands. In certain embodiments, the controller performs the smoothing with a time constant that is fast relative to a highly transient operator torque request. For example, where the system should respond within 200 milliseconds to an operator request from 0% to 100% torque, the controller applies a time constant that is lower than 200 milliseconds to the torque/power commands. An exemplary embodiment includes providing the system time constant at about 5 times the expected response (i.e. about 40 milliseconds in the example), although slower responding times are also contemplated herein, including time constants at about 2 times or 3 times the expected response.

The determination that a clutch engage-disengage event is occurring or imminent may be determined according to a very rapid change in a difference between a first shaft coupled to the engine and the second electrical torque provider and a second shaft coupled to the first electrical torque provider and the load. Additionally or alternatively, the determination that the clutch engage-disengage event is occurring includes tracking a clutch position signal.

In certain embodiments, the controller provides a zero torque command to the second electrical torque provider in response to one of a clutch engaging event and/or a clutch disengaging event.

In certain embodiments, the system includes the first shaft coupling the clutch to the engine and the second electrical torque provider, and the second shaft coupling the clutch to the first electrical torque provider and the load. The exemplary controller closes the clutch in response to determining whether a speed of the first shaft is within a predetermined speed threshold value of a speed of the second shaft. An exemplary system further includes the controller operating a closed loop controller on a position of the clutch, where the clutch position error value is determined in response to a difference between the speed of the first shaft and the speed of the second shaft. The clutch responding to the closed loop controller is, in one embodiment, a non-binary clutch having multiple engagement values between fully open and fully closed. In certain embodiments, the closed loop controller includes an integral error term.

Yet another exemplary set of embodiments is a technique, including operating a hybrid power train including an internal combustion engine, one or more electrical torque providers, and an electrical energy storage device electrically coupled to the electrical torque provider(s). The technique further includes determining a machine power demand, and in response to the machine power demand, determining a power division description. In certain embodiments, the technique further includes interpreting a SOH for the electrical energy storage device, and adjusting the power division description in response to the SOH for the electrical energy storage device.

In certain embodiments, the technique further includes determining a SOC target for the electrical energy storage device in response to the SOH for the electrical energy storage device, and further adjusting the power division description in response to the SOC target for the electrical energy storage device. An exemplary technique further includes determining the SOC target in response to a charging energy efficiency for the electrical energy storage device. A still further exemplary technique includes determining the SOC target in response to a charge-discharge energy cycle efficiency for the electrical energy storage device.

In certain embodiments, the technique includes determining a discharge rate limit for the electrical energy storage device, and further adjusting the power division description in response to the discharge rate limit. An exemplary technique further includes determining the discharge rate limit in response to a SOH of the electrical energy storage device, a power bus deliverability value, a motor limit for an electrical torque provider, and/or an accessory load value. The accessory load value is the amount of energy or power the accessories are presently drawing from the electrical bus and/or the electrical energy storage device. Another exemplary technique includes determining the discharge rate limit in response to a power electronics throughput limit, where the power electronics is positioned between the electrical energy storage device and an electrical torque provider.

An exemplary technique further includes determining a charge rate limit for the electrical energy storage device, and further adjusting the power division description in response to the charge rate limit. A still further exemplary technique includes determining the charge rate limit in response to a SOH of the electrical energy storage device, a power bus deliverability value, a motor limit for one of the electrical torque providers, and/or an accessory load value. In certain embodiments, the technique further includes determining the discharge rate limit in response to a power electronics throughput limit, where the power electronics is positioned between the electrical energy storage device and an electrical torque provider.

Yet another exemplary set of embodiments is a technique, including operating a hybrid power train including an internal combustion engine and one or more electrical torque providers, determining a machine power demand, determining an audible noise limit value for the internal combustion engine, and determining a power division description in response to the machine power demand and the audible noise limit value. The technique further includes operating the internal combustion engine and the electrical torque provider(s) in response to the power division description. An exemplary technique further includes interpreting a noise input signal, and determining the audible noise limit value in response to the noise input signal. The noise input signal may be provided by a user input. An exemplary user input include a switch with a high/low noise setting, which may be tied to other system controls such as a switch that disables compression braking in an urban environment. In certain embodiments, the technique includes interpreting the noise input signal as a response to a vehicle being in a reverse gear, for example providing a minimum noise level in response to the vehicle being in the reverse gear. The described user inputs are exemplary and non-limiting.

In certain embodiments, the audible noise limit value is a maximum noise level and/or a minimum noise level. An exemplary technique includes determining the power division in response to the audible noise limit by limiting a rate of change of engine power output. The limiting of the rate of change of the engine power output includes a maximum rate of change and/or a minimum rate of change to provide engine operation consistent with the maximum or minimum audible noise level. In certain embodiments, the technique includes determining the audible noise rate limit value for the internal combustion engine, and adjusting the power division description in response to the audible noise rate limit value. For example, a high noise level may be acceptable, but a high rate of change of the noise level may be undesirable, and the technique includes limiting the audible noise rate limit value accordingly.

Yet another exemplary set of embodiments is a procedure for calibrating a hybrid power train control, and for controlling the hybrid power train. The procedure includes an operation to define an application operating cycle, and an operation to define a number of behavior matrices for a hybrid power train that powers the application. Each behavior matrix corresponds to operations of the hybrid power train operating in a parallel configuration, where the operations of the power train include operations of the power providing components that form a portion of the hybrid power train. The power providing components include an internal combustion engine and at least one electrical torque provider. For example, an exemplary behavior matrix includes a power contribution for an internal combustion engine and an electrical system as a function of a machine power demand and a machine shaft speed. The power contribution for the electrical system may be a single power contribution for the entire electrical system, or a specific power contribution for each electrical torque provider within the electrical system.

Where the behavior matrix provides the single power contribution for the entire electrical system, another procedure may be utilized downstream to determine the optimal contributions from each of the electrical torque providers to achieve the single power contribution for the entire electrical system. In certain embodiments, when the hybrid power train is operating in a series configuration, a first electrical torque provider provides the entire machine power demand, and the internal combustion engine provides power to maintain a battery or electrical energy storage device SOC.

The procedure further includes determining a number of behavior sequences, where each behavior sequence corresponds to one of the behavior matrices and includes a sequential set of values created from the corresponding behavior matrix applied sequentially to the application operating cycle. For example, the application operating cycle includes a sequential series of machine power demand and machine shaft speed values over a period of time, and the behavior sequence is the resultant sequential set of values created by applying the corresponding behavior matrix to the application operating cycle. The application operating cycle can be determined by any method understood in the art, including at least providing a model application operating cycle and/or determining the application operating cycle from GPS values for a contemplated driving route.

The procedure further includes confirming a feasibility of each of the behavior sequences, and determining a fitness value corresponding to each of the feasible behavior sequences. The exemplary procedure includes confirming the feasibility of each behavior sequence by determining whether an electrical limit is exceeded in the corresponding behavior sequence. For example, if a battery SOC range is exceeded (high or low), a torque or power output of one of the electrical torque providers is exceeded, and/or a power throughput of the battery or power electronics is exceeded, the behavior sequence is determined to be not feasible. In certain embodiments, the battery SOC is not utilized to determine the feasibility of the behavior sequence.

Another exemplary procedure includes an operation to confirm the feasibility of each behavior sequence by determining whether an emissions limit is exceeded in the corresponding behavior sequence. The emissions limit may be an aggregate limit (e.g. a certain amount of NOx per power-time utilized in the behavior sequence), a specific limit (e.g. operation at a disallowed point or emissions output), excessive operation in a designated NTE zone, or other limit understood in the art.

In certain additional or alternative embodiments, the procedure includes confirming the feasibility of each behavior sequence by determining whether an aftertreatment regeneration capability is provided in the corresponding behavior sequence. Determining whether the aftertreatment regeneration capability is provided includes determining whether aftertreatment regeneration conditions are provided by the behavior sequence, whether other operations of the system could provide the aftertreatment regeneration conditions during the behavior sequence, and/or whether the behavior sequence otherwise provides conditions such that an aftertreatment regeneration is not required. Any other operation known in the art to determine whether the behavior sequence is feasible in light of a contemplated aftertreatment system is understood to be included herein.

The operation to determine the fitness function of the feasible behavior sequences includes, in one example, determining a cost parameter comprising the aggregate cost of the behavior sequence. The cost parameter may be determined in currency units (e.g. dollars), emissions units, fuel consumption units, and/or as a unitless index value. Further, an exemplary operation includes determining ancillary costs and applying those to the fitness function. For example, where modified engine operations are required to achieve aftertreatment regeneration, a pro-rated aftertreatment regeneration cost is applied to the fitness function. In a further example, if the behavior sequence provides 20% of the particulates that are required before a particulate filter must be regenerated (i.e. after five executions of the behavior sequence, the particulate filter would require regeneration), and the exhaust temperatures of the engine are such that an amount of assistance is required to successfully achieve the regeneration, then $\frac{1}{5}^{th}$ of the cost of the amount of assistance is applied to the fitness function for the behavior sequence. One of skill in the art, having the benefit of the disclosures herein, can construct a fitness function that optimizes the parameter of interest, or the weighted set of parameters of interest, for the system.

The procedure further includes an operation to determine whether a convergence value indicates that a successful convergence has occurred in response to the fitness value corresponding to each of the feasible behavior sequences. An exemplary determination of whether the convergence value indicates a successful convergence is determining that a best fitness function from the set of fitness functions corresponding to the behavior sequences is more favorable than a threshold fitness value. Another exemplary determination of whether the convergence value indicates a successful convergence is determining that a best fitness function from a generation of the behavior sequences is less than a threshold value more favorable than a best fitness function from a previous generation of behavior sequences. Yet another exemplary determination of whether the convergence value indicates a successful convergence is determining that a predetermined number of generations of the behavior sequences have provided less than a threshold value of progress in a best fitness function.

The best fitness function may be replaced with an average fitness function, or an average of a subset of the best fitness functions, or by other parameters determined in response to the fitness functions of a generation of behavior sequences. The described operations for determining a convergence value are exemplary and non-limiting. Any convergence determination or algorithm understood in the art is contemplated herein.

Where the successful convergence has not occurred, the procedure includes determining a number of child behavior matrices in response to the number of behavior matrices, confirming the feasibility of each of the child behavior sequences resulting from the child behavior matrices, and determining the fitness value corresponding to each of the feasible child behavior sequences. The procedure further includes determining again whether the convergence value indicates that the successful convergence has occurred, in response to the fitness value corresponding to each of the feasible child behavior sequences.

An exemplary procedure includes determining a number of child behavior matrices by selecting a number of parent behavior matrices from the behavior matrices in response to the corresponding fitness functions. A further exemplary procedure includes selecting parent behavior matrices by selecting the most fit behavior matrices, and/or selecting behavior matrices having a survival probability related to the corresponding fitness function. Each parent behavior matrix may produce one child, or more than one child, with the number of child behavior matrices further determined according to the fitness function of the parent behavior matrix. Each child may likewise include any number of parent matrices, with an exemplary number of parent matrices being two. In certain further embodiments, the procedure includes crossing over behavior parameters between two or more parent behavior matrices to determine a child behavior matrix. In certain further embodiments, the procedure includes applying a random change to a parameter of the child behavior matrix.

The rate of random change (i.e. mutations) and the number of parameters subject to mutation are selectable parameters. A higher mutation rate may provide a faster convergence and be more resilient to behavior systems having many local minima. However, a mutation rate that is too high can cause an unstable solution progression and prevent convergence. One of skill in the art, having the benefit of the disclosures herein, can select appropriate values for the mutation rate to provide the desired convergence time and overall optimization certainty. Where the convergence time is too long, the mutation rate is decreased, and where the certainty of the optimization is in question, a number of generations can be operated with an increased mutation rate.

Where the successful convergence has occurred, the procedure includes determining a calibration matrix in response to the behavior matrices and the fitness values. The calibration matrix is selected from the matrices—behavior matrices or child behavior matrices—that correspond to the successful convergence check, i.e. the group of matrices from the convergent generation. An exemplary operation includes selecting a behavior matrix having the best fitness function. The technique further includes providing the calibration matrix to a hybrid power train controller, and operating a hybrid power train with the hybrid power train controller.

In an exemplary embodiment, the behavior matrices (the first generation and the child behavior matrices) include a number of hybrid power train operating conditions, and a behavior vector corresponding to each of the hybrid power train operating conditions. The behavior vector includes a power division description for the power providing devices. The power division description includes a power contribution for an internal combustion engine and a power contribution for an electrical system, or a power contribution for the internal combustion engine and a power contribution for each of the electrical torque providers. In certain embodiments, the number of hybrid power train operating conditions include a machine shaft speed and a machine power demand.

In certain embodiments, the power division description includes a total electrical contribution and an internal combustion engine contribution. In certain further embodiments, the power division description includes an internal combustion engine contribution, a power contribution of a first electrical torque provider, and a power contribution of a second electrical torque provider.

In certain embodiments, each contribution includes a discrete number of possible states, and each behavior matrix includes the discrete number of possible states corresponding to the contribution. In one example, the internal combustion engine contribution includes 1,024 states between horsepower values from −600 hp to +475 hp (for example in an engine having a compression brake capable of 600 hp of braking power and 475 hp of propulsion power), where the 1,024 states may be evenly divided or divided by any other scheme understood in the art.

In certain further embodiments, the discrete number of possible states corresponding may be varied as a characteristic changeable between a behavior matrix and a child behavior matrix, or a characteristic differing between two parent matrices and inheritable by the child matrix, and/or as a mutatable parameter. Where the discrete number of states of the child behavior matrix differ from the discrete number of states of a parent behavior matrix, the child behavior matrix may include interpolated or extrapolated values to approximate the parent behavior matrix. Accordingly, the genetic algorithm further divides the engine and/or electric motors into a number of discrete operating states (e.g. power output values), and converges on the beneficial number of the discrete operating states. Additionally or alternatively, the fitness function may be constructed to implement a cost to the number of operating states (e.g. based on incremental computing cost from storing larger power division description tables). In certain embodiments, the number of discrete operating states for the internal combustion engine is allowed to vary, but the number of discrete operating states for the electrical system, and/or the number of discrete operating states for each electrical torque provider is fixed.

In certain embodiments, the procedure includes determining whether the convergence value indicates that the successful convergence has occurred by determining whether an incremental improvement in a characteristic fitness value is lower than a convergence threshold value. In certain embodiments, the characteristic fitness function includes a best fitness value. In certain further embodiments, the method includes performing a sensitivity check on a behavior matrix corresponding to the best fitness value. An exemplary operation to perform a sensitivity check includes determining whether an incremental improvement in the characteristic fitness value exceeds an acute convergence threshold value.

In certain embodiments, the application operating cycle includes a driving route. Additional or alternative embodiments include the application operating cycle having a number of discrete driving routes having a similar duty cycle characteristic. In one example, a number of similar urban delivery routes may be included, and the application operating cycle includes the sum of the delivery routes (e.g. the routes placed together sequentially).

In certain embodiments, the procedure includes determining a number of calibration matrices, each calibration matrix corresponding to one of a number of application operating cycles, where each of the application operating cycles corresponds to a distinct duty cycle characteristic. The distinct duty cycle characteristic is a characteristic known, expected, or observed to provide a distinct optimal hybrid power train behavior. For example and without limitation, a first duty cycle characteristic may be level road long haul trucking, a second duty cycle characteristic may be rolling hills combined with interspersed mountain climbs and descents, and a third duty cycle characteristic may be a heavy load urban delivery route. Any selected duty cycle characteristic is contemplated herein.

In certain further embodiments, the procedure further includes determining a real-time duty cycle characteristic of the hybrid power train, and selecting one of a number of calibration matrices in response to the real-time duty cycle characteristic, and further in response to the distinct duty cycle characteristics corresponding to the observed application operating cycles during the operation of the hybrid power train. In certain embodiments, the procedure includes selecting one of the calibration matrices, and/or interpolating between two of the calibration matrices in response to the real-time duty cycle characteristic and the distinct duty cycle characteristics corresponding to the application operating cycles.

In certain embodiments, the parallel configuration constrains the engine, the first electrical torque provider, and the second electrical torque provider to operate at one of a uniform speed or at a fixed ratio of speeds. For example a gear positioned between the engine and the first electrical torque provider may constrain the first electrical torque provider to operate at a fixed ratio relative to the engine.

An exemplary fitness value includes a fuel economy cost and/or an emissions cost. An exemplary fitness value further includes a secondary cost of emissions. An exemplary secondary cost of emissions includes a service life cost of an aftertreatment device (e.g. an incremental service life lost due to subsequent regeneration increment to eliminate the received emissions increment), an operating cost of the aftertreatment device (e.g. urea or $NH_3$ usage to respond to the received emissions), and/or an aftertreatment device regeneration cost of the aftertreatment device.

An exemplary procedure includes downloading run-time data of the hybrid power train to an external computer, selecting at least a portion of the run-time data as an application operating cycle, and generating a second calibration matrix in response to the run-time data. The external computer includes a computer on-board a vehicle having the hybrid power train, and/or a computer external the vehicle having the hybrid power train.

In one example, the external computer is a fleet computer, and a fleet owner operates the calibration routine on the real run-time data of the controller after downloading the run-time data from the controller. In certain embodiments, the system thereby responds to a change in the driving route or drive cycle, including responses to a change in a driver, a change in a traffic pattern, a seasonal change in the driving route, and/or a change in the utilization of the vehicle. The downloaded data, or a portion of the downloaded data, may be utilized after each vehicle long cycle, for example every 10 days on a long haul vehicle that averages 10 days away from the fleet home. Accordingly, the response time of the calibration of the controls is selectable in a manner that is sensible for the application, and that can respond with improved controls within one driving route execution.

An exemplary procedure includes utilizing the original calibration matrix as a parent behavior matrix. The utilization of the original calibration matrix as a parent behavior matrix bounds, to an extent, the output of the updated calibration matrix and limits the amount of change experienced by a vehicle operator within a single update of the calibration matrix. An additional or alternative embodiment includes limiting an amount of change between the calibration matrix and the second calibration matrix. In certain embodiments, limiting the amount of change includes incrementally moving a current calibration matrix to a more optimal calibration matrix over a period of time, and/or only partially applying a more optimal calibration matrix to a current calibration matrix, and potentially re-checking the run-time data before further changes in the calibration matrix.

In certain embodiments, the run-time data is compressed and stored on a controller of the hybrid power train until the downloading. Any compression operation known in the art is contemplated herein. The compression may be lossless, for example by lumping redundant speed-power values, accessing externally available data with labels rather than using the raw data such as labeling highway route data, and/or any other lossless compression known to one of skill in the art having the benefit of the disclosures herein. The compression may, alternatively or additionally, be lossy—for example providing time averaged samples of the data, providing Fourier compressed data values (or other similar compression mechanisms for sequential data), or by any other method understood in the art. The use of compressed data allows the controller to provide the data to an external computer more rapidly, and further allows the data to be stored without taking up as much memory in the controller where, for embedded controllers, memory space is often at a premium.

Yet another exemplary set of embodiments is a system, including a hybrid power train having an internal combustion engine and an electrical system, the electrical system including a first electrical torque provider, a second electrical torque provider, and an electrical energy storage device electrically coupled to the first electrical torque provider and the second electrical torque provider. The system further includes a controller structured to perform certain operations for controlling a hybrid power train.

The controller determines a power surplus value of the electrical system, determines a machine power demand change value, and operates an optimum cost controller to determine a power division for the engine, first electrical torque provider, and second electrical torque provider in response to the power surplus value of the electrical system being greater than or equal to the machine power demand change value. An exemplary controller further operates a rule-based controller to determine the power division for the engine, first electrical torque provider, and second electrical torque provider in response to the power surplus value of the electrical system being less than the machine power demand change value. In certain embodiments, the controller includes operating the rule-based controller in response to the machine power demand change value exceeding a threshold, even where the first electrical torque provider has a power surplus value.

An exemplary system further includes the controller determining the power surplus value of the first electrical torque provider in response to the electrical system having power delivery availability to meet the machine power demand change value. The determination of power delivery availability may include determining that the first electrical torque provider has sufficient torque and/or power producing (or generating) capacity, a determination that power electronics for the first electrical torque provider have sufficient power transfer capability, and/or that the electrical energy storage device has sufficient charge, storage capacity, and/or power throughput available such that the first electrical torque provider can meet the machine power demand change value, or the machine power demand change value plus a threshold margin.

In certain embodiments, the controller determines the power surplus value in response to a torque rating of the first electrical torque provider, a torque rating of the second electrical torque provider, an accessory load, a throughput rating of the electrical energy storage device, an SOC of the electrical energy storage device, a throughput rating of a first power electronics interposed between the electrical energy storage device and the first electrical torque provider, and/or a throughput rating of a second power electronics interposed between the electrical energy storage device and the second electrical torque provider.

In certain embodiments, the controller further operates the optimum cost controller by incrementally changing a power provided by the engine in a first execution cycle, and determining whether the incrementally changed power improved a power cost value. An exemplary operation includes providing the incremental change first in one direction, until a change in sign is observed in the rate of change of the power cost value, then reversing the direction of the incremental change. In certain embodiments controller further applies a random noise value to the incrementally changing power provided by the engine. The random noise value may, in certain embodiments, reverse the direction of the incremental change, without changing the intended direction of the incremental change. For example, a present power division description may include 60% of the power provided by the internal combustion engine and 40% of the power provided by the electrical system, with the direction of the incremental change being toward more power from the internal combustion engine. In the example, a next execution cycle may nominally include an incremental change value of 1%, for an initial next power division description of 61% engine, 39% electrical. Where the random noise value applies a 2% decrease to the engine power contribution, the actually applied next power division description is 59% engine, 41% electrical system, with the intended direction continuing to be toward more engine power unless the decrease in the engine power shows a better cost outcome.

The random noise value, in certain embodiments, includes an amplitude selected in response to an expected local minima depth property of a response surface of the hybrid power train. The hybrid power train includes an operating cost surface that, in certain operating conditions, is susceptible to local minima on the cost response. For example, a large number of variations in the operating conditions (e.g. wide variety of traffic patterns and geographic differences), and/or a large number of devices having constraints (electric motor/generators, power electronics, internal combustion engine, battery and/or other storage devices) are indicators that local minima may be present. Devices having large differences between constrained or unconstrained behavior, and/or high turndown ratios (a large difference between minimal and maximal output) are indicators that local minima may be significantly deep—deep enough that a standard incremental change amount may walk over or be stuck within one of the local minima. Accordingly, the amplitude of the random noise value may be increased in situations where a large number of local minima, and/or local minima having significant depth are indicated.

In certain embodiments, the controller increases an amplitude of the incremental change in response to an increasing rate of change of the power cost value. For example, the controller determines the rate of change of the power cost value in response to an incremental change, and where the rate of change of the power cost value is increasing, the controller increases the amplitude of the incremental change. In a further example, the controller increases the internal combustion engine contribution from 25% to 28% of the machine power demand (a 3% incremental change). In a first exemplary response, the rate of change of the power cost value increases from 20 units/second to 30 units/second. Since the rate of change of the power cost value is positive and increasing, the controller in the example increases the amplitude of the incremental change to a value greater than the 3% (subject to the random noise effects, where present). In a second exemplary response, the rate of change of the power cost value increases from −20 units/second to −30 units/second. Since the rate of change of the power cost value is negative and increasing, the controller in the example increases the amplitude of the incremental change to a value greater than the 3%, and switches the sign of the incremental change since the cost outcome is getting worse. The described responses are exemplary and non-limiting.

In certain further embodiments, the controller further operates the optimum cost controller as a closed loop controller having an error value determined in response to a slope of the power cost value with time. In one example, the closed loop controller targets a slope of the power cost value with time of zero, and more specifically a zero slope corresponding to a minimum cost value or corresponding to a maximum benefit value. An exemplary optimum cost controller includes a proportional-integral controller. In certain embodiments, the system further includes the controller commanding the first electrical torque provider to meet the machine power demand change value.

In certain embodiments, the controller operates the rule-based controller by responding to increasing power demand by, in order and until the power demand is achieved, increasing power of the first electrical torque provider, increasing power of the second electrical torque provider, and increasing power of the engine. In certain embodiments, the controller operates the rule-based controller by responding to decreasing power demand by, in order and until the power demand is achieved, decreasing power of the first electrical torque provider, decreasing power of the second electrical torque provider, and decreasing power of the engine. An exemplary controller further limits the first electrical torque provider and the second electrical torque provider to a minimum zero torque until the engine reaches a minimum torque value during a decreasing power demand. Alternatively, the exemplary controller applies a maximum generating torque of the first electrical torque provider, then applies a maximum generating torque of the second electrical device during a decreasing power demand until the power demand is achieved.

An exemplary system further includes a clutch positioned with the first electrical torque provider and a load on a first side and with the internal combustion engine and the second electrical torque provider on a second side. The clutch in a closed position provides the hybrid power train in a parallel configuration, and the clutch in an open position provides the hybrid power train in a series configuration. An exemplary system further includes, in response to determining the clutch is open and the power surplus value is less than the machine power demand change value, the controller commanding the clutch to close. Another exemplary system includes, in response to determining the clutch is open and the power surplus value is less than the machine power demand change value, and further in response to determining the clutch is disallowed from closing, the controller commanding the first electrical torque provider to one of a maximum or minimum torque position.

As is evident from the figures and text presented above, a variety of embodiments according to the present invention are contemplated.

A first set of exemplary embodiments is a method, including determining a machine shaft torque demand and a machine shaft speed, and in response to the machine shaft torque demand and the machine shaft speed, determining a machine power demand. The method further includes, in response to determining the machine shaft speed is zero and the machine shaft torque demand is greater than zero, adjusting the machine power demand to a non-zero value. The method further includes determining a power division description between an internal combustion engine and one or more electrical torque providers, and operating the internal combustion engine and the electrical torque providers in response to the power division description.

Certain further exemplary embodiments of the method are described following. An exemplary method further includes determining an engine cost function that includes an engine operating cost as a function of engine power output, determining an electrical cost function that includes an electrical torque provider operating cost as a function of the electrical torque provider power output, where the method includes determining the power division description in response to the engine cost function and the electrical cost function. An exemplary embodiment further includes the electrical cost function having an efficiency of corresponding power electronics, where the power electronics are electrically positioned between the corresponding electrical torque provider and an electrical energy storage device. The electrical cost function may further include a generating operating region, and the electrical cost function may include an electrical energy storage efficiency and/or an electrical energy storage efficiency and recovery efficiency (i.e. the entire storage and recovery cycle efficiency).

An exemplary method further includes determining a second electrical cost function that includes a second electrical torque provider operating cost as a function of a second electrical torque provider power output, where the method includes determining the power division description further in response to the engine cost function, the electrical cost function, and the second electrical cost function. An exemplary second electrical cost function further includes an efficiency of the power electronics corresponding to the second electrical torque provider. In certain embodiments, the second electrical cost function includes a generating operating region, and accounts for a second storage efficiency and/or a second storage and recovery cycle efficiency.

In certain embodiments, the method includes one or more hybrid power train operating modes. In a first operating mode, the method includes disengaging a clutch between the internal combustion engine and the first electrical torque provider, and providing all of the machine power demand with the first electrical torque provider. In a second operating mode, the method includes engaging the clutch between the internal combustion engine and the first electrical torque provider and providing all of the machine power demand with the internal combustion engine. In a third operating mode, the method includes engaging the clutch between the internal combustion engine and the first electrical torque provider and dividing the machine power demand between the internal combustion engine and the first electrical torque provider. In a fourth operating mode, the method includes engaging the clutch between the internal combustion engine and the first electrical torque provider and dividing the power between the internal combustion engine and the second electrical torque provider. In a fifth operating mode, the method includes engaging the clutch between the internal combustion engine and the first electrical torque provider and dividing the power between the first electrical torque provider and the second electrical torque provider. In a sixth operating mode, the method includes engaging the clutch between the internal combustion engine and the first electrical torque provider and dividing the power between the internal combustion engine, the first electrical torque provider, and the second electrical torque provider.

Certain further exemplary embodiments include determining a cost disposition parameter, and determining each of the cost functions in response to the cost disposition parameter and a plurality of corresponding cost functions. For example, a first cost disposition parameter corresponds to a first set of cost functions, a second cost disposition parameter corresponds to a second set of cost functions, and the method includes determining whether the first cost disposition parameter or the second cost disposition parameter is to be utilized in the present application of the method. Exemplary cost disposition parameter include a duty cycle category and/or a drive route parameter. Exemplary operations to determine each cost function in response to the cost disposition parameter include selecting the cost functions corresponding to the cost disposition parameter, and interpolating between two proximate cost functions according to the cost disposition parameter.

Certain further embodiments of the method include adjusting the power division description in response to an electrical storage device state-of-charge. An exemplary method includes determining the electrical cost function(s) that describe the electrical torque provider(s) operating cost as a function of the power output for the corresponding electrical torque provider and further as a function of a state-of-charge for the electrical energy storage device.

In certain embodiments, the method includes determining a vehicle speed, and determining the power division description in response to the machine power demand and the vehicle speed. In a further embodiment, the method includes determining a number of nominal power division descriptions as a two-dimensional function of the vehicle speed and the machine power demand, and where determining the power division description further includes performing a lookup operation utilizing the plurality of nominal power division descriptions. For example, the lookup operation includes cross-referencing the vehicle speed and machine power demand to a table having nominal power division descriptions, and selecting the nominal power division description closest to the vehicle speed and machine power demand. The exemplary lookup operation may further include interpolating and/or extrapolating in one or both dimensions.

Certain exemplary embodiments includes the power division description determining the power division between the internal combustion engine, a first electrical torque provider, and a second electrical torque provider. An exemplary method includes, in response to determining that the second electrical torque provider provides the entire machine torque demand: disengaging a clutch positioned between the internal combustion engine and the second electrical torque provider.

In certain embodiments, the engine cost function includes an emissions cost for the engine—for example determined from the nominal emissions of the engine at the speed and torque indicated by the present engine speed and the contemplated power contribution of the engine. A further exemplary embodiment includes the engine cost function having a second emissions cost. For example, the first engine emissions cost may be determined for $NO_x$ emissions and the second engine emissions cost may be determined for particulate emissions. In certain further embodiments, the engine cost function further includes a secondary effect cost. Exemplary and non-limiting secondary effect costs include an incremental life loss of an aftertreatment component, and/or an incremental regeneration cost of the aftertreatment component. In certain further embodiments, one or more of the emissions cost or secondary effect costs include a discontinuity in the cost function.

The described power division operations may be performed when the machine power demand is positive or negative, and any power provider in the system may be providing power of a positive or negative magnitude regardless of the magnitude of the machine power demand. Exemplary and non-limiting examples include the machine power demand being positive, with the internal combustion engine providing positive power and an electrical torque provider providing negative power (e.g. to regenerate a battery). In certain embodiments, the power division description includes an engine braking target power value.

Another exemplary set of embodiments is a method, including determining a machine shaft torque demand and a machine shaft speed, and in response to the machine shaft torque demand and the machine shaft speed, determining a machine power demand. The method further includes determining a power division description between an internal combustion engine, a first electrical torque provider, and a second electrical torque provider, and determining a clutch position that is engaged or disengaged. The descriptions herein utilize a clutch position, however unless stated explicitly to the contrary, certain embodiments determine whether a hybrid power train is in a parallel arrangement or a serial arrangement, where the clutch engaged corresponds to the parallel arrangement and the clutch disengaged corresponds to the serial arrangement.

The clutch, for embodiments having the clutch, is interposed between the first electrical torque provider on a first side and the internal combustion engine and the second electrical torque provider on a second side. In certain further embodiments, a load is on the side of the clutch having the first electrical torque provider. The load receives the power output of the hybrid power train, and is at any position downstream of all power providing components in the hybrid power train. Exemplary and non-limiting loads include the drive wheels of a vehicle, a transmission tail shaft, a vehicle drive line, a power takeoff shaft, or a generator output shaft.

The exemplary method further includes determining a baseline power division description in response to a vehicle speed and the machine power demand. The vehicle speed, in certain embodiments, may be substituted with a load kinetic energy description, such as a rotating kinetic energy of a flywheel, rotating machine, etc. The method further includes determining a state-of-charge deviation for an electrical energy storage device, where the electrical energy storage device is electrically coupled to the first electrical torque provider and the second electrical torque provider. The description herein includes a single electrical energy storage device coupled to both electrical torque providers, however except where explicitly stated to the contrary an electrical energy storage device may be coupled to only a single electrical torque provider. Further, additional electrical energy storage devices may be present in a given system, each device coupled to at least one electrical torque provider. For example, and without limitation, a hypercapacitor or ultracapacitor may be incorporated into the electrical system and provide additional electrical energy storage capacity and electrical energy transient control.

The exemplary method further includes adjusting the baseline power division description in response to the state of charge deviation and the clutch position. In certain embodiments, determining the state-of-charge deviation for the electrical energy storage device includes determining a difference between a present state-of-charge and a target state-of-charge. In certain embodiments, the method include adjusting a state-of-charge deviation in response to a present vehicle speed, a temperature of the electrical energy storage device, a state-of-health of the electrical energy storage device, the machine power demand, and/or an integrated state-of-charge deviation over time.

An exemplary baseline power division description includes a total electrical contribution and a total engine contribution, where the exemplary method further includes, in response to determining the clutch is engaged, adjusting the baseline power division description by dividing the total electrical contribution in response to the machine shaft speed. In certain embodiments, the method includes determining a net power flux to the electrical energy storage device in response to the state of charge deviation, where adjusting the baseline power division description is in response to the net power flux. In certain embodiments, dividing the total electrical contribution is in response to a first efficiency of the first electrical torque provider at the machine shaft speed, and to a second efficiency of the second electrical torque provider at the machine shaft speed.

An exemplary method further includes, in response to determining the clutch is disengaged, adjusting the baseline power division description by commanding the second electrical torque provider to achieve the machine power demand, by commanding the first electrical torque provider to provide a net power flux to the electrical energy storage device, and by commanding the internal combustion engine to power the first electrical torque provider.

Several exemplary and non-limiting baseline power division descriptions are providing following.

A first example includes a total electrical contribution and a total engine contribution, where the total electrical contribution and the total engine contribution combined provide the machine power demand. A second example includes a power contribution for each of the internal combustion engine, the first electrical torque provider, and the second electrical torque provider, where the total power contributions provide the machine power demand. A third example includes a total electrical contribution, a total engine contribution, and a net power flux to the electrical power storage device, where the total electrical contribution, the total engine contribution, and the net power flux combine to provide the machine power demand.

A fourth example includes a power contribution for each of the internal combustion engine, the first electrical torque provider, the second electrical torque provider, and a net power flux to the electrical power storage device, where the total power contributions and the net power flux provide the machine power demand. A fifth example includes a total electrical contribution, a total engine contribution, a net power flux to the electrical power storage device, and a net power flux to accessories, where the total electrical contribution, the total engine contribution, the net power flux to the electrical energy storage device, and the net power flux to the accessories combine to provide the machine power demand. A sixth example includes a power contribution for each of the internal combustion engine, the first electrical torque provider, the second electrical torque provider, a net power flux to the electrical power storage device, and a net power flux to accessories, where the total power contributions, the net power flux to the electrical energy storage device, and the net power flux to the accessories provide the machine power demand.

The exemplary method further includes reducing the state of charge deviation and/or reducing a response to the state of charge deviation in response to an increasing vehicle speed.

An exemplary embodiment includes increasing a response to the state of charge deviation in response to a magnitude of the state of charge deviation, and/or increasing a response to the state of charge deviation over time in response to the state of charge deviation being maintained. A further embodiment includes responding to the state of charge deviation with a proportional and/or integral response.

An exemplary method includes determining the state of charge deviation in response to a target SOC. The method includes determining the target SOC in response to a vehicle speed, a vehicle mass, an electrical energy storage device capacity, an electrical energy storage device throughput limit, a first electrical torque provider throughput limit, a second electrical torque provider throughput limit, and/or an operator braking behavior. A further exemplary method includes determining a state of health of an electrical energy storage device, and further adjusting the response to the state of charge deviation in response to the state of health. An exemplary operation includes increasing the response to the state of charge deviation in response to the state of health being reduced. An exemplary method includes adjusting a response to the state of charge deviation in response to an operating temperature of the electrical energy storage device, for example increasing a response to the state of charge deviation in response to a lower operating temperature.

An exemplary method includes operating a closed loop controller having the state of charge deviation as an error value, where the closed loop controller includes an integral control term. Another exemplary method includes adjusting the state of charge deviation and/or a response to the state of charge deviation, in response to the machine power demand. A further exemplary method includes in response to the machine power demand being negative, increasing an SOC target for the electrical energy storage device, where the state of charge deviation is determined in response to the SOC target. An additional or alternative method includes, in response to the machine power demand being high, reducing an SOC target for the electrical energy storage device, where the state of charge deviation is determined in response to the SOC target.

Yet another exemplary set of embodiments is a method, including determining a machine shaft torque demand and a machine shaft speed, and in response to the machine shaft torque demand and the machine shaft speed, determining a machine power demand. The method further includes determining a power division description between an internal combustion engine, a first electrical torque provider, and a second electrical torque provider, determining a hybrid power train configuration as one of series and parallel, and determining a baseline power division description in response to a vehicle speed and the machine power demand. The method further includes determining a state-of-charge deviation for an electrical energy storage device electrically coupled to the first electrical torque provider and the second electrical torque provider, and adjusting the baseline power division description in response to the state of charge deviation and the hybrid power train configuration.

The exemplary method further includes determining the state-of-charge deviation for the electrical energy storage device by determining a difference between a present state-of-charge and a target state-of-charge. A further embodiment includes adjusting the state-of-charge deviation in response to a present vehicle speed, a temperature of the electrical energy storage device, a state-of-health of the electrical energy storage device, the machine power demand, and/or an integrated state-of-charge deviation over time.

In certain embodiments, the baseline power division description includes a total electrical contribution and a total engine contribution, and the method further includes, in response to determining the hybrid power train configuration is parallel, adjusting the baseline power division description by dividing the total electrical contribution between the first electrical torque provider and the second electrical torque provider in response to the machine shaft speed. A further embodiment includes determining a net power flux to the electrical energy storage device in response to the state of charge deviation, where the adjusting the baseline power division description is in response to the net power flux. Additionally or alternatively, the method includes dividing the total electrical contribution in response to a first efficiency of the first electrical torque provider at the machine shaft speed and a second efficiency of the second electrical torque provider at the machine shaft speed.

An exemplary method further includes, in response to determining the hybrid power train configuration is parallel, adjusting the baseline power division description by commanding the second electrical torque provider to achieve the machine power demand, commanding the first electrical torque provider to provide a net power flux to the electrical energy storage device, and commanding the internal combustion engine to power the first electrical torque provider.

Yet another exemplary set of embodiments is a method, including operating a hybrid power train having an internal combustion engine and one or more electrical torque providers. The method further includes determining a machine power demand for the hybrid power train, determining a power division between the internal combustion engine and the electrical torque provider in response to the machine power demand, determining a state-of-charge (SOC) of an electrical energy storage device electrically coupled to the at least one electrical torque provider, and interpreting a target SOC for the electrical energy storage device in response to a vehicle speed. The method further includes determining an SOC deviation for the electrical storage device, wherein the SOC deviation comprises a function of a difference between the SOC of the electrical energy storage device and the target SOC of the electrical energy storage device, and adjusting the power division in response to the SOC deviation.

In further embodiments, the method includes decreasing the target SOC in response to an increasing vehicle speed. An exemplary method includes adjusting the target SOC in response to a temperature of the electrical energy storage device. A further exemplary method includes decreasing the target SOC in response to a decreasing temperature of the electrical energy storage device. In certain embodiments, the method includes adjusting one of the target SOC and the SOC deviation in response to a state-of-health of the electrical storage device. Yet another exemplary embodiment includes adjusting a cost of the SOC deviation in response to a state of health of the electrical energy storage device. An exemplary method further includes increasing a cost of the SOC deviation in response to a decreased state of health of the electrical energy storage device.

In certain embodiments, the method includes determining the SOC deviation as a function of vehicle mass, electrical energy storage device capacity, an electrical energy storage device power limit, a torque capacity of an electrical torque provider, a power capacity of an electrical torque provider, and/or a detected operator braking behavior. Yet another embodiment includes determining the state of health of the electrical energy storage device in response to a throughput event of the electrical energy storage device, a SOC event of the electrical energy storage device (e.g. the SOC reaching a high or low SOC threshold value), a regeneration cycle event of the electrical energy storage device, and/or an age of the electrical energy storage device.

An exemplary method includes determining the power division and the adjusting the power division by operating a cost comparison algorithm between achieving the machine power demand with the internal combustion engine and the electrical energy storage device(s).

Yet another exemplary set of embodiments is a method, including operating a hybrid power train including an internal combustion engine and one or more electrical torque providers. The method further includes determining a machine power demand and, in response to the machine power demand, determining a power division description. The method further includes, in response to the power division description, operating the internal combustion engine and the at least one electrical torque provider, where operating the internal combustion engine includes starting the internal combustion engine in response to determining a battery SOC is about to fall below a limit.

In certain embodiments, the method includes performing engine shutdown and engine startup operations with at least one time hysteresis value. An exemplary method includes determining an engine shutdown time hysteresis value in response to a turbocharger temperature. Further exemplary embodiments include determining a turbocharger temperature value, and preventing the engine shutdown operation in response to the turbocharger temperature value exceeding a threshold. In certain embodiments, the method includes determining that an engine shutdown operation is requested and/or imminent, and the method further includes performing an engine-based turbocharger cooldown operation in response to the requested or imminent engine shutdown operation.

Certain exemplary embodiments include operating the internal combustion engine by starting the internal combustion engine in response to determining that a power demand is about to exceed an electrical limit, determining that a battery throughput limit is about to be exceeded, and/or determining that a power demand rate of increase exceeds a limit. In certain embodiments, the method includes operating the internal combustion engine by starting the internal combustion engine in response to determining that a battery SOC is below a threshold and/or determining that a power demand is above a threshold. An exemplary method further includes determining an engine start capability index of an electrical torque provider, and operating the internal combustion engine by starting the internal combustion engine in response to the engine start capability index being below a first threshold. A further exemplary embodiment includes operating the internal combustion engine by starting the internal combustion engine in response to determining that the engine start capability index is about to fall below a second threshold.

In certain embodiments, the method includes allowing an internal combustion engine shutdown in response to the hybrid power train operating in a series mode. An exemplary method includes preventing an internal combustion engine shutdown in response to the internal combustion engine operating in a thermal management mode and/or a warm-up mode.

Yet another exemplary set of embodiments is a system, including a hybrid power train including an engine, a first electrical torque provider, and a second electrical torque provider, a load mechanically coupled to the hybrid power train. The hybrid power train further includes a clutch coupled to the engine and the second electrical torque provider on a first side, and coupled to the first electrical torque provider and the load on a second side. The system further includes an electrical energy storage device electrically coupled to the first electrical torque provider and the second electrical torque provider, and a controller structured to functionally execute operations to control the hybrid power train. The controller implements a time-based hysteresis on clutch engage-disengage.

In certain embodiments, the controller further smooths torque commands for the engine and the second electrical torque provider in response to determining that a clutch engage-disengage event is one of occurring or imminent. An exemplary operation to smooth the torque commands includes applying a rate limiter and/or a low-pass filter to the engine and/or electrical torque provider torque commands. In certain embodiments, the controller performs the smoothing with a time constant that is fast relative to a highly transient operator torque request.

In certain embodiments, the controller provides a zero torque command to the second electrical torque provider in response to one of a clutch engaging event and/or a clutch disengaging event.

In certain embodiments, the system includes a first shaft coupling the clutch to the engine and the second electrical torque provider, and a second shaft coupling the clutch to the first electrical torque provider and the load. The controller is further structured to close the clutch in response to determining whether a speed of the first shaft is within a predetermined speed threshold value of a speed of the second shaft. An exemplary system further includes the controller structured to operate a closed loop controller on a position of the clutch, where a clutch position error value is determined in response to a difference between the speed of the first shaft and the speed of the second shaft. The clutch responding to the closed loop controller is, in one embodiment, a non-binary clutch having multiple engagement values between fully open and fully closed. In certain embodiments, the closed loop controller includes an integral error term.

Yet another exemplary set of embodiments is a method, including operating a hybrid power train including an internal combustion engine, one or more electrical torque providers, and an electrical energy storage device electrically coupled to the electrical torque provider(s). The method further includes determining a machine power demand, and in response to the machine power demand, determining a power division description. In certain embodiments, the method further includes interpreting a state of health for the electrical energy storage device, and adjusting the power division description in response to the state of health for the electrical energy storage device.

In certain embodiments, the method further includes determining a state of charge target for the electrical energy storage device in response to the state of health for the electrical energy storage device, and further adjusting the power division description in response to the state of charge target for the electrical energy storage device. An exemplary method further includes determining the state of charge target in response to a charging energy efficiency for the electrical energy storage device. A still further exemplary method includes determining the state of charge target in response to a charge-discharge energy cycle efficiency for the electrical energy storage device.

In certain embodiments, the method includes determining a discharge rate limit for the electrical energy storage device, and further adjusting the power division description in response to the discharge rate limit. An exemplary method further includes determining the discharge rate limit in response to a state of health of the electrical energy storage device, a power bus deliverability value, a motor limit for and electrical torque provider, and/or an accessory load value. Another exemplary method includes determining the discharge rate limit in response to a power electronics throughput limit, where the power electronics is positioned between the electrical energy storage device and an electrical torque provider.

An exemplary method further includes determining a charge rate limit for the electrical energy storage device, and further adjusting the power division description in response to the charge rate limit. A still further exemplary method includes determining the charge rate limit in response to a state of health of the electrical energy storage device, a power bus deliverability value, a motor limit for one of the electrical torque providers, and/or an accessory load value. In certain embodiments, the method further includes determining the discharge rate limit in response to a power electronics throughput limit, where the power electronics is positioned between the electrical energy storage device and an electrical torque provider.

Yet another exemplary set of embodiments is a method, including operating a hybrid power train including an internal combustion engine and one or more electrical torque providers, determining a machine power demand, determining an audible noise limit value for the internal combustion engine, and determining a power division description in response to the machine power demand and the audible noise limit value. The method further includes operating the internal combustion engine and the electrical torque provider(s) in response to the power division description. An exemplary method further includes interpreting a noise input signal, and determining the audible noise limit value in response to the noise input signal. The noise input signal may be provided by a user input.

In certain embodiments, the method includes interpreting the noise input signal as a response to a vehicle being in a reverse gear. In certain embodiments, the audible noise limit value is a maximum noise level and/or a minimum noise level. An exemplary method includes determining the power division in response to the audible noise limit by limiting a rate of change of engine power output. In certain embodiments, the method includes determining the audible noise rate limit value for the internal combustion engine, and adjusting the power division description in response to the audible noise rate limit value.

Yet another exemplary set of embodiments is a method, including defining an application operating cycle, and defining a number of behavior matrices for a hybrid power train that powers the application. Each behavior matrix corresponds to operations of the hybrid power train operating in a parallel configuration, where the operations of the power train include operations of the power providing components that form a portion of the hybrid power train. The power providing components include an internal combustion engine and at least one electrical torque provider. The method further includes determining a number of behavior sequences, where each behavior sequence corresponds to one of the behavior matrices and includes a sequential set of values created from the corresponding behavior matrix applied sequentially to the application operating cycle. The method further includes confirming a feasibility of each of the behavior sequences, and determining a fitness value corresponding to each of the feasible behavior sequences. The method further includes determining whether a convergence value indicates that a successful convergence has occurred in response to the fitness value corresponding to each of the feasible behavior sequences.

Where the successful convergence has not occurred, the method includes determining a number of child behavior matrices in response to the number of behavior matrices and the fitness value corresponding to each of the feasible behavior sequences, confirming the feasibility of each of the child behavior sequences resulting from the child behavior matrices, and determining the fitness value corresponding to each of the feasible child behavior sequences. The method further includes determining again whether the convergence value indicates that the successful convergence has occurred, in response to the fitness value corresponding to each of the feasible child behavior sequences.

Where the successful convergence has occurred, the method includes determining a calibration matrix in response to the behavior matrices and the fitness values. The calibration matrix is selected from the matrices—behavior matrices or child behavior matrices—that correspond to the successful convergence check. An exemplary operation includes selecting a behavior matrix having the best fitness function. The method further includes providing the calibration matrix to a hybrid power train controller, and operating a hybrid power train with the hybrid power train controller.

An exemplary method further includes confirming the feasibility of each behavior sequence and child behavior sequence by determining whether an electrical limit is exceeded in the corresponding behavior sequence.

An exemplary method includes determining a number of child behavior matrices by selecting a number of parent behavior matrices from the behavior matrices in response to the corresponding fitness functions. A further exemplary method includes selecting parent behavior matrices by selecting the most fit behavior matrices, and/or selecting behavior matrices having a survival probability related to the corresponding fitness function. In certain further embodiments, the method includes crossing over behavior parameters between two or more parent behavior matrices to determine a child behavior matrix. In certain further embodiments, the method includes applying a random change to a parameter of the child behavior matrix.

In still further embodiments, the method includes each of the behavior matrices and each of the child behavior matrices having a number of hybrid power train operating conditions, and a behavior vector corresponding to each of the hybrid power train operating conditions, wherein each behavior vector includes a power division description for the power providing devices. The power division description includes a power contribution for an internal combustion engine and a power contribution for an electrical system, or a power contribution for the internal combustion engine and a power contribution for each of the electrical torque providers. In certain embodiments, the number of hybrid power train operating conditions include a machine shaft speed and a machine power demand.

In certain embodiments, the power division description includes a total electrical contribution and an internal combustion engine contribution. In certain further embodiments, the power division description includes an internal combustion engine contribution, a power contribution of a first electrical torque provider, and a power contribution of a second electrical torque provider. In certain embodiments, each contribution includes a discrete number of possible states, and each behavior matrix includes the discrete number of possible states corresponding to the contribution. For example, the internal combustion engine contribution may include 1,024 states for horsepower from −600 hp to +475 hp (for example in an engine having a compression brake capable of 600 hp of braking power and 475 hp of propulsion power), where the 1,024 states may be evenly divided or divided by any other scheme understood in the art.

In certain further embodiments, the discrete number of possible states corresponding may be varied as a characteristic changeable between a behavior matrix and a child behavior matrix. An alternative or additional embodiment includes allowing the discrete number of possible states of the internal combustion engine contribution to vary as a characteristic changeable between a behavior matrix and a child behavior matrix.

In certain embodiments, the method includes determining whether the convergence value indicates that the successful convergence has occurred by determining whether an incremental improvement in a characteristic fitness value is lower than a convergence threshold value. In certain embodiments, the characteristic fitness function includes a best fitness value. In certain further embodiments, the method includes performing a sensitivity check on a behavior matrix corresponding to the best fitness value. An exemplary operation to perform a sensitivity check includes determining whether an incremental improvement in the characteristic fitness value exceeds an acute convergence threshold value.

In certain embodiments, the application operating cycle comprises a driving route. Additional or alternative embodiments include the application operating cycle including a number of discrete driving routes having a similar duty cycle characteristic. In certain embodiments, the method includes determining a number of calibration matrices, each calibration matrix corresponding to one of a number of application operating cycles, where each of the application operating cycles corresponds to a distinct duty cycle characteristic. In certain further embodiments, the method includes determining a real-time duty cycle characteristic of the hybrid power train, and selecting one of the plurality of calibration matrices in response to the real-time duty cycle characteristic and the distinct duty cycle characteristics corresponding to the application operating cycles during the operation of the hybrid power train. In certain embodiments, the method includes selecting one of the calibration matrices, and/or interpolating between two of the calibration matrices in response to the real-time duty cycle characteristic and the distinct duty cycle characteristics corresponding to the application operating cycles.

In certain embodiments, the parallel configuration constrains the engine, the first electrical torque provider, and the second electrical torque provider to operate at one of a uniform speed or at a fixed ratio of speeds. An exemplary fitness value includes a fuel economy cost and/or an emissions cost. An exemplary method includes confirming the feasibility of each behavior sequence and child behavior sequence by determining whether an emissions limit is exceeded in the corresponding behavior sequence. In certain additional or alternative embodiments, the method includes confirming the feasibility of each behavior sequence and child behavior sequence by determining whether an aftertreatment regeneration capability is provided in the corresponding behavior sequence.

An exemplary fitness value further includes a secondary cost of emissions. An exemplary secondary cost of emissions includes a service life cost of an aftertreatment device, an operating cost of the aftertreatment device, and/or an aftertreatment device regeneration cost of the aftertreatment device.

An exemplary method includes downloading run-time data of the hybrid power train to an external computer, selecting at least a portion of the run-time data as an application operating cycle, and generating second calibration matrix in response to the run-time data. The external computer includes a computer on-board a vehicle having the hybrid power train, and/or a computer external the vehicle having the hybrid power train. In certain embodiments, the method includes utilizing the original calibration matrix as a parent behavior matrix. An additional or alternative embodiment includes limiting an amount of change between the calibration matrix and the second calibration matrix. In certain embodiments, the run-time data is compressed and stored on a controller of the hybrid power train until the downloading.

Yet another exemplary set of embodiments is a system, including a hybrid power train having an internal combustion engine and an electrical system, the electrical system including a first electrical torque provider, a second electrical torque provider, and an electrical energy storage device electrically coupled to the first electrical torque provider and the second electrical torque provider. The system further includes a controller structured to perform certain operations for controlling a hybrid power train. The controller determines a power surplus value of the electrical system, determines a machine power demand change value, and operating an optimum cost controller to determine a power division for the engine, first electrical torque provider, and second electrical torque provider in response to the power surplus value of the electrical system being greater than or equal to the machine power demand change value. An exemplary controller further operates a rule-based controller to determine the power division for the engine, first electrical torque provider, and second electrical torque provider in response to the power surplus value of the electrical system being less than the machine power demand change value.

An exemplary system further includes the controller determining the power surplus value of the first electrical torque provider in response to the electrical system having power delivery availability to meet the machine power demand change value. In certain embodiments, the controller includes operating the rule-based controller in response to the machine power demand change value exceeding a threshold.

In certain embodiments, the controller determines the power surplus value in response to a torque rating of the first electrical torque provider, a torque rating of the second electrical torque provider, an accessory load, a throughput rating of the electrical energy storage device, an SOC of the electrical energy storage device, a throughput rating of a first power electronics interposed between the electrical energy storage device and the first electrical torque provider, and/or a throughput rating of a second power electronics interposed between the electrical energy storage device and the second electrical torque provider.

In certain embodiments, the controller further operates the optimum cost controller by incrementally changing a power provided by the engine in a first execution cycle, and determining whether the incrementally changed power improved a power cost value. In certain further embodiments, the controller further operates the optimum cost controller as a closed loop controller having an error value determined in response to a slope of the power cost value with time. An exemplary optimum cost controller includes a proportional-integral controller. An exemplary controller further applies a random noise value to the incrementally changing power provided by the engine. The random noise value, in certain embodiments, includes an amplitude selected in response to an expected local minima depth property of a response surface of the hybrid power train. In certain embodiments, the controller increases an amplitude of the incremental change in response to an increasing rate of change of the power cost value. In certain embodiments, the system further includes the controller commanding the first electrical torque provider to meet the machine power demand change value.

In certain embodiments, the controller operates the rule-based controller by responding to increasing power demand by, in order and until the power demand is achieved, increasing power of the first electrical torque provider, increasing power of the second electrical torque provider, and increasing power of the engine. In certain embodiments, the controller operates the rule-based controller by responding to decreasing power demand by, in order and until the power demand is achieved, decreasing power of the first electrical torque provider, decreasing power of the second electrical torque provider, and decreasing power of the engine. An exemplary controller further limits the first electrical torque provider and the second electrical torque provider to a minimum zero torque until the engine reaches a minimum torque value during a decreasing power demand.

An exemplary system further includes a clutch positioned with the first electrical torque provider and a load on a first side and with the internal combustion engine and the second electrical torque provider on a second side. The clutch in a closed position provides the hybrid power train in a parallel configuration, and the clutch in an open position provides the hybrid power train in a series configuration. An exemplary system further includes, in response to determining the clutch is open and the power surplus value is less than the machine power demand change value, the controller commanding the clutch to close. Another exemplary system includes, in response to determining the clutch is open and the power surplus value is less than the machine power demand change value, and further in response to determining the clutch is disallowed from closing, the controller commanding the first electrical torque provider to one of a maximum or minimum torque position.

A number of non-limiting exemplary embodiments and non-limiting forms of such exemplary embodiments will now be described. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein.

A first exemplary embodiment is a method, including determining a machine shaft torque demand and a machine shaft speed, in response to the machine shaft torque demand and the machine shaft speed, determining a machine power demand, determining a power division description between an internal combustion engine, a first electrical torque provider, and a second electrical torque provider, determining a hybrid power train configuration as one of series and parallel, determining a baseline power division description in response to a vehicle speed and the machine power demand, determining a state-of-charge (SOC) deviation for an electrical energy storage device electrically coupled to the first electrical torque provider and the second electrical torque provider, and adjusting the baseline power division description in response to the SOC deviation and the hybrid power train configuration.

In some forms according to the first exemplary embodiment the determining the hybrid power train configuration as one of series and parallel comprises determining a clutch position including one of engaged and disengaged, the clutch interposed between the first electrical torque provider on a first side and the internal combustion engine and the second electrical torque provider on a second side.

In some forms according to the first exemplary embodiment the determining the SOC deviation for the electrical energy storage device comprises determining a difference between a present SOC and a target SOC.

Some forms according to the first exemplary embodiment further include adjusting the SOC deviation in response to a parameter selected from the parameters consisting of: a present vehicle speed, a temperature of the electrical energy storage device, a state-of-health of the electrical energy storage device, the machine power demand, and an integrated SOC deviation over time.

In some forms according to the first exemplary embodiment the baseline power division description includes a total electrical contribution and a total engine contribution, the method further including, in response to determining the hybrid power train configuration is parallel, adjusting the baseline power division description by dividing the total electrical contribution between the first electrical torque provider and the second electrical torque provider in response to the machine shaft speed.

Some forms according to the first exemplary embodiment further include determining a net power flux to the electrical energy storage device in response to the SOC deviation, and wherein the adjusting the baseline power division description is in response to the net power flux.

In some forms according to the first exemplary embodiment the dividing the total electrical contribution is in response to a first efficiency of the first electrical torque provider at the machine shaft speed and a second efficiency of the second electrical torque provider at the machine shaft speed.

Some forms according to the first exemplary embodiment further include, in response to determining the hybrid power train configuration is series, adjusting the baseline power division description by commanding the second electrical torque provider to achieve the machine power demand, commanding the first electrical torque provider to provide a net power flux to the electrical energy storage device, and commanding the internal combustion engine to power the first electrical torque provider.

In some forms according to the first exemplary embodiment determining the baseline power division description includes determining one of a total electrical contribution and a total engine contribution, wherein the total electrical contribution and the total engine contribution combined provide the machine power demand, a power contribution for each of the internal combustion engine, the first electrical torque provider, and the second electrical torque provider, wherein the total of the power contributions provide the machine power demand, a total electrical contribution, a total engine contribution, and a net power flux to the electrical power storage device, wherein the total electrical contribution, the total engine contribution, and the net power flux combine to provide the machine power demand, a power contribution for each of the internal combustion engine, the first electrical torque provider, the second electrical torque provider, and a net power flux to the electrical power storage device, wherein the total of the power contributions and the net power flux provide the machine power demand, a total electrical contribution, a total engine contribution, a net power flux to the electrical power storage device, and a net power flux to accessories, wherein the total electrical contribution, the total engine contribution, the net power flux to the electrical energy storage device, and the net power flux to the accessories combine to provide the machine power demand, and a power contribution for each of the internal combustion engine, the first electrical torque provider, the second electrical torque provider, a net power flux to the electrical power storage device, and a net power flux to accessories, wherein the total of the power contributions, the net power flux to the electrical energy storage device, and the net power flux to the accessories provide the machine power demand.

Some forms according to the first exemplary embodiment further include reducing one of a SOC deviation and a response to the SOC deviation in response to an increasing vehicle speed.

Some forms according to the first exemplary embodiment further include increasing a response to the SOC deviation in response to a magnitude of the SOC deviation.

Some forms according to the first exemplary embodiment further include determining the SOC deviation in response to a target SOC, wherein the target SOC is determined in response to at least one parameter selected from the parameters consisting of a vehicle speed, a vehicle mass, an electrical energy storage device capacity, an electrical energy storage device throughput limit, a first electrical torque provider throughput limit, a second electrical torque provider throughput limit, and an operator braking behavior.

Some forms according to the first exemplary embodiment further include determining a state of health of the electrical energy storage device, and further adjusting the response to the SOC deviation in response to the state of health.

Some forms according to the first exemplary embodiment further include increasing the response to the SOC deviation in response to the state of health being reduced.

Some forms according to the first exemplary embodiment further include adjusting a response to the SOC deviation in response to an operating temperature of the electrical energy storage device.

Some forms according to the first exemplary embodiment further include operating a closed loop controller having the SOC deviation as an error value, wherein the closed loop controller includes an integral control term.

Some forms according to the first exemplary embodiment further include adjusting one of the SOC deviation and a response to the SOC deviation, in response to the machine power demand.

Some forms according to the first exemplary embodiment further include, in response to the machine power demand being negative, increasing an SOC target for the electrical energy storage device, wherein the SOC deviation is determined in response to the SOC target.

Some forms according to the first exemplary embodiment further include, in response to the machine power demand being high, reducing an SOC target for the electrical energy storage device, wherein the SOC deviation is determined in response to the SOC target.

A second exemplary embodiment is a method including determining a machine power demand, determining a power division description between an internal combustion engine, a first electrical torque provider, and a second electrical torque provider, determining a clutch position including one of engaged and disengaged, the clutch interposed between the first electrical torque provider on a first side and the internal combustion engine and the second electrical torque provider on a second side, determining a baseline power division description in response to a vehicle speed and the machine power demand, determining a state-of-charge (SOC) deviation for an electrical energy storage device electrically coupled to the first electrical torque provider and the second electrical torque provider, and adjusting the baseline power division description in response to the SOC deviation and the hybrid power train configuration.

Some forms according to the second exemplary embodiment further include determining that the hybrid power train is in a parallel configuration in response to determining the clutch is engaged.

Some forms according to the second exemplary embodiment further include increasing a response to the SOC deviation in response to a magnitude of the SOC deviation.

Some forms according to the second exemplary embodiment further include determining the SOC deviation in response to a target SOC, wherein the target SOC is determined in response to at least one parameter selected from the parameters consisting of a vehicle speed, a vehicle mass, an electrical energy storage device capacity, an electrical energy storage device throughput limit, a first electrical torque provider throughput limit, a second electrical torque provider throughput limit, and an operator braking behavior.

Some forms according to the second exemplary embodiment further include determining a state of health of the electrical energy storage device, and further adjusting the response to the SOC deviation in response to the state of health.

Some forms according to the second exemplary embodiment further include increasing the response to the SOC deviation in response to the state of health being reduced.

A third exemplary embodiment is a method including determining a machine shaft torque demand and a machine shaft speed, in response to the machine shaft torque demand and the machine shaft speed, determining a machine power demand, determining a power division description between an internal combustion engine, a first electrical torque provider, and a second electrical torque provider, determining a hybrid power train configuration as one of series and parallel, determining a baseline power division description in response to a vehicle speed and the machine power demand, determining a state-of-charge (SOC) deviation for an electrical energy storage device electrically coupled to the first electrical torque provider and the second electrical torque provider, wherein the determining the SOC deviation for the electrical energy storage device comprises determining a difference between a present SOC and a target SOC, and adjusting the baseline power division description in response to the SOC deviation and the hybrid power train configuration.

Some forms according to the third exemplary embodiment further include determining the SOC target SOC in response to at least one parameter selected from the parameters consisting of a state of health of the electrical energy storage device, a vehicle speed, a vehicle mass, an electrical energy storage device capacity, an electrical energy storage device throughput limit, a first electrical torque provider throughput limit, a second electrical torque provider throughput limit, and an operator braking behavior.

In some forms according to the third exemplary embodiment determining the baseline power division description comprises determining a total electrical contribution and a total engine contribution, wherein the total electrical contribution and the total engine contribution combined provide the machine power demand, In some forms according to the third exemplary embodiment determining the baseline power division description comprises determining a power contribution for each of the internal combustion engine, the first electrical torque provider, and the second electrical torque provider, wherein the total of the power contributions provide the machine power demand.

In some forms according to the third exemplary embodiment determining the baseline power division description comprises determining a total electrical contribution, a total engine contribution, and a net power flux to the electrical power storage device, wherein the total electrical contribution, the total engine contribution, and the net power flux combine to provide the machine power demand.

In some forms according to the third exemplary embodiment determining the baseline power division description comprises determining a power contribution for each of the internal combustion engine, the first electrical torque provider, the second electrical torque provider, and a net power flux to the electrical power storage device, wherein the total of the power contributions and the net power flux provide the machine power demand.

In some forms according to the third exemplary embodiment determining the baseline power division description comprises determining a total electrical contribution, a total engine contribution, a net power flux to the electrical power storage device, and a net power flux to accessories, wherein the total electrical contribution, the total engine contribution, the net power flux to the electrical energy storage device, and the net power flux to the accessories combine to provide the machine power demand.

In some forms according to the third exemplary embodiment determining the baseline power division description comprises determining a power contribution for each of the internal combustion engine, the first electrical torque provider, the second electrical torque provider, a net power flux to the electrical power storage device, and a net power flux to accessories, wherein the total of the power contributions, the net power flux to the electrical energy storage device, and the net power flux to the accessories provide the machine power demand.

A fourth exemplary embodiment is a method including operating a hybrid power train having an internal combustion engine and at least one electrical torque provider, determining a machine power demand for the hybrid power train, determining a power division between the internal combustion engine and the electrical torque provider in response to the machine power demand, determining a state-of-charge (SOC) of an electrical energy storage device electrically coupled to the at least one electrical torque provider, interpreting a target SOC for the electrical energy storage device in response to a vehicle speed, determining an SOC deviation for the electrical storage device, wherein the SOC deviation comprises a function of a difference between the SOC of the electrical energy storage device and the target SOC of the electrical energy storage device, and adjusting the power division in response to the SOC deviation.

Some forms according to the fourth exemplary embodiment further include decreasing the target SOC in response to an increasing vehicle speed.

Some forms according to the fourth exemplary embodiment further include adjusting the target SOC in response to a temperature of the electrical energy storage device.

Some forms according to the fourth exemplary embodiment further include decreasing the target SOC in response to a decreasing temperature of the electrical energy storage device.

Some forms according to the fourth exemplary embodiment further include adjusting one of the target SOC and the SOC deviation in response to a state-of-health of the electrical storage device.

Some forms according to the fourth exemplary embodiment further include increasing the SOC deviation in response to a degraded state-of-health of the electrical storage device.

In some forms according to the fourth exemplary embodiment the determining the power division and the adjusting the power division comprise operating a cost comparison algorithm between achieving the machine power demand with the internal combustion engine and the at least one electrical energy storage device.

Some forms according to the fourth exemplary embodiment further include increasing a cost of the SOC deviation in response to a decreased state-of-health of the electrical energy storage device.

Some forms according to the fourth exemplary embodiment further include determining the state-of-health of the electrical energy storage device in response to at least one parameter selected from the parameters consisting of: a throughput event of the electrical energy storage device, a SOC event of the electrical energy storage device, a regeneration cycle event of the electrical energy storage device, and an age of the electrical energy storage device.

Some forms according to the fourth exemplary embodiment further include determining the SOC deviation as a function of at least one parameter selected from the parameters consisting of: a vehicle mass, an electrical energy storage device capacity, an electrical energy storage device power limit, a torque capacity of the at least one electrical torque provider, a power capacity of the at least one electrical torque provider, and detected operator braking behavior.

Some forms according to the fourth exemplary embodiment further include adjusting a target SOC of the electrical energy storage device in response to the state-of-health of the electrical energy storage device.

A fifth exemplary embodiment is a method including operating a hybrid power train having an internal combustion engine and at least one electrical torque provider, determining a state-of-charge (SOC) of an electrical energy storage device electrically coupled to the at least one electrical torque provider, interpreting a target SOC for the electrical energy storage device in response to a vehicle speed, determining an SOC deviation for the electrical storage device, wherein the SOC deviation comprises a function of a difference between the SOC of the electrical energy storage device and the target SOC of the electrical energy storage device, and adjusting operations of the hybrid power train in response to the SOC deviation.

Some forms according to the fifth exemplary embodiment further include increasing the target SOC in response to a reduced vehicle speed.

Some forms according to the fifth exemplary embodiment further include reducing the target SOC in response to an increased vehicle speed.

Some forms according to the fifth exemplary embodiment further include determining a recoverable kinetic energy of the vehicle in response to the vehicle speed, and wherein the interpreting the SOC target is in response to the recoverable kinetic energy.

Some forms according to the fifth exemplary embodiment further include determining a machine power demand for the hybrid power train, determining a power division between the internal combustion engine and the electrical torque provider in response to the machine power demand, and wherein the adjusting operations of the hybrid power train comprise adjusting the power division between the internal combustion engine and the electrical torque provider.

A sixth exemplary embodiment is a method including operating a hybrid power train having an internal combustion engine and at least one electrical torque provider, determining a machine shaft torque demand and a machine shaft speed, in response to the machine shaft torque demand and the machine shaft speed, determining a machine power demand, in response to determining the machine shaft speed is zero and the machine shaft torque demand is greater than zero, adjusting the machine power demand to a non-zero value, determining a power division between the internal combustion engine and the electrical torque provider in response to the machine power demand, determining a state-of-charge (SOC) of an electrical energy storage device electrically coupled to the at least one electrical torque provider, interpreting a target SOC for the electrical energy storage device in response to a vehicle speed, determining an SOC deviation for the electrical storage device, wherein the SOC deviation comprises a function of a difference between the SOC of the electrical energy storage device and the target SOC of the electrical energy storage device, and adjusting the power division in response to the SOC deviation.

Some forms according to the sixth exemplary embodiment further include decreasing the target SOC in response to an increasing vehicle speed.

In some forms according to the sixth exemplary embodiment the determining the power division and the adjusting the power division comprise operating a cost comparison algorithm between achieving the machine power demand with the internal combustion engine and the at least one electrical energy storage device.

Some forms according to the sixth exemplary embodiment further include increasing a cost of the SOC deviation in response to a decreased state-of-health of the electrical energy storage device.

A seventh exemplary embodiment is a method including operating a hybrid power train including an internal combustion engine and at least one electrical torque provider, determining a machine power demand, in response to the machine power demand, determining a power division description, in response to the power division description, operating the internal combustion engine and the at least one electrical torque provider, and wherein operating the internal combustion engine further comprises starting the internal combustion engine in response to determining a battery state-of-charge (SOC) is below a predetermined threshold value.

Some forms according to the seventh exemplary embodiment further include performing engine shutdown and engine startup operations with at least one time based hysteresis value.

Some forms according to the seventh exemplary embodiment further include determining an engine shutdown time hysteresis value in response to a turbocharger temperature.

Some forms according to the seventh exemplary embodiment further include determining a turbocharger temperature value, and preventing the engine shutdown operation in response to the turbocharger temperature value exceeding a threshold.

Some forms according to the seventh exemplary embodiment further include determining that an engine shutdown operation is one of requested and imminent, the method further including performing an engine-based turbocharger cooldown operation in response to the requested or imminent engine shutdown operation.

In some forms according to the seventh exemplary embodiment the operating the internal combustion engine further comprises starting the internal combustion engine in response to one of determining that a battery state-of-charge (SOC) is below a threshold and determining that the machine power demand is above a threshold.

Some forms according to the seventh exemplary embodiment further include determining an engine start capability index of the at least one electrical torque provider, and wherein operating the internal combustion engine further comprises starting the internal combustion engine in response to the engine start capability index being below a first threshold.

In some forms according to the seventh exemplary embodiment the operating the internal combustion engine further comprises starting the internal combustion engine in response to determining that the engine start capability index is about to fall below a second threshold.

Some forms according to the seventh exemplary embodiment further include allowing an internal combustion engine shutdown in response to the hybrid power train operating in a series mode.

Some forms according to the seventh exemplary embodiment further include preventing an internal combustion engine shutdown in response to the internal combustion engine operating in one of a thermal management mode and a warm-up mode.

An eighth exemplary embodiment is a method including operating a hybrid power train including an internal combustion engine and at least one electrical torque provider, determining a machine power demand, in response to the machine power demand, determining a power division description, in response to the power division description, operating the internal combustion engine and the at least one electrical torque provider, and wherein operating the internal combustion engine further comprises starting the internal combustion engine in response to determining a battery state-of-charge (SOC) is one of: below a first predetermined threshold value, and below a second predetermined threshold value and moving lower at a discharge rate exceeding a discharge threshold value.

In some forms according to the eighth exemplary embodiment operating the internal combustion engine further comprises starting the internal combustion engine in response to determining that a power demand is about to exceed an electrical limit.

In some forms according to the eighth exemplary embodiment operating the internal combustion engine further comprises starting the internal combustion engine in response to determining that a battery throughput limit is about to be exceeded.

In some forms according to the eighth exemplary embodiment operating the internal combustion engine further comprises starting the internal combustion engine in response to determining that a battery throughput value exceeds a battery throughput threshold and is moving higher at a throughput increase rate exceeding a throughput increase threshold.

In some forms according to the eighth exemplary embodiment operating the internal combustion engine further comprises starting the internal combustion engine in response to determining that a power demand rate of increase exceeds a limit.

A ninth exemplary embodiment is a method including operating a hybrid power train including an internal combustion engine and at least one electrical torque provider, determining a machine power demand, in response to the machine power demand, determining a power division description, in response to the power division description, operating the internal combustion engine and the at least one electrical torque provider, and wherein operating the internal combustion engine further comprises starting the internal combustion engine in response to one of: determining a battery state-of-charge (SOC) is below a predetermined threshold value, and determining the machine power demand exceeds an engine start threshold value and the machine power demand is increasing.

Some forms according to the ninth exemplary embodiment further include determining an engine start capability index of the at least one electrical torque provider, and wherein operating the internal combustion engine further comprises starting the internal combustion engine in response to the engine start capability index being below a start capability threshold.

In some forms according to the ninth exemplary embodiment the operating the internal combustion engine further comprises starting the internal combustion engine in response to determining that the engine start capability index is about to fall below a second start capability threshold.

Some forms according to the ninth exemplary embodiment further include performing engine shutdown and engine startup operations with at least one time based hysteresis value.

Some forms according to the ninth exemplary embodiment further include determining an engine shutdown time hysteresis value in response to a turbocharger temperature.

A tenth exemplary embodiment is a system including a hybrid power train including an engine, a first electrical torque provider, and a second electrical torque provider, a load mechanically coupled to the hybrid power train, the hybrid power train further including a clutch coupled to the engine and the second electrical torque provider on a first side, and coupled to the first electrical torque provider and the load on a second side, an electrical energy storage device electrically coupled to the first electrical torque provider and the second electrical torque provider, and a controller structured to perform operations to smooth torque commands for the engine and the second electrical torque provider in response to determining that a clutch engage-disengage event is one of occurring or imminent.

In some forms according to the tenth exemplary embodiment the controller is further structured to implement a time-based hysteresis on clutch engage-disengage.

In some forms according to the tenth exemplary embodiment the controller is further structured to smooth the torque commands by applying one of a rate limiter and a low-pass filter.

In some forms according to the tenth exemplary embodiment the controller is further structured to smooth torque commands for the engine and the second electrical torque provider, wherein the smoothing occurs with a time constant that is fast relative to a highly transient operator torque request.

In some forms according to the tenth exemplary embodiment the controller is further structured to smooth the torque commands by applying one of a rate limiter and a low-pass filter.

In some forms according to the tenth exemplary embodiment the controller is further structured to provide a zero torque command to the second electrical torque provider during a clutch engaging event.

In some forms according to the tenth exemplary embodiment the controller is further structured to provide a zero torque command to the second electrical torque provider during a clutch disengaging event.

Some forms according to the tenth exemplary embodiment further include a first shaft coupling the clutch to the engine and the second electrical torque provider, a second shaft coupling the clutch to the first electrical torque provider and the load, wherein the controller is further structured to close the clutch in response to determining a speed of the first shaft is within a predetermined speed threshold value of a speed of the second shaft.

In some forms according to the tenth exemplary embodiment the controller is further structured to operate a closed loop controller on a position of the clutch, wherein a clutch position error value is determined in response to a difference between the speed of the first shaft and the speed of the second shaft.

In some forms according to the tenth exemplary embodiment the closed loop controller includes an integral error term.

An eleventh exemplary embodiment is a method including determining that a clutch engage-disengage event is one of occurring or imminent, the clutch coupled to an engine and a second electrical torque provider on a first side, and coupled to a first electrical torque provider and a load on a second side, in response to the clutch engage-disengage event, smooth a torque command for the engine and for the second electrical torque provider, and wherein the smoothing includes applying one of a rate limiter and a low-pass filter.

Some forms according to the eleventh exemplary embodiment further include implementing a time-based hysteresis on clutch engage-disengage.

Some forms according to the eleventh exemplary embodiment further include performing the smoothing by applying the low-pass filter having a time constant that is fast relative to a highly transient operator torque request.

Some forms according to the eleventh exemplary embodiment further include applying the low-pass filter having a time constant that is faster than 500 ms.

Some forms according to the eleventh exemplary embodiment further include providing a zero torque command to the second electrical torque provider during a clutch engaging event.

Some forms according to the eleventh exemplary embodiment further include providing a zero torque command to the second electrical torque provider during a clutch disengaging event.

Some forms according to the eleventh exemplary embodiment further include determining a speed of a first shaft coupling the clutch to the engine and the second electrical torque provider, determining a speed of a second shaft coupling the clutch to the first electrical torque provider and the load, and closing the clutch in response to determining the speed of the first shaft is within a predetermined speed threshold value of the speed of the second shaft.

Some forms according to the eleventh exemplary embodiment further include determining a speed of a first shaft coupling the clutch to the engine and the second electrical torque provider, determining a speed of a second shaft coupling the clutch to the first electrical torque provider and the load, determining a clutch position error value in response to a difference between the speed of the first shaft and the speed of the second shaft, and operating a closed loop controller on a position of the clutch in response to the clutch position error value.

In some forms according to the eleventh exemplary embodiment the closed loop controller includes an integral error term.

A twelfth exemplary embodiment is a method including determining that a clutch engaging event is occurring, the clutch coupled to an engine and a second electrical torque provider on a first side, and coupled to a first electrical torque provider and a load on a second side, in response to the clutch engaging event, smooth a torque command for the engine and for the second electrical torque provider, and determining a speed of a first shaft coupling the clutch to the engine and the second electrical torque provider, determining a speed of a second shaft coupling the clutch to the first electrical torque provider and the load, determining a clutch position error value in response to a difference between the speed of the first shaft and the speed of the second shaft, and operating a closed loop controller on a position of the clutch in response to the clutch position error value.

In some forms according to the twelfth exemplary embodiment the closed loop controller includes an integral error term.

Some forms according to the twelfth exemplary embodiment further include providing a zero torque command to the second electrical torque provider during the clutch engaging event.

A thirteenth exemplary embodiment is a method including operating a hybrid power train including an internal combustion engine, at least one electrical torque provider, and an electrical energy storage device electrically coupled to the at least one electrical torque provider, determining a machine power demand, in response to the machine power demand, determining a power division description, interpreting a state-of-health (SOH) for the electrical energy storage device, and in response to the SOH for the electrical energy storage device, adjusting the power division description.

Some forms according to the thirteenth exemplary embodiment further include determining a state-of-charge (SOC) target for the electrical energy storage device in response to the SOH for the electrical energy storage device, and further adjusting the power division description in response to the SOC target for the electrical energy storage device.

Some forms according to the thirteenth exemplary embodiment further include determining the SOC target in response to a charging energy efficiency for the electrical energy storage device.

Some forms according to the thirteenth exemplary embodiment further include determining the SOC target in response to a charge-discharge energy cycle efficiency for the electrical energy storage device.

Some forms according to the thirteenth exemplary embodiment further include determining a discharge rate limit for the electrical energy storage device, and further adjusting the power division description in response to the discharge rate limit.

Some forms according to the thirteenth exemplary embodiment further include determining the discharge rate limit in response to at least one parameter selected from the parameters consisting of the SOH of the electrical energy storage device, a power bus deliverability value, a motor limit for one of the electrical torque providers, and an accessory load value.

Some forms according to the thirteenth exemplary embodiment further include determining the discharge rate limit in response to at least one power electronics throughput limit, wherein the power electronics is positioned between the electrical energy storage device and the at least one electrical torque provider.

Some forms according to the thirteenth exemplary embodiment further include determining a charge rate limit for the electrical energy storage device, and further adjusting the power division description in response to the charge rate limit.

Some forms according to the thirteenth exemplary embodiment further include determining the charge rate limit in response to at least one parameter selected from the parameters consisting of the SOH of the electrical energy storage device, a power bus deliverability value, a motor limit for one of the electrical torque providers, and an accessory load value.

Some forms according to the thirteenth exemplary embodiment further include determining the charge rate limit in response to at least one power electronics throughput limit, wherein the power electronics is positioned between the electrical energy storage device and the at least one electrical torque provider.

A fourteenth exemplary embodiment is a method including operating a hybrid power train including an internal combustion engine, at least one electrical torque provider, and an electrical energy storage device electrically coupled to the at least one electrical torque provider, determining a machine power demand, in response to the machine power demand, determining a power division description, interpreting a state-of-health (SOH) for the electrical energy storage device, a state-of-charge (SOC) for the electrical energy storage device, and a target SOC for the electrical energy storage device, determining an SOC deviation for the electrical energy device in response to the SOC for the electrical energy storage device the target SOC for the electrical energy storage device, and in response to the SOH for the electrical energy storage device and the SOC deviation for the electrical energy storage device, adjusting the power division description.

Some forms according to the fourteenth exemplary embodiment further include selecting one of a plurality of SOC deviation response curves in response to the SOH for the electrical energy storage device.

In some forms according to the fourteenth exemplary embodiment the plurality of SOC deviation response curves provide an increasing SOC deviation response in response to a decreasing SOH for the electrical energy storage device.

Some forms according to the fourteenth exemplary embodiment further include interpreting the target SOC for the electrical energy storage device in response to the SOH for the electrical energy storage device.

Some forms according to the fourteenth exemplary embodiment further include increasing the target SOC for the electrical energy storage device in response to a decreasing SOH for the electrical energy storage device.

Some forms according to the fourteenth exemplary embodiment further include interpreting the target SOC for the electrical energy storage device in response to a vehicle speed value.

Some forms according to the fourteenth exemplary embodiment further include reducing the target SOC for the electrical energy storage device in response to an increasing vehicle speed value.

A fifteenth exemplary embodiment is a method including determining a machine power demand for a hybrid power train including an internal combustion engine, at least one electrical torque provider, and an electrical energy storage device electrically coupled to the at least one electrical torque provider, interpreting a state-of-health (SOH) for the electrical energy storage device, and providing a power division description in response to the SOH for the electrical energy storage device and the machine power demand.

Some forms according to the fifteenth exemplary embodiment further include determining a state-of-charge (SOC) target for the electrical energy storage device in response to the SOH for the electrical energy storage device, and adjusting the power division description in response to the SOC target for the electrical energy storage device.

Some forms according to the fifteenth exemplary embodiment further include determining the SOC target in response to a charging energy efficiency for the electrical energy storage device.

Some forms according to the fifteenth exemplary embodiment further include determining the SOC target in response to a charge-discharge energy cycle efficiency for the electrical energy storage device.

Some forms according to the fifteenth exemplary embodiment further include determining a discharge rate limit for the electrical energy storage device, and adjusting the power division description in response to the discharge rate limit.

Some forms according to the fifteenth exemplary embodiment further include determining the discharge rate limit in response to at least one parameter selected from the parameters consisting of the SOH of the electrical energy storage device, a power bus deliverability value, a motor limit for one of the electrical torque providers, and an accessory load value.

Some forms according to the fifteenth exemplary embodiment further include determining the discharge rate limit in response to at least one power electronics throughput limit, wherein the power electronics is positioned between the electrical energy storage device and the at least one electrical torque provider.

Some forms according to the fifteenth exemplary embodiment further include determining a charge rate limit for the electrical energy storage device, and further adjusting the power division description in response to the charge rate limit.

Some forms according to the fifteenth exemplary embodiment further include determining the charge rate limit in response to at least one parameter selected from the parameters consisting of the SOH of the electrical energy storage device, a power bus deliverability value, a motor limit for one of the electrical torque providers, and an accessory load value.

Some forms according to the fifteenth exemplary embodiment further include determining the charge rate limit in response to at least one power electronics throughput limit, wherein the power electronics is positioned between the electrical energy storage device and the at least one electrical torque provider.

A sixteenth exemplary embodiment is a method including operating a hybrid power train including an internal combustion engine and at least one electrical torque provider, determining a machine power demand, determining an audible noise limit value for the internal combustion engine, in response to the machine power demand and the audible noise limit value, determining a power division description, and in response to the power division description, operating the internal combustion engine and the at least one electrical torque provider.

Some forms according to the sixteenth exemplary embodiment further include interpreting a noise input signal, and wherein determining the audible noise limit value is in response to the noise input signal.

In some forms according to the sixteenth exemplary embodiment the noise input signal is provided by a user input.

In some forms according to the sixteenth exemplary embodiment the noise input signal is in response to a vehicle being in a reverse gear.

In some forms according to the sixteenth exemplary embodiment the audible noise limit value comprises one of a maximum noise level and a minimum noise level.

In some forms according to the sixteenth exemplary embodiment determining the power division in response to the audible noise limit comprises limiting a rate of change of engine power output.

Some forms according to the sixteenth exemplary embodiment further include determining an audible noise rate limit value for the internal combustion engine, and adjusting the power division description in response to the audible noise rate limit value.

A seventeenth exemplary embodiment is a method including defining an application operating cycle, defining a plurality of behavior matrices for a hybrid power train structured to power the application, wherein each behavior matrix corresponds to operations of the hybrid power train operating in a parallel configuration, the operations including operations of power providing components including a portion of the hybrid power train, wherein the power providing components comprise an internal combustion engine and at least one electrical torque provider, determining a plurality of behavior sequences, each behavior sequence corresponding to one of the behavior matrices and including a sequential set of values including the corresponding behavior matrix applied sequentially to the application operating cycle, confirming a feasibility of each of the behavior sequences, determining a fitness value corresponding to each of the feasible behavior sequences, in response to the fitness value corresponding to each of the feasible behavior sequences, determining whether a convergence value indicates that a successful convergence has occurred, and in response to determining that a successful convergence has occurred, determining a calibration matrix in response to the behavior matrices and the fitness values, and providing the calibration matrix to a hybrid power train controller.

Some forms according to the seventeenth exemplary embodiment further include operating a hybrid power train with the hybrid power train controller.

Some forms according to the seventeenth exemplary embodiment further include, in response to determining that the successful convergence has not occurred, determining a plurality of child behavior matrices in response to the plurality of behavior matrices and the fitness value corresponding to each of the feasible behavior sequences, confirming the feasibility of each of the child behavior sequences resulting from the child behavior matrices, determining the fitness value corresponding to each of the feasible child behavior sequences, and in response to the fitness value corresponding to each of the feasible child behavior sequences further determining whether the convergence value indicates that the successful convergence has occurred.

In some forms according to the seventeenth exemplary embodiment the confirming the feasibility of each behavior sequence and child behavior sequence comprises determining whether an electrical limit is exceeded in the corresponding behavior sequence.

In some forms according to the seventeenth exemplary embodiment the determining a plurality of child behavior matrices includes selecting a plurality of parent behavior matrices from the behavior matrices in response to the corresponding fitness functions.

Some forms according to the seventeenth exemplary embodiment further include selecting parent behavior matrices according to an operation selected from the operations consisting of: selecting the most fit behavior matrices, and selecting behavior matrices having a survival probability related to the corresponding fitness function.

Some forms according to the seventeenth exemplary embodiment further include crossing over behavior parameters between two parent behavior matrices to determine a child behavior matrix.

Some forms according to the seventeenth exemplary embodiment further include applying a random change to a parameter of the child behavior matrix.

In some forms according to the seventeenth exemplary embodiment each of the behavior matrices and each of the child behavior matrices comprise: a plurality of hybrid power train operating conditions and a behavior vector corresponding to each of the hybrid power train operating conditions, wherein each behavior vector comprises a power division description for the power providing devices.

In some forms according to the seventeenth exemplary embodiment the plurality of hybrid power train operating conditions include a machine shaft speed and a machine power demand.

In some forms according to the seventeenth exemplary embodiment the power division description comprises a total electrical contribution and an internal combustion engine contribution.

In some forms according to the seventeenth exemplary embodiment the power division description comprises an internal combustion engine contribution, a power contribution of a first electrical torque provider, and a power contribution of a second electrical torque provider.

In some forms according to the seventeenth exemplary embodiment each contribution includes a discrete number of possible states, and wherein each behavior matrix includes the discrete number of possible states corresponding to the contribution.

Some forms according to the seventeenth exemplary embodiment further include allowing the discrete number of possible states corresponding to a contribution to vary.

Some forms according to the seventeenth exemplary embodiment further include allowing the discrete number of possible states of the internal combustion engine contribution to vary.

Some forms according to the seventeenth exemplary embodiment further include determining whether the convergence value indicates that the successful convergence has occurred by determining whether an incremental improvement in a characteristic fitness value is lower than a convergence threshold value.

In some forms according to the seventeenth exemplary embodiment the characteristic fitness value includes a best fitness value.

Some forms according to the seventeenth exemplary embodiment further include performing a sensitivity check on a behavior matrix corresponding to the best fitness value.

Some forms according to the seventeenth exemplary embodiment further include performing the sensitivity check in response to the incremental improvement in the characteristic fitness value exceeding an acute convergence threshold value.

An eighteenth exemplary embodiment is a method including defining a vehicle application operating cycle, defining a plurality of behavior matrices for a hybrid power train structured to power the vehicle, wherein each behavior matrix corresponds to operations of the hybrid power train operating in a parallel configuration, the operations including operations of power providing components including a portion of the hybrid power train, wherein the power providing components comprise an internal combustion engine and at least one electrical torque provider, determining a plurality of behavior sequences, each behavior sequence corresponding to one of the behavior matrices and including a sequential set of values including the corresponding behavior matrix applied sequentially to the vehicle application operating cycle, confirming a feasibility of each of the behavior sequences, determining a fitness value corresponding to each of the feasible behavior sequences, in response to the fitness value corresponding to each of the feasible behavior sequences, determining whether a convergence value indicates that a successful convergence has occurred, and in response to determining that a successful convergence has occurred, determining a calibration matrix in response to the behavior matrices and the fitness values, and providing the calibration matrix to a hybrid power train controller.

In some forms according to the eighteenth exemplary embodiment the vehicle application operating cycle comprises a driving route.

Some forms according to the eighteenth exemplary embodiment further include determining a plurality of calibration matrices, each calibration matrix corresponding to one of a plurality of driving routes, wherein each of the driving routes corresponds to a distinct duty cycle characteristic.

Some forms according to the eighteenth exemplary embodiment further include, in response to the operating the hybrid power train, determining a real-time duty cycle characteristic of the hybrid power train, and selecting one of the plurality of calibration matrices in response to the real-time duty cycle characteristic and the distinct duty cycle characteristic corresponding to the driving routes.

Some forms according to the eighteenth exemplary embodiment further include interpolating between two of the calibration matrices in response to the real-time duty cycle characteristic and the distinct duty cycle characteristic corresponding to the driving routes.

In some forms according to the eighteenth exemplary embodiment the vehicle application operating cycle includes a plurality of discrete driving routes having a similar duty cycle characteristic.

Some forms according to the eighteenth exemplary embodiment further include downloading run-time data of the hybrid power train to an external computer, selecting at least a portion of the run-time data as a vehicle application operating cycle, and generating second calibration matrix in response to the run-time data.

In some forms according to the eighteenth exemplary embodiment the external computer comprises one of a computer on-board a vehicle having the hybrid power train and a computer external to the vehicle having the hybrid power train.

In some forms according to the eighteenth exemplary embodiment the original calibration matrix is utilized as a parent behavior matrix.

Some forms according to the eighteenth exemplary embodiment further include limiting an amount of change between the calibration matrix and the second calibration matrix.

In some forms according to the eighteenth exemplary embodiment the run-time data is compressed and stored on a controller of the hybrid power train until the downloading.

An nineteenth exemplary embodiment is a method including defining an application operating cycle, defining a plurality of behavior matrices for a hybrid power train structured to power the application, wherein each behavior matrix corresponds to operations of the hybrid power train operating in a parallel configuration, the operations including operations of power providing components including a portion of the hybrid power train, wherein the power providing components comprise an internal combustion engine and at least one electrical torque provider, determining a plurality of behavior sequences, each behavior sequence corresponding to one of the behavior matrices and including a sequential set of values including the corresponding behavior matrix applied sequentially to the application operating cycle, determining a fitness value corresponding to each of the behavior sequences, in response to the fitness value corresponding to each of the behavior sequences, determining whether a convergence value indicates that a successful convergence has occurred, and in response to determining that a successful convergence has occurred, determining a calibration matrix in response to the behavior matrices and the fitness values, and providing the calibration matrix to a hybrid power train controller.

Some forms according to the nineteenth exemplary embodiment further include, in response to determining that the successful convergence has not occurred, determining a plurality of child behavior matrices in response to the plurality of behavior matrices and the fitness value corresponding to each of the behavior sequences, determining the fitness value corresponding to each of the child behavior sequences, and in response to the fitness value corresponding to each of the child behavior sequences further determining whether the convergence value indicates that the successful convergence has occurred.

Some forms according to the nineteenth exemplary embodiment further include confirming a feasibility of each of the behavior sequences, wherein the determining the fitness value comprises determining the fitness value corresponding to each of the feasible sequences.

Some forms according to the nineteenth exemplary embodiment further include, in response to determining that the successful convergence has not occurred, determining a plurality of child behavior matrices in response to the plurality of behavior matrices and the fitness value corresponding to each of the feasible behavior sequences, confirming the feasibility of each of the child behavior sequences resulting from the child behavior matrices, determining the fitness value corresponding to each of the feasible child behavior sequences, and in response to the fitness value corresponding to each of the feasible child behavior sequences further determining whether the convergence value indicates that the successful convergence has occurred.

In some forms according to the nineteenth exemplary embodiment the confirming the feasibility of each behavior sequence and child behavior sequence comprises determining whether an emissions limit is exceeded in the corresponding behavior sequence.

In some forms according to the nineteenth exemplary embodiment the confirming the feasibility of each behavior sequence and child behavior sequence comprises determining whether an aftertreatment regeneration capability is provided in the corresponding behavior sequence.

In some forms according to the nineteenth exemplary embodiment the parallel configuration constrains the engine, the first electrical torque provider, and the second electrical torque provider to operate at one of a uniform speed or at a fixed ratio of speeds.

In some forms according to the nineteenth exemplary embodiment the fitness value comprises a fuel economy cost.

In some forms according to the nineteenth exemplary embodiment the fitness value comprises an emissions cost.

In some forms according to the nineteenth exemplary embodiment the fitness value comprises a secondary cost of emissions.

In some forms according to the nineteenth exemplary embodiment the secondary cost of emissions comprises at least one secondary cost selected from the secondary costs consisting of: a service life cost of an aftertreatment device, an operating cost of the aftertreatment device, and an aftertreatment device regeneration cost of the aftertreatment device.

A twentieth exemplary embodiment is a method including a hybrid power train including an internal combustion engine and an electrical system, the electrical system including a first electrical torque provider, a second electrical torque provider, and an electrical energy storage device electrically coupled to the first electrical torque provider and the second electrical torque provider, a controller structured to perform operations including: determining a power surplus value of the electrical system, determining a machine power demand change value, in response to the power surplus value of the electrical system being greater than or equal to the machine power demand change value, operating an optimum cost controller to determine a power division for the engine, first electrical torque provider, and second electrical torque provider, and in response to the power surplus value of the electrical system being less than the machine power demand change value, operating a rule-based controller to determine the power division for the engine, first electrical torque provider, and second electrical torque provider.

In some forms according to the twentieth exemplary embodiment the controller is further structured to determine the power surplus value of the first electrical torque provider in response to the electrical system having power delivery availability to meet the machine power demand change value.

In some forms according to the twentieth exemplary embodiment further in response to the machine power demand change value exceeding a threshold, the controller is further structured to operate the rule-based controller.

In some forms according to the twentieth exemplary embodiment the controller is further structured to determine the power surplus value in response to at least one parameter selected from the parameters consisting of: a torque rating of the first electrical torque provider, a torque rating of the second electrical torque provider, an accessory load, a throughput rating of the electrical energy storage device, a state-of-charge (SOC) of the electrical energy storage device, a throughput rating of a first power electronics interposed between the electrical energy storage device and the first electrical torque provider, and a throughput rating of a second power electronics interposed between the electrical energy storage device and the second electrical torque provider.

In some forms according to the twentieth exemplary embodiment the controller is further structured to operate the optimum cost controller by incrementally changing a power provided by the engine in a first execution cycle, and determining whether the incrementally changed power improved a power cost value.

In some forms according to the twentieth exemplary embodiment the controller is further structured to operate the optimum cost controller as a closed loop controller having an error value determined in response to a slope of the power cost value with time.

In some forms according to the twentieth exemplary embodiment the optimum cost controller is a proportional-integral controller.

In some forms according to the twentieth exemplary embodiment the controller is further structured to apply a random noise value to the incrementally changing power provided by the engine.

In some forms according to the twentieth exemplary embodiment the random noise value comprises an amplitude selected in response to an expected local minima depth property of a response surface of the hybrid power train.

In some forms according to the twentieth exemplary embodiment the controller is further structured to increase an amplitude of the incremental change in response to an increasing rate of change of the power cost value.

In some forms according to the twentieth exemplary embodiment the controller is further structured to operate the rule-based controller to respond to increasing power demand by, in order and until the power demand is achieved, increasing power output of the first electrical torque provider, increasing power output of the second electrical torque provider, and increasing power output of the engine.

In some forms according to the twentieth exemplary embodiment the controller is further structured to operate the rule-based controller to response to decreasing power demand by, in order and until the power demand is achieved, decreasing power of the first electrical torque provider, decreasing power of the second electrical torque provider, and decreasing power of the engine.

Some forms according to the twentieth exemplary embodiment further include limiting the first electrical torque provider and the second electrical torque provider to a minimum zero torque until the engine reaches a minimum torque value.

Some forms according to the twentieth exemplary embodiment further include a clutch positioned with the first electrical torque provider and a load on a first side and with the internal combustion engine and the second electrical torque provider on a second side, wherein the clutch in a closed position provides the hybrid power train in a parallel configuration and wherein the clutch in an open position provides the hybrid power train in a series configuration.

Some forms according to the twentieth exemplary embodiment further include, in response to determining the clutch is open and the power surplus value being less than the machine power demand change value, the controller further structured to command the clutch to close.

Some forms according to the twentieth exemplary embodiment further include, in response to determining the clutch is open and the power surplus value being less than the machine power demand change value, and further in response to determining the clutch is disallowed from closing, the controller further structured to command the first electrical torque provider to one of a maximum or minimum torque position.

In some forms according to the twentieth exemplary embodiment the controller is further structured to command the first electrical torque provider to meet the machine power demand change value.

A twenty-first exemplary embodiment is a method including determining a power surplus value of an electrical system including a portion of a hybrid power train, determining a machine power demand change value, in response to the power surplus value of the electrical system being greater than or equal to the machine power demand change value, operating an optimum cost controller to determine a power division for the hybrid power train including an engine, a first electrical torque provider, and a second electrical torque provider, and in response to the power surplus value of the electrical system being less than the machine power demand change value, operating a rule-based controller to determine the power division for the hybrid power train.

Some forms according to the twenty-first exemplary embodiment further include determining the power surplus value of the first electrical torque provider in response to the electrical system having power delivery availability to meet the machine power demand change value.

Some forms according to the twenty-first exemplary embodiment further include operating a rule-based controller in response to the machine power demand change value exceeding a threshold.

Some forms according to the twenty-first exemplary embodiment further include determining the power surplus value in response to a torque rating of at least one of the first electrical device and the second electrical device.

Some forms according to the twenty-first exemplary embodiment further include determining the power surplus value in response to an accessory load.

Some forms according to the twenty-first exemplary embodiment further include determining the power surplus value in response to a throughput rating of an electrical energy storage device electrically coupled to the first electrical torque provider and the second electrical torque provider.

Some forms according to the twenty-first exemplary embodiment further include determining the power surplus value in response to a state-of-charge (SOC) of an electrical energy storage device electrically coupled to the first electrical torque provider and the second electrical torque provider.

Some forms according to the twenty-first exemplary embodiment further include determining the power surplus value in response to at least one of a throughput rating of a first power electronics interposed between an electrical energy storage device and the first electrical torque provider, and a throughput rating of a second power electronics interposed between the electrical energy storage device and the second electrical torque provider, the electrical energy storage device electrically coupled to the first electrical torque provider and the second electrical torque provider.

Some forms according to the twenty-first exemplary embodiment further include operating the optimum cost controller by incrementally changing a power provided by the engine in a first execution cycle, and determining whether the incrementally changed power improved a power cost value.

Some forms according to the twenty-first exemplary embodiment further include operating the optimum cost controller as a closed loop controller having an error value determined in response to a slope of the power cost value with time.

Some forms according to the twenty-first exemplary embodiment further include applying a random noise value to the incrementally changing power provided by the engine.

Some forms according to the twenty-first exemplary embodiment further include selecting an amplitude for the random noise value in response to an expected local minima depth property of a response surface of the hybrid power train.

Some forms according to the twenty-first exemplary embodiment further include increasing an amplitude of the incremental change in response to an increasing rate of change of the power cost value.

Some forms according to the twenty-first exemplary embodiment further include operating the rule-based controller to respond to increasing power demand by, in order and until the power demand is achieved, increasing power output of the first electrical torque provider, increasing power output of the second electrical torque provider, and increasing power output of the engine.

Some forms according to the twenty-first exemplary embodiment further include operating the rule-based controller to response to decreasing power demand by, in order and until the power demand is achieved, decreasing power of the first electrical torque provider, decreasing power of the second electrical torque provider, and decreasing power of the engine.

Some forms according to the twenty-first exemplary embodiment further include limiting the first electrical torque provider and the second electrical torque provider to a minimum zero torque until the engine reaches a minimum torque value.

Some forms according to the twenty-first exemplary embodiment further include commanding a clutch in a closed position to position the hybrid power train in a parallel configuration, wherein the clutch is positioned with the first electrical torque provider and a load on a first side and with the internal combustion engine and the second electrical torque provider on a second side.

Some forms according to the twenty-first exemplary embodiment further include commanding the clutch in an open position to position the hybrid power train in a series configuration.

Some forms according to the twenty-first exemplary embodiment further include, in response to determining the clutch is open and the power surplus value is less than the machine power demand change value, commanding the clutch to the closed position.

Some forms according to the twenty-first exemplary embodiment further include, in response to determining the clutch is open and the power surplus value is less than the machine power demand change value, and further in response to determining the clutch is disallowed from closing, commanding the first electrical torque provider to one of a maximum or minimum torque position.

A twenty-second exemplary embodiment is a method including determining a machine shaft torque demand and a machine shaft speed, in response to the machine shaft torque demand and the machine shaft speed, determining a machine power demand, in response to determining the machine shaft speed is zero and the machine shaft torque demand is greater than zero, adjusting the machine power demand to a non-zero value, determining a power division description between an internal combustion engine and at least one electrical torque provider, and operating the internal combustion engine and the at least one electrical torque provider in response to the power division description.

Some forms according to the twenty-second exemplary embodiment further include determining an engine cost function including engine operating cost as a function of engine power output, an electrical cost function including electrical torque provider operating cost as a function of the electrical torque provider power output, and where the determining the power division description is in response to the engine cost function and the electrical cost function.

In some forms according to the twenty-second exemplary embodiment the electrical cost function includes an efficiency of corresponding power electronics, the corresponding power electronics interposed between the electrical torque provider and an electrical energy storage device.

In some forms according to the twenty-second exemplary embodiment the electrical cost function includes a generating operating region, and wherein the electrical cost function further includes an efficiency of electrical energy storage and recovery.

Some forms according to the twenty-second exemplary embodiment further include determining a second electrical cost function including a second electrical torque provider operating cost as a function of a second electrical torque provider power output, where the determining the power division description is further in response to the engine cost function, the electrical cost function, and the second electrical cost function.

In some forms according to the twenty-second exemplary embodiment the second electrical cost function includes an efficiency of corresponding second power electronics, the corresponding second power electronics interposed between the second electrical torque provider and the electrical energy storage device.

In some forms according to the twenty-second exemplary embodiment the second electrical cost function includes a generating operating region, and wherein the second electrical cost function further includes a second efficiency of electrical energy storage and recovery corresponding to the second electrical torque provider and the second power electronics.

Some forms according to the twenty-second exemplary embodiment further include in a first operating mode, disengaging a clutch between the internal combustion engine and the first electrical torque provider, and providing all of the machine power demand with the first electrical torque provider, in a second operating mode, engaging the clutch between the internal combustion engine and the first electrical torque provider and providing all of the machine power demand with the internal combustion engine, in a third operating mode, engaging the clutch between the internal combustion engine and the first electrical torque provider and dividing the machine power demand between the internal combustion engine and the first electrical torque provider, in a fourth operating mode, engaging the clutch between the internal combustion engine and the first electrical torque provider and dividing the power between the internal combustion engine and the second electrical torque provider, in a fifth operating mode, engaging the clutch between the internal combustion engine and the first electrical torque provider and dividing the power between the first electrical torque provider and the second electrical torque provider, and in a sixth operating mode, engaging the clutch between the internal combustion engine and the first electrical torque provider and dividing the power between the internal combustion engine, the first electrical torque provider, and the second electrical torque provider.

Some forms according to the twenty-second exemplary embodiment further include determining a cost disposition parameter, and wherein determining each of the cost functions comprises determining each cost function in response to the cost disposition parameter and a plurality of corresponding cost functions.

In some forms according to the twenty-second exemplary embodiment the cost disposition parameter comprises one of a duty cycle category and a drive route parameter.

In some forms according to the twenty-second exemplary embodiment determining each cost function in response to the cost disposition parameter and a plurality of corresponding cost functions comprises one of: selecting one of the corresponding cost functions, and interpolating between two proximate cost functions from the corresponding cost functions.

Some forms according to the twenty-second exemplary embodiment further include adjusting the power division description in response to an electrical storage device state-of-charge.

Some forms according to the twenty-second exemplary embodiment further include determining the electrical cost function including the electrical torque provider operating cost as a function of the electrical torque provider power output and an electrical energy storage device state-of-charge.

Some forms according to the twenty-second exemplary embodiment further include determining the electrical cost function including the electrical torque provider operating cost as a function of the electrical torque provider power output and an electrical energy storage device state-of-charge, and determining the second electrical cost function including the second electrical torque provider operating cost as a function of the second electrical torque provider power output and the electrical energy storage device state-of-charge.

Some forms according to the twenty-second exemplary embodiment further include determining a vehicle speed, and determining the power division description in response to the machine power demand and the vehicle speed.

Some forms according to the twenty-second exemplary embodiment further include determining a plurality of nominal power division descriptions as a two-dimensional function of the vehicle speed and the machine power demand, where the determining the power division description further comprises a lookup operation utilizing the plurality of nominal power division descriptions.

Some forms according to the twenty-second exemplary embodiment further include determining the power division description between the internal combustion engine, a first electrical torque provider, and a second electrical torque provider.

Some forms according to the twenty-second exemplary embodiment further include, in response to determining that the second electrical torque provider provides the entire machine torque demand: disengaging a clutch positioned between the internal combustion engine and the second electrical torque provider.

In some forms according to the twenty-second exemplary embodiment the engine cost function further includes an emissions cost.

In some forms according to the twenty-second exemplary embodiment the engine cost function further includes a second emissions cost.

In some forms according to the twenty-second exemplary embodiment the engine cost function further includes a secondary effect cost, wherein the secondary effect is selected from the effects consisting of: an incremental life loss of an aftertreatment component and an incremental regeneration cost of the aftertreatment component.

In some forms according to the twenty-second exemplary embodiment the emissions cost includes a discontinuity.

In some forms according to the twenty-second exemplary embodiment the machine power demand is negative.

In some forms according to the twenty-second exemplary embodiment the power division description includes an engine braking target power value.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating a hybrid power train including an internal combustion engine and at least one electrical torque provider;
    determining a machine power demand;
    in response to the machine power demand, determining a power division description;
    in response to the power division description, operating the internal combustion engine and the at least one electrical torque provider; and
    wherein operating the internal combustion engine further comprises starting the internal combustion engine a battery state-of-charge (SOC) is below a predetermined threshold value; and
    performing engine shutdown and engine startup operations with at least one time based hysteresis value.

2. The method of claim 1, further comprising determining the at least one time based hysteresis value for the engine shutdown operation in response to a turbocharger temperature.

3. The method of claim 1, further comprising determining a turbocharger temperature value, and preventing the engine shutdown operation in response to the turbocharger temperature value exceeding a threshold.

4. The method of claim 1, further comprising determining that the engine shutdown operation is one of requested and imminent, the method further comprising performing an engine-based turbocharger cooldown operation in response to the requested or imminent engine shutdown operation.

5. The method of claim 1, wherein the operating the internal combustion engine further comprises starting the internal combustion engine when the battery state-of-charge (SOC) is below the predetermined threshold value and the machine power demand is above a first threshold.

6. The method of claim 1, further comprising determining an engine start capability index of the at least one electrical torque provider, and wherein operating the internal combustion engine further comprises starting the internal combustion engine when the engine start capability index is below a first threshold.

7. The method of claim 6, wherein the operating the internal combustion engine further comprises starting the internal combustion engine when the engine start capability index is about to fall below a second threshold.

8. The method of claim 1, further comprising allowing the internal combustion engine shutdown operation in response to the hybrid power train operating in a series mode.

9. The method of claim 1, further comprising preventing the internal combustion engine shutdown operation in response to the internal combustion engine operating in one of a thermal management mode and a warm-up mode.

10. A method, comprising:
    operating a hybrid power train including an internal combustion engine and at least one electrical torque provider;
    determining a machine power demand;
    in response to the machine power demand, determining a power division description;
    in response to the power division description, operating the internal combustion engine and the at least one electrical torque provider; and
    wherein operating the internal combustion engine further comprises starting the internal combustion engine when a battery state-of-charge (SOC) is below a first predetermined threshold value; and
    determining a turbocharger temperature value, and preventing an engine shutdown operation in response to the turbocharger temperature value exceeding a threshold.

11. The method of claim 10, wherein operating the internal combustion engine further comprises starting the internal combustion engine when a power demand of the at least one electrical torque provider is about to exceed an electrical limit.

12. The method of claim 10, wherein operating the internal combustion engine further comprises starting the internal combustion engine when a battery throughput limit is about to be exceeded.

13. The method of claim 10, wherein operating the internal combustion engine further comprises starting the internal combustion engine when a battery throughput value exceeds a battery throughput threshold and the battery throughput value is moving higher at a throughput increase rate exceeding a throughput increase threshold.

14. The method of claim 10, wherein operating the internal combustion engine further comprises starting the internal combustion engine when a power demand rate of increase exceeds a limit.

15. A method, comprising:
operating a hybrid power train including an internal combustion engine and at least one electrical torque provider;
determining a machine power demand;
in response to the machine power demand, determining a power division description;
in response to the power division description, operating the internal combustion engine and the at least one electrical torque provider;
wherein operating the internal combustion engine further comprises starting the internal combustion engine when:
a battery state-of-charge (SOC) is below a predetermined threshold value; and
determining that an engine shutdown operation is one of requested and imminent, the method further comprising performing an engine-based turbocharger cooldown operation in response to the requested or imminent engine shutdown operation.

16. The method of claim 15, further comprising determining an engine start capability index of the at least one electrical torque provider, and wherein operating the internal combustion engine further comprises starting the internal combustion engine when the engine start capability index is below a start capability threshold of the at least one electrical torque provider.

17. The method of claim 16, wherein the operating the internal combustion engine further comprises starting the internal combustion engine in response to determining that the engine start capability index is about to fall below a second start capability threshold.

18. The method of claim 15, further comprising performing engine shutdown and engine startup operations with at least one time based hysteresis value.

19. The method of claim 18, further comprising determining the at least one time based hysteresis value for the engine shutdown operation in response to a turbocharger temperature value.

20. The method of claim 15, wherein operating the internal combustion engine further comprises starting the internal combustion engine the machine power demand exceeds an engine start threshold value and the machine power demand is increasing.

* * * * *